(12) United States Patent
Yi et al.

(10) Patent No.: US 10,466,808 B2
(45) Date of Patent: Nov. 5, 2019

(54) FLEXIBLE ELECTRONIC DEVICE AND METHOD OF OPERATING SAME

(71) Applicant: Samsung Electronics Co., Ltd., Gyeonggi-do (KR)

(72) Inventors: Sun-Young Yi, Gyeonggi-do (KR); Chaekyung Lee, Seoul (KR); Ha-Young Jeon, Seoul (KR); Heejin Kim, Seoul (KR); Dongjun Shin, Seoul (KR); Sungyoun An, Gyeonggi-do (KR)

(73) Assignee: Samsung Elecronics Co., Ltd (KR)

( * ) Notice: Subject to any disclaimer, the term of this patent is extended or adjusted under 35 U.S.C. 154(b) by 366 days.

(21) Appl. No.: 15/368,106

(22) Filed: Dec. 2, 2016

(65) Prior Publication Data
US 2017/0160819 A1    Jun. 8, 2017

(30) Foreign Application Priority Data

Dec. 7, 2015 (KR) .......................... 10-2015-0173512

(51) Int. Cl.
*G06F 3/03* (2006.01)
*G06F 3/041* (2006.01)
(Continued)

(52) U.S. Cl.
CPC ................ *G06F 3/03* (2013.01); *G06F 1/163* (2013.01); *G06F 1/1652* (2013.01);
(Continued)

(58) Field of Classification Search
CPC ........ G06F 3/03; G06F 3/0412; G06F 3/0416; G06F 3/044; G06F 3/0485;
(Continued)

(56) References Cited

U.S. PATENT DOCUMENTS 9,292,201 B2 *  3/2016  Joo ..................... G06F 3/04886
9,778,766 B2 * 10/2017  Choi .................. H04M 1/0268
(Continued)

FOREIGN PATENT DOCUMENTS

EP       2 741 176       6/2014
KR     2008/013222       2/2008
(Continued)

OTHER PUBLICATIONS

European Search Report dated Oct. 15, 2018 issued in counterpart application No. 16873293.1-1216, 8 pages.
(Continued)

*Primary Examiner* — Sardis F Azongha
(74) *Attorney, Agent, or Firm* — The Farrell Law Firm, P.C.

(57) ABSTRACT

An electronic device is provided. The electronic device includes a flexible touch screen including a display, a sensor configured to detect bending of the electronic device, and a processor operably connected to the display and the sensor and configured to determine whether the electronic device is worn by the user and perform an operation of an application executed before the electronic device is worn by the user based on a determination that the electronic device is worn by the user.

20 Claims, 61 Drawing Sheets

230

220

210

(51) Int. Cl.
*G06Q 20/40* (2012.01)
*G10L 15/26* (2006.01)
*G06F 21/32* (2013.01)
*G06F 1/16* (2006.01)
*G06F 3/16* (2006.01)
*G06F 3/044* (2006.01)
*H04W 12/06* (2009.01)
*G06F 3/01* (2006.01)
*G06F 3/0485* (2013.01)
*H04M 1/02* (2006.01)
*G06F 3/0488* (2013.01)
*H04L 29/06* (2006.01)
*G06K 9/00* (2006.01)
*H04M 1/03* (2006.01)

(52) U.S. Cl.
CPC ............ *G06F 1/1694* (2013.01); *G06F 3/017* (2013.01); *G06F 3/044* (2013.01); *G06F 3/0412* (2013.01); *G06F 3/0416* (2013.01); *G06F 3/0485* (2013.01); *G06F 3/04883* (2013.01); *G06F 3/04886* (2013.01); *G06F 3/165* (2013.01); *G06F 3/167* (2013.01); *G06F 21/32* (2013.01); *G06Q 20/4014* (2013.01); *G10L 15/26* (2013.01); *H04M 1/02* (2013.01); *H04M 1/0268* (2013.01); *H04W 12/06* (2013.01); *G06F 2203/04102* (2013.01); *G06F 2203/04104* (2013.01); *G06K 9/00006* (2013.01); *H04L 63/0853* (2013.01); *H04L 63/0861* (2013.01); *H04M 1/03* (2013.01); *H04M 2250/12* (2013.01); *H04M 2250/22* (2013.01); *H04M 2250/74* (2013.01)

(58) Field of Classification Search
CPC .. G06F 3/04883; G06F 3/04886; G06F 3/165; G06F 3/167; G06F 21/32; G06Q 20/4014; G10L 15/26; H04W 12/06
See application file for complete search history.

(56) References Cited

U.S. PATENT DOCUMENTS

| | | | |
|---|---|---|---|
| 9,851,811 B2 * | 12/2017 | Ke | ............................ G06F 3/03 |
| 2009/0025483 A1 | 1/2009 | Connor et al. | |
| 2010/0156783 A1 | 6/2010 | Bajramovic | |
| 2011/0014956 A1 | 1/2011 | Lee et al. | |
| 2013/0044215 A1 | 2/2013 | Rothkopf et al. | |
| 2013/0127918 A1 | 5/2013 | Kang et al. | |
| 2013/0162526 A1 | 6/2013 | Kim et al. | |
| 2013/0169520 A1 * | 7/2013 | Cho | ..................... G06F 3/0488 345/156 |
| 2014/0275812 A1 | 9/2014 | Stivoric et al. | |
| 2015/0022472 A1 | 1/2015 | Jung et al. | |
| 2015/0185944 A1 | 7/2015 | Magi et al. | |
| 2016/0062410 A1 | 3/2016 | Ko et al. | |
| 2016/0283086 A1 * | 9/2016 | Inagaki | ................. G06F 1/1626 |

FOREIGN PATENT DOCUMENTS

| | | |
|---|---|---|
| KR | 2011/0008607 | 1/2011 |
| KR | 2016/0025830 | 3/2016 |
| WO | WO 2008/018728 | 2/2008 |
| WO | WO 2015/031426 | 3/2015 |

OTHER PUBLICATIONS

International Search Report dated Mar. 10, 2017 issued in counterpart application No. PCT/KR2016/014095, 13 pages.
Experts say Apple Watch hert rate seonsor DOES work on skin that is not white after concerns raised by wrist tattoos, Daily Mail Online, Monday, Oct. 10, 2016.

* cited by examiner

FLEXIBLE ELECTRONIC DEVICE AND METHOD OF OPERATING SAME

PRIORITY

This application claims priority under 35 U.S.C. § 119(a) to Korean Application Serial No. 10-2015-0173512, which was filed in the Korean Intellectual Property Office on Dec. 7, 2015, the entire content of which is incorporated herein by reference.

BACKGROUND

1. Field of the Disclosure

The present disclosure relates generally to an electronic device, and more particularly, to a flexible electronic device and a method of operating the same.

2. Description of the Related Art

With the development of digital technologies, various types of electronic devices are widely utilized, such as a smart phone, a tablet personal computer (PC), a personal digital assistant (PDA), an electronic organizer, a notebook, a wearable device, or the like. The electronic device may provide call functions such as a voice call and a video call, message transmission/reception functions such as a short message service (SMS), a multimedia message service (MMS), and an e-mail, an electronic organizer function, a photography function, a broadcast reproduction function, a video reproduction function, a music reproduction function, an Internet function, a messenger function, a social networking service (SNS) function and the like.

The electronic device may be a flexible device and/or a wearable device; the flexible electronic device may be a wearable electronic device which a user can wear.

SUMMARY

An aspect of the present disclosure provides an apparatus and a method for, when a flexible electronic device is worn, determining a situation where a non-worn state of the electronic device switches to a worn state, activating the electronic device, and switching to the worn state.

An aspect of the present disclosure provides an apparatus and a method for, when bending of a flexible electronic device is recognized, activating the electronic device and executing an operation mode of the electronic device after the electronic device is worn.

An aspect of the present disclosure provides an apparatus and a method for, when bending of a flexible device is recognized, analyzing an operation mode of the electronic device and, when the electronic device is in a lock state, activating a display, displaying a lock release input window, unlocking the electronic device by lock release information input after the electronic device is worn, and executing a set operation mode.

An aspect of the present disclosure provides an apparatus and a method for, when bending of a flexible device is recognized, analyzing an operation mode of the electronic device, activating the device to be operated in the executed mode, unlocking the electronic device by input lock release information set in activated devices after wearing, and performing the set operation mode.

In accordance with an aspect of the present disclosure, there is provided an electronic device. The electronic device includes a flexible touch screen including a display, a sensor configured to detect bending of the electronic device and when the electronic device is worn by a user, and a processor operably connected to the display and the sensor and configured to execute an application before the electronic device is positioned on a user when bending of the electronic device is detected by the sensor.

In accordance with an aspect of the present disclosure, there is provided a method of operating a flexible electronic device. The method includes executing an operation mode in a non-worn state of the electronic device, recognizing bending of the electronic device, when the bending of the electronic device is detected, determining whether the electronic device is worn by a user, and when it is detected that the electronic device is worn by a user, switching one of a function and a user interface (UI) of the non-worn state to one of a function and a UI of a worn state and performing an operation of the electronic device.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
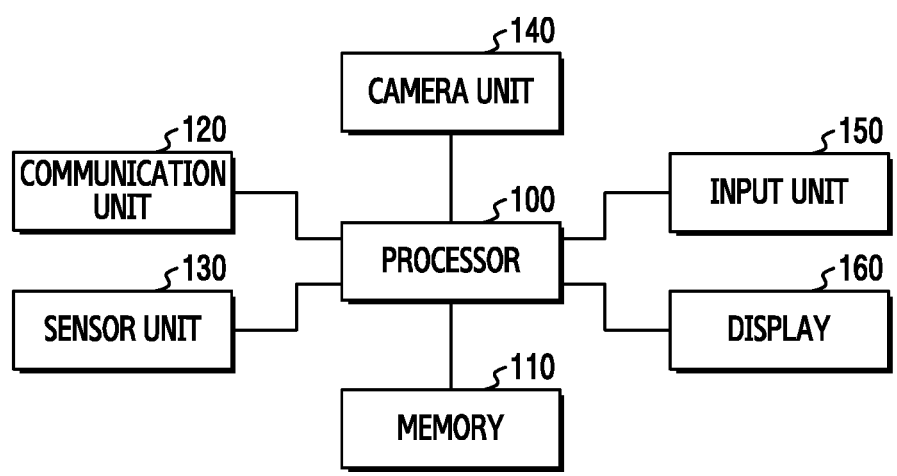
FIG. 1 is a diagram illustrating an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a block diagram of an electronic device, according to an embodiment of the present disclosure. The electronic device of FIG. 1 may be a wearable electronic device. Further, the wearable electronic device may be a flexible electronic device.

Referring to FIG. 1, the electronic device includes a processor 100, a memory 110, a communication unit 120, a sensor unit 130, a camera 140, an input unit 150, and a display 160. The electronic device may omit at least one of the elements or additionally include other elements. The input unit 150 and the display 160 are flexible devices and may be an integral touch screen (or touch screen sensor). All or some of the processor 100, the memory 110, the communication unit 120, the sensor unit 130, and/or the camera 140 may be formed as one or more flexible printed circuit boards (PCBs). The PCB may be curved, bent, rolled, or folded along with the flexible screen sensor. The term "bent" as used herein is defined as "curved, bent, rolled, and folded."

The processor 100 may include one or more of a central processing unit (CPU), an AP, and a communication processor (CP). The processor 100 may perform calculations or data processing according to the control of at least one other element of the electronic device and/or the execution of an application.

The memory 110 may include a volatile memory and/or a non-volatile memory. The memory 110 may store commands or data associated with at least one other element of the electronic device. The memory 110 may store software and/or a program. The program may include a kernel, middleware, an application programming interface (API), and/or application programs (or applications). At least some of the kernel, the middleware, and the API may be referred to as an operating system (OS).

The communication unit 120 may include a wireless communication module and a wired communication module. The wireless communication module may include a cellular communication module and a short range communication module.

The cellular communication may include at least one of long term evolution (LTE), LTE-advance (LTE-A), code division multiple access (CDMA), wideband CDMA (WCDMA), universal mobile telecommunications system (UMTS), Wireless Broadband (WiBro), global system for mobile communications (GSM), and the like. The cellular communication module may provide a voice call, image call, a text message service, or an Internet service through, for example, a communication network. The cellular communication module may identify and authenticate the electronic device within a communication network based on a subscriber identification module (SIM). The cellular communication module may perform at least some of the functions which the processor 100 can provide. The cellular communication module may include a communication processor (CP).

The short range communication module may include at least one of, for example, wireless-fidelity (Wi-Fi), bluetooth (BT), near field communication (NFC), global navigation satellite system (GNSS or global positioning system (GPS)). A magnetic secure transmission (MST) may create a pulse according to transmitted data by using an electromagnetic signal, the pulse may generate a magnetic field signal. The electronic device may transmit the magnetic field signal to point of sales (POS), and the POS may detect the magnetic field signal through an MST reader and convert the magnetic field signal into an electric signal, so as to reconstruct data. The GNSS may include at least one of, for example, a GPS, a Global navigation satellite system (Glonass), a Beidou navigation satellite system (Beidou), and Galileo (the European global satellite-based navigation system) according to a used area or a bandwidth thereof. Hereinafter, the "GPS" may be interchangeably used with the "GNSS".

The wired communication module may include, for example, at least one of a universal serial bus (USB), a high definition multimedia interface (HDMI), recommended standard 232 (RS-232), a plain old telephone service (POTS), and the like.

The sensor unit 130 may measure a physical quantity or sense an operation state of the electronic device, so as to convert the measured or sensed information into an electric signal. The sensor unit 130 may include at least one of a gesture sensor, a gyro sensor, a barometer, a magnetic sensor, an acceleration sensor, a grip sensor, a proximity sensor, a color sensor (for example, red, green, blue (RGB) sensor), a medical sensor, a temperature-humidity sensor, an illuminance sensor, a ultra violet (UV) sensor, and a flexible detection sensor that detects bending of the electronic device.

When the display is a flexible display, the sensor unit 130 may include a bending sensor for detecting flexing or bending of the electronic device. The bending sensor may be installed in a wearing state providing device, e.g., a device used for allowing the electronic device to be worn by a user) or adjacent to the wearing state providing device. The sensor unit 130 may include a coupling sensor by which the electronic device may recognize (or detect) when the electronic device is worn by a user. The coupling sensor may be installed in a coupling part of the electronic device. The coupling sensor may be a magnetic sensor that may detect a magnetic field that changes according to a coupling state of the coupling part having a magnetic with different poles on both sides to determine whether the wearable electronic device is worn. Further, the coupling sensor may be a proximity sensor that is located at the coupling part and detects the proximity of the coupling part. A medical sensor of the sensor 130 may include a heart rate monitoring (HRM) sensor and/or a UV light sensor. The HRM sensor may be installed in a back surface of the electronic device (for example, the surface that contacts the user's wrist). The UV sensor may be installed in the front surface of the electronic device (for example, at a location at which an external light such as a sun light can be detected).

Additionally or alternatively, the sensor unit 130 may further include a control circuit for controlling one or more sensors provided in the electronic device. The electronic device may further include a processor configured to control the sensor unit 130 as a part of the processor 100 or separately from the processor 100, and may control the sensor unit 130 while the processor 100 is in a sleep state.

The camera unit 140 is a device that may photograph a still image and a moving image. The camera unit 140 may include one or more image sensors (for example, a front sensor or a rear sensor), a lens, an image signal processor (ISP), or a flash (for example, a light emitting diode (LED) or xenon lamp).

The input unit 150 may include, for example, at least one input unit of a touch panel, a (digital) pen sensor, a key, and an ultrasonic input device. The touch panel may use at least one of a capacitive type, a resistive type, an infrared type, and an ultrasonic type. Also, the touch panel may further include a control circuit. The touch panel may further include a tactile layer to provide a tactile reaction to the user. The (digital) pen sensor may include a recognition sheet which is a part of the touch panel or is separated from the touch panel. The key may include a physical button, an optical key, or a keypad. The ultrasonic input unit may detect ultrasonic waves generated by an input means through a microphone and identify data corresponding to the detected ultrasonic waves. The input unit may be a touch panel, and the touch panel may include a pressure sensor function.

The display 160 may include a liquid crystal display (LCD), an LED display, an organic LED (OLED) display, a microelectromechanical systems (MEMS) display, and an electronic paper display. The display 160 may display, for example, various pieces of contents (for example, text, images, videos, icons, symbols, and the like) to the user.

The input unit 150 and the display 160 may be configured as an integral touch screen. The touch screen may display a screen under a control of the processor 100 and detect a touch, gesture, proximity, or hovering input using an electronic pen or the user's body part.

When the electronic device is a wearable electronic device, the input unit 150 and the display 160 may be flexible devices.

The wearable electronic device may be included in a range of electronic devices as described above, and an operation between the electronic devices may be performed between the wearable electronic device and various electronic devices. For example, the wearable electronic device may include the processor 120 such as an AP, a CP, a Graphic Processing Unit (GPU), and a CPU including all information and communication devices, multimedia devices, wearable devices, and application devices thereof that support various functions.

The flexible electronic device may be a bendable electronic device, and the wearable electronic device may refer to an electronic device which the user can wear. The electronic device may be a flexible and wearable electronic device. In the following description, the flexible electronic device and the wearable electronic device may be used as the same meaning.

Further, when the wearable electronic device is connected to another electronic device, the wearable electronic device may perform an operation for performing a function corresponding to the electronic device through a link between the electronic device and the wearable device according to the connection or release of the connection between the electronic device and the device.

The processor 100 may control the execution of the applications by using the memory 110. The applications (for example, the application programs) may include, for example, one or more applications which may perform functions of providing a home application, a dialer application, short messaging service/multimedia messaging service (SMS/MMS) application, instant message (IM) application, a browser application, a camera application, an alarm application, a contacts application, a voice dial application, an email application, a calendar application, a media player application, an album application, a clock application, a health care application (for example, to measure exercise quantity or blood sugar), or an environment information application (for example, atmospheric pressure, humidity, or temperature information).

The applications may include an information exchange application that supports information exchange between the electronic device and an external electronic device (e.g., another electronic device). The information exchange application may include, for example, a notification relay application for transferring specific information to an external electronic device or a device management application for managing an external electronic device.

For example, the notification relay application may have a function of transferring notification information generated by other applications of the electronic device (for example, the SMS/MMS application, the e-mail application, the health care application, or the environmental information application) to the external electronic device. Furthermore, the notification relay application may, for example, receive notification information from the external electronic device and may provide the received notification information to a user.

The device management application, for example, may manage (for example, install, delete, or update) at least one function of an external electronic device communicating with the electronic device (for example, a function of turning on/off the external electronic device itself (or some components thereof) or a function of controlling the luminance (or a resolution) of the display), applications operating in the external electronic device, or services provided by the external electronic device (for example, a telephone call service and a message service).

The applications may include an application (for example, a health care application of a mobile medical device) designated according to attributes of the external electronic device. The applications may include an application received from the external electronic device. The applications may include preloaded applications or a third-party application that can be downloaded from a server.

Hereinafter, various embodiments of the present disclosure include a technology that uses both hardware and software and thus, the various embodiments of the present disclosure may not exclude software approaches.

Figure 2:
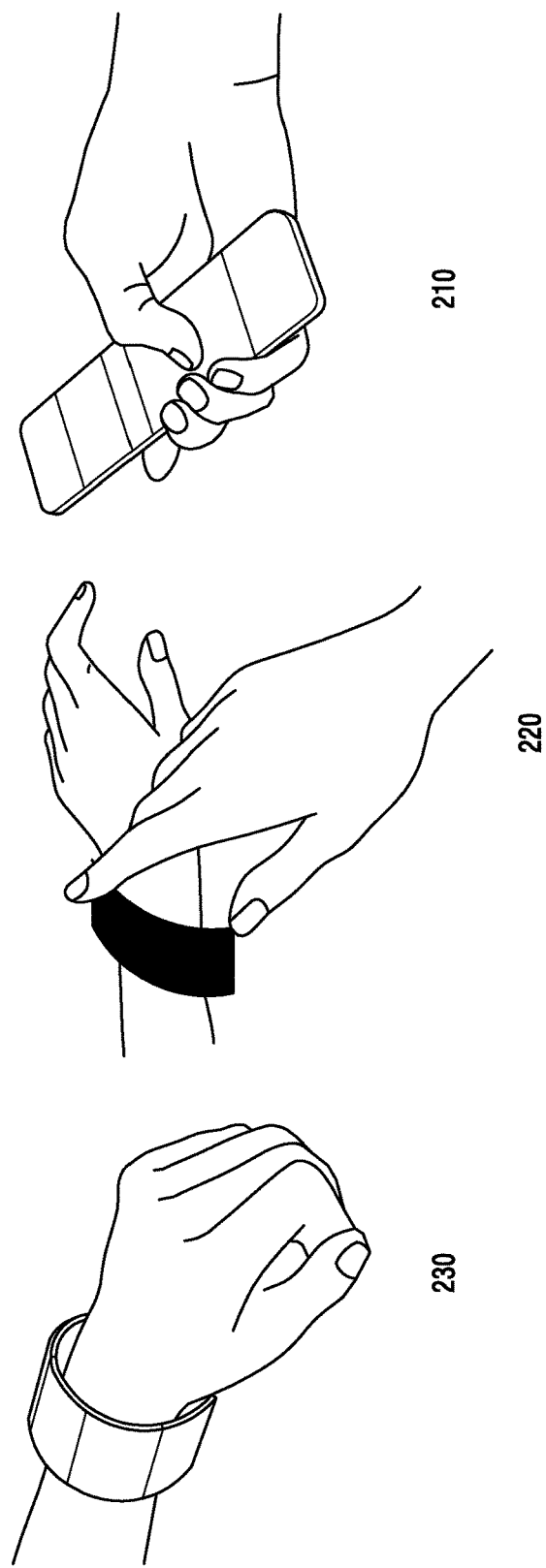
FIG. 2 is a diagram illustrating an example of a change in a form of a flexible electronic device, according to an embodiment of the present disclosure.

FIG. 2 is a diagram illustrating an example of a change in a form of the flexible electronic, device according to perspective of the present disclosure.

Referring to FIG. 2, the electronic device may be used as a general portable terminal device in a non-worn state 210 and used as a wearable electronic device in a worn state 230. When the electronic device switches from the non-worn state 210 to the worn state 230 or from the worn state 230 to the non-worn state 210, an operation 220 of bringing the electronic device into contact with a user's body (for example, wrist) or removing the electronic device from the user's body can be performed. Particularly, when the electronic device switches from the non-worn state 210 to the worn state 230, the user may perform the operation 220 of bringing the electronic device into contact with the body by bending the electronic device.

The flexible electronic device may switch to the worn state/non-worn state and, when changing the form of the electronic device (for example, when the electronic device is bent or unbent), determine a state of the electronic device and switch to a function and/or a UI suitable for the changed state. The electronic device may switch the function and the UI according to whether it is determined that the electronic device is being bent or worn by a user. For example, when bending is recognized, the electronic device may determine whether the electronic device is worn, and when the electronic device is worn, the electronic device may switch to the function and/or the UI of the worn state from the non-worn state according to an application. That is, the electronic device may not change the function and/or the UE when the bending is recognized, but may change the function and/or the UI when it is recognized that the electronic device is worn by a user. For example, when the bending is recognized, the electronic device may analyze an operation in the non-worn state, switch the function and/or the UI of the analyzed operation to a function and/or a UI of an operation to be performed in the worn state of the electronic device, and display the switched function and/or UI.

In the following description, the electronic device activates a relevant function and/or UI in advance to smoothly (or rapidly) execute the operation of the non-worn state 210 in the worn state 230 and in the state 220 where the non-worn state 210 switches to the worn state 230.

Figure 3A:
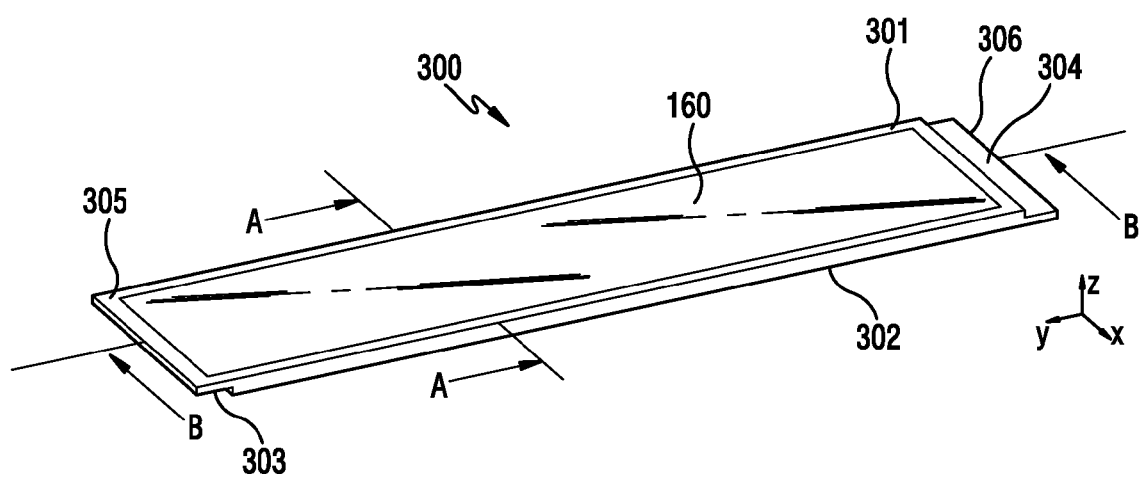
FIG. 3A is a perspective view illustrating a flexible electronic device in a flat state, according to an embodiment of the present disclosure.
Figure 3B:
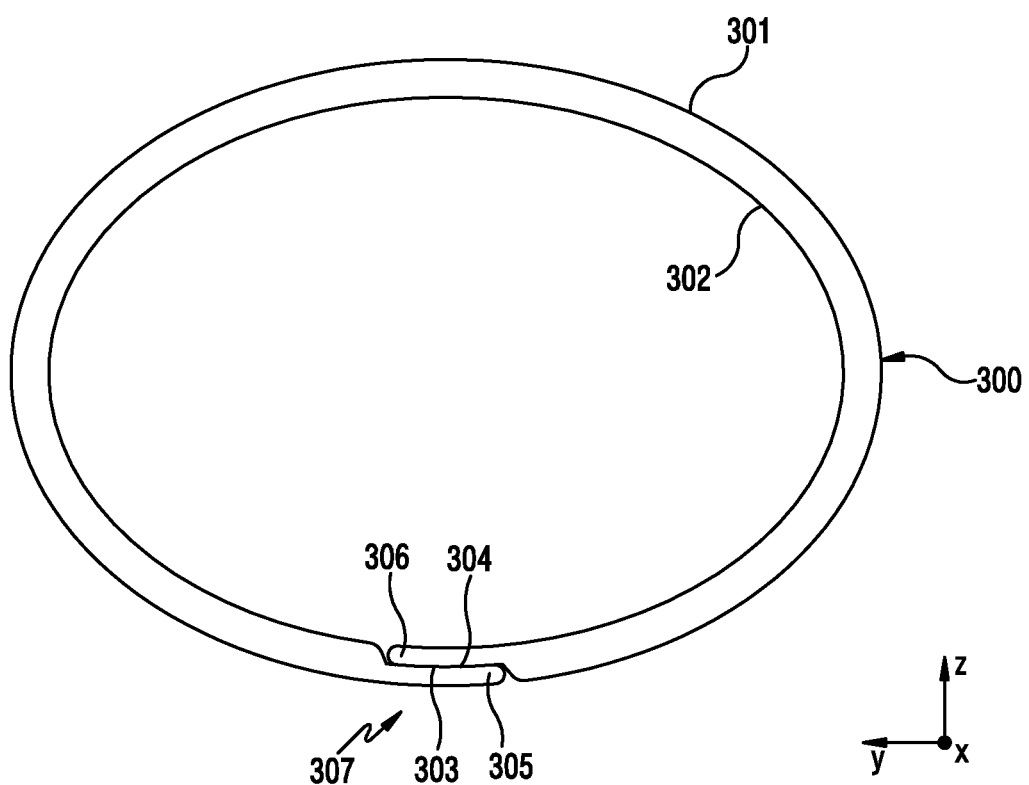
FIG. 3B is a perspective view illustrating a flexible electronic device in a state worn on a wrist, according to an embodiment of the present disclosure.

FIG. 3A is a perspective view of a flexible electronic device in a flat state, according to an embodiment of the present disclosure. FIG. 3B is a perspective view of the flexible electronic device in a state where the flexible electronic device is worn on the wrist of a user, according to an embodiment of the present disclosure.

FIG. 3A illustrates a first position state of the flexible electronic device, and FIG. 3B illustrates a second position state of the flexible electronic device. The first position corresponds to a substantially flat state of the flexible electronic device, and the second position may correspond to a state where the flexible electronic device receives power and is worn on the wrist. A power source that provides the aforementioned power will be described below.

The flexible electronic device may include a body 300 having a band shape that extends in one direction and may include a first surface 301 and a second surface 302 in a direction opposite to that of the first surface 301. The first surface 301 is an outer side of the flexible electronic device corresponding to a display area, and the second surface 302 may be an inner side of the flexible electronic device corresponding to, for example, a worn side that contacts the body of the user. The first surface 301 may be an upper side located on an upper portion of the flexible electronic device, and the second surface 302 may be a lower side located on a lower portion of the flexible electronic device.

The body 300 may be curved, bent, rolled, or folded. Accordingly, the flexible electronic device may be worn as a wrist watch. Further, the body 300 may include a wearing function that allows the flexible electronic device to be worn on the wrist.

The body 300 may include the display 160 on the first surface 301. Thus, the display 160 may be a flexible display that may be curved, bent, or folded.

Figure 4A:
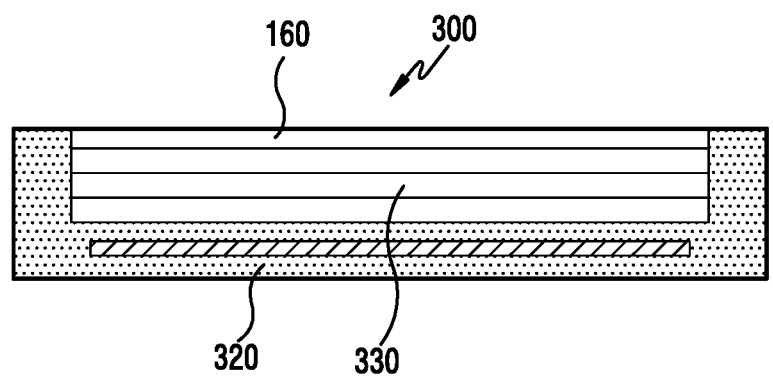
FIG. 4A is cross-sectional view taken along the line A-A of FIG. 3A.
Figure 4B:
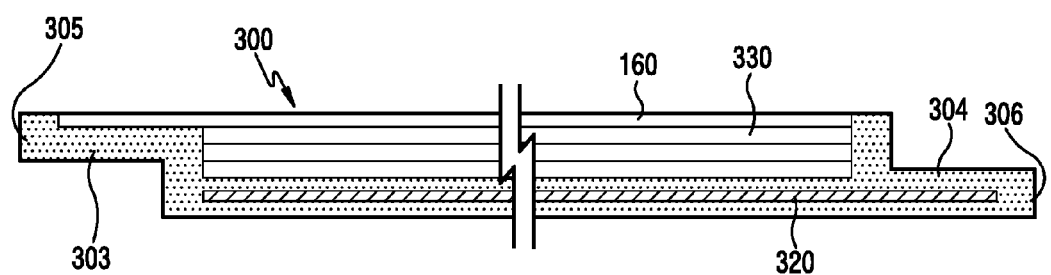
FIG. 4B is a cross-sectional view taken along the line B-B of FIG. 3A.

The flexible electronic device may include the body 300, the flexible display 160, and a wearing state providing device 320 (FIGS. 4A and 4B).

Although not illustrated, a speaker, a microphone, a front camera, and/or at least one sensor may be disposed on the remaining areas except for the display area on the first surface 301 of the body 300, for example, a bezel area.

The flexible display 160 arranged on the first surface 301 of the flexible electronic device may be configured as a touch screen (or a touch screen sensor) including a touch panel. The touch screen may be configured to occupy most of the front surface of the flexible electronic device.

A home button may be included in the body 300. When the home button is pressed, a main home screen may be displayed on the flexible display 160. For example, a power/reset button, a volume button, or one or a plurality of microphones may be arranged on a side edge of the flexible electronic device. Further, a connector may be formed on the other side surface of the flexible electronic device. The connector has a plurality of electrodes formed thereon and may be connected to an external device through a wire. An earphone connecting jack may be arranged on the side surface of the flexible electronic device; earphones may be inserted into the earphone connecting jack.

The body 300 of the flexible electronic device may be worn on the wrist by the wearing state providing device 320. For example, a bent case part of the body 300 may be formed with a flexible material (for example, a thin steel spring).

The flexible display 160 may be formed with the flexible material, and thus may be flat, rolled, folded, or bent.

The body 300 may include a main circuit board, and electronic components can be mounted on the main circuit board. The main circuit board may be formed in a joint structure by a flexible circuit unit. The main circuit board may have the configuration illustrated in FIG. 1. In addition, the body 300 may include a flexible battery.

The flexible electronic device may include a coupling part 307. The coupling part 307 may provide a structure or power that allows the flexible electronic device to be worn on the wrist through a coupling between both ends of the body 300. The coupling part 307 may include a first body end part 305 and a second body end part 306 which are disposed at opposite ends of the body 300.

The coupling part 307 may be configured in various forms and materials. For example, the coupling part 307 of FIG. 3B has a concavo-convex structure and may provide a coupling force by using magnetic forces of a magnetic material. The first end part 305 may have a first recess 303 on the second surface 302 and the second end part 306 may have a second recess 304 on the first surface 301. The first recess 303 and the second recess 304 may be formed in a groove type configuration, and may be configured as a stepped shape from the second surface 302 and the first surface 301, respectively. For example, when the first end part 305 and the second end part 306 are coupled to each other, the first recess 303 may be coupled to at least a part of the second end part 306 and the second recess 304 may be coupled to at least a part of the first end part 305. For example, when the first end part 305 and the second end part 306 are coupled, the first recess 303 may accommodate and be coupled to at least a part of the second end part 306, and the second recess 304 may accommodate and be coupled to at least a part of the first end part 305. A thickness of the coupling part 307 may be substantially the same as a thickness of the body part 300, except for the coupling part.

The coupling part 307 may use a magnetic material having different polarities or provide a coupling force by using the magnetic material and a metal material. For example, when the first end part 305 includes a magnetic material of the N pole and the second end part 306 includes a magnetic material of the S pole, an attractive force is applied between the first end part 305 and the second end part 306 in a state where the flexible electronic device is worn, and thus a coupling force between the first end part 305 and the second end part 306 may be provided. For example, when the first end part 305 includes a magnetic material of the N pole/S pole and the second end part 306 includes a metal material, the first end part 305 and the second end part 306 may be coupled to each other by a magnetic force in a state where the flexible electronic device is worn.

FIG. 4A is a cross sectional view taken along the line A-A of FIG. 3A. FIG. 4B is a cross sectional view taken along the line B-B of FIG. 3A.

Referring to FIGS. 4A and 4B, the flexible electronic device may include the wearing state providing device 320, thereby allowing the body 300 to be worn on the wrist.

The wearing state providing device 320 may be configured to semi-automatically operate. For example, when predetermined power is applied to the wearing state providing device 320 in the first position state illustrated in FIG. 3A, the flexible electronic device may be worn on the wrist in the second position state illustrated in FIG. 3B. For example, the wearing state providing device 320 may include a thin plate of a metal material. The wearing state providing device 320 maintains the body 300 in a substantially flat state but, when predetermined power is applied, the wearing state providing device 320 provides a curved force in a direction that causes the body 300 to surround the wrist. The body 300 may surround the wrist by the wearing state providing device 320, and thus the flexible electronic device may be in a state where the flexible electronic device can be worn on the wrist. The wearing state providing device 320 may have a curvature.

When predetermined power is applied to the wearing state providing device 320, a force of restoration can be provided by the wearing state providing device 320, thereby separating the body 300 from the wrist, e.g., the body 300 may be again disposed in the flat state as illustrated in FIG. 3A.

A PCBA 330 may be formed with a flexible material or in a joint type.

Figure 5A:
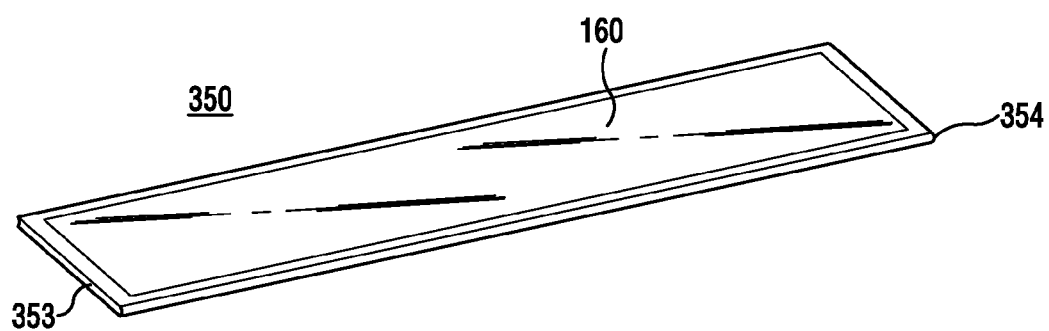
FIGS. 5A and 5B are perspective views of a flexible electronic device in a flat state and a flexible electronic device in a state worn on a wrist, according to an embodiment of the present disclosure.
Figure 5B:
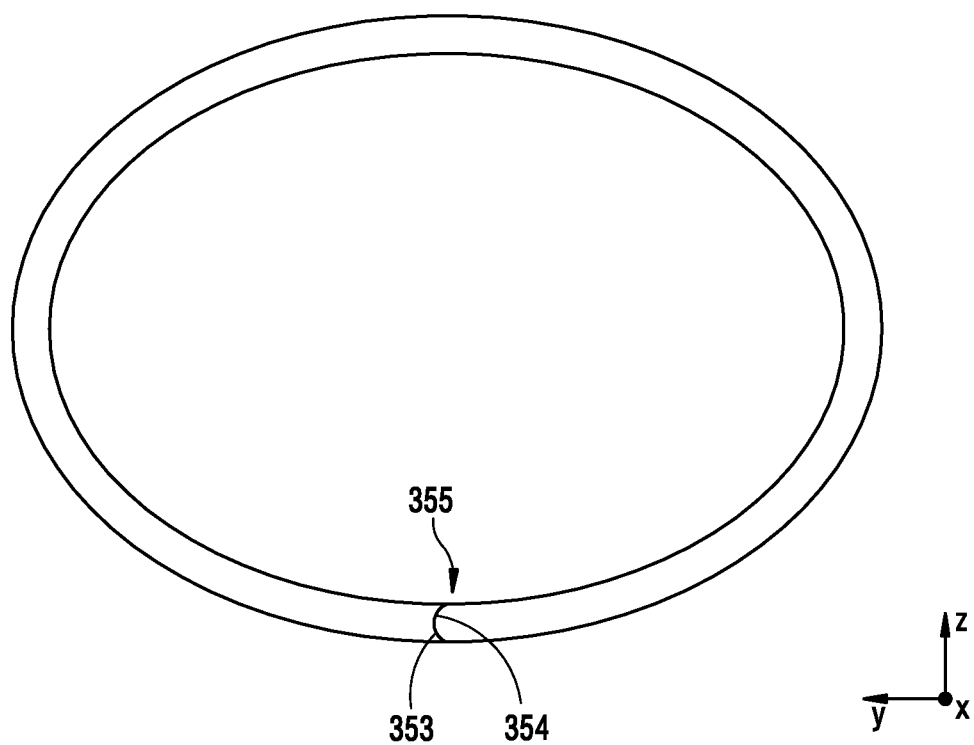

A configuration of the coupling part will be described with reference to FIGS. 5A and 5B. The flexible electronic device may include a body 350 and a coupling part 355 that couples a first end part 353 and a second end part 354 of the body 350. The coupling part 355 has a concavo-convex structure and may include a first coupling part formed on the first end part 353 and a second coupling part formed on the second end part 354. For example, the first coupling part may be formed to be concave and the second coupling part may be formed to be convex, or the second coupling part may be formed to be concave and the first coupling part may be formed to be convex.

The coupling part 355 may use a magnetic material having different polarities or provide a coupling force by using the magnetic material and a metal material. For example, when the first end part 353 includes a magnetic material of the N pole and the second end part 354 includes a magnetic material of the S pole, an attractive force is applied between the first end part 353 and the second end part 354 in a state where the flexible electronic device is worn and a coupling force between the first end part 353 and the second end part 354 may be provided. For example, when the first end part 353 includes a magnetic material of the N pole/S pole and the second end part 354 includes a metal material, an attractive force is applied between the first end part 353 and the second end part 354 in a state where the flexible electronic device is worn and a coupling force between the first end part 353 and the second end part 354 may be provided.

Figure 6A:
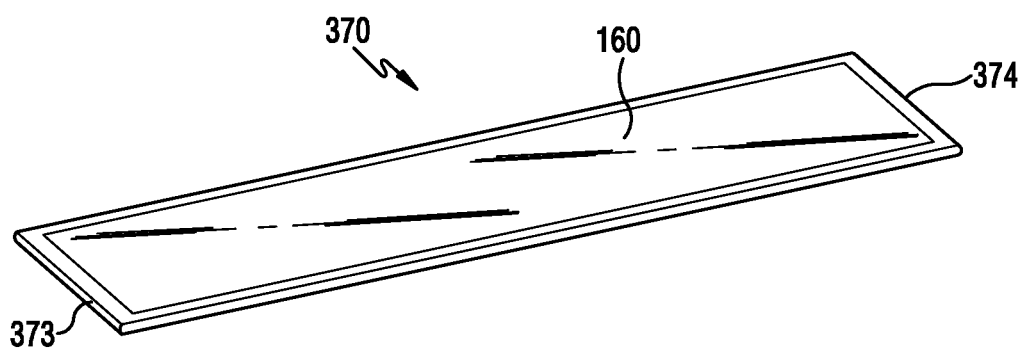
FIGS. 6A and 6B are perspective views of a flexible electronic device in a flat state and a flexible electronic device in a state worn on a wrist, according to an embodiment of the present disclosure.
Figure 6B:
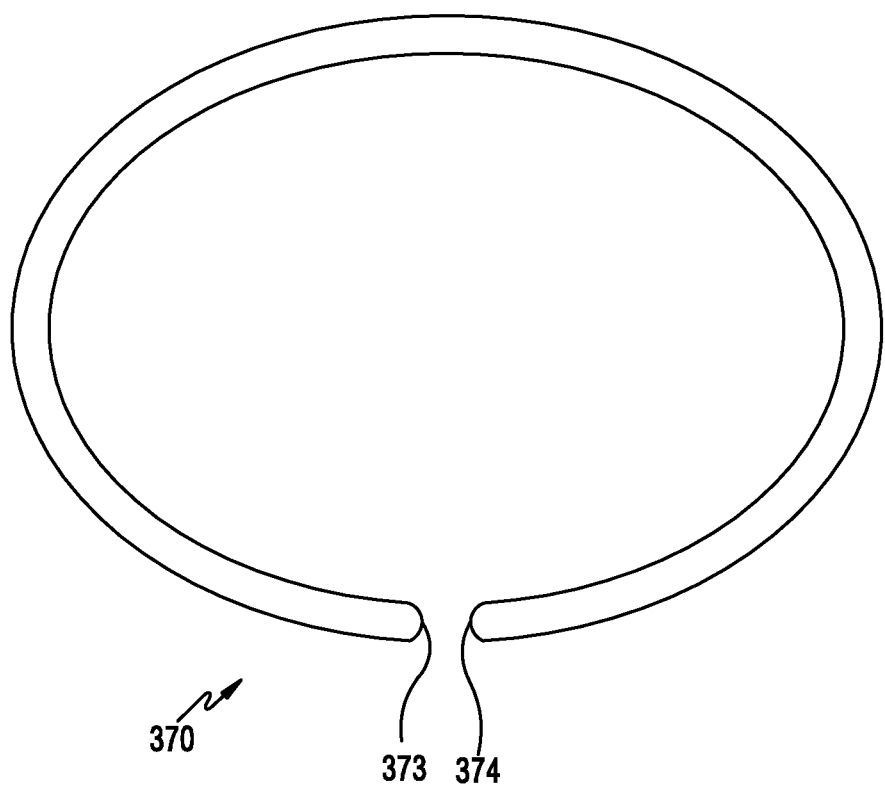

Referring to FIGS. 6A and 6B, the flexible electronic device may include a body 370, and a first end part 373 and a second end part 374 of the body 370. Unlike the previous described coupling parts, when the flexible electronic device is worn, the first end part 373 and the second end part 374 are configured to not contact each other, and the first end part 373 and the second end part 374 are configured to be adjacent to each other (FIG. 6B). When the flexible electronic device is worn, the body 370 may be worn on the wrist.

The flexible electronic device a may be implemented in various methods. Although FIGS. 3A to 6B have been described herein with the wearing state providing device 320 being formed with the flexible material (for example, the thin steel spring), a flexible electronic device which can be bent according to a user's body curve can be configured by providing a body including a plurality of connecting members and hinges for connecting the connecting members below a flexible touch screen. In this instance, a PCBA including the elements illustrated in FIG. 1 may be configured in the plurality of connecting members. Further, an electronic device which can be bent according to a user's body structure may be implemented through a body including recesses and protrusions located below a flexible touch screen.

An example where the coupling parts of the flexible electronic device are implemented as magnets has been described. However, the coupling part of the flexible electronic device may be configured in the form of a hook or a buckle. Further, the coupling part of the flexible electronic device may be configured in the form of a chain (for example, a chain of a leather watch strap). The flexible electronic device may include a coupling sensor on the coupling part or at a location adjacent to the coupling part.

Figure 7:
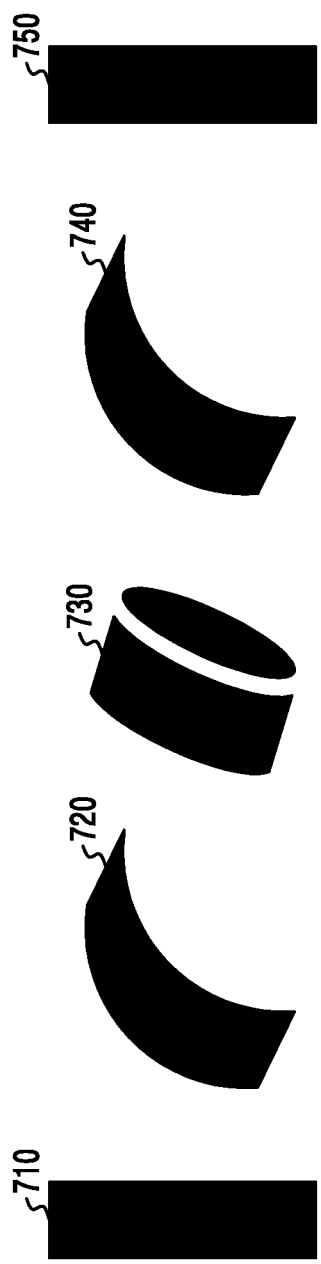
FIG. 7 is a diagram illustrating an operation of a flexible electronic device, according to an embodiment of the present disclosure.

FIG. 7 is a diagram illustrating an operation according to a state of the flexible electronic device, according to an embodiment of the present disclosure.

Referring to FIG. 7, the flexible electronic device may have a non-worn state, a worn state, and a switching state. The electronic device may switch to a worn state 730 from a non-worn state 710 via a switching state 720 as illustrated in FIG. 7. Further, the electronic device may switch to a non-worn state 750 from the worn state 730 via a switching state 740. The flexible electronic device may perform preset functions in the worn state and the non-worn state.

The electronic device may not activate a function and/or a UI in the switching state (a state where the electronic device is bent to be worn on the user's body or a state where the electronic device is still bent after the coupling of the worn electronic device is released) but may activate the function and/or the UI in a state where the switching has been made. Further, in the switching state, the electronic device may activate the function and/or the UI in advance of switching between the non-worn state 750 and the worn state 730. In the switching state 720 and/or 740, the electronic device activates a corresponding device and/or UI to perform a function (or an operation) suitable for the state after the switching. For example, when the electronic device is in a lock mode in the non-worn state, the electronic device may activate the display 160 and display a lock release window for inputting lock release information in the switching state 720. Thereafter, when the switching state transitions to the worn state 730, the electronic device is unlocked according to the lock release information input into the lock release window displayed on the display 160 and control preset functions of the electronic device. When the electronic device switches from the worn state 730 to the non-worn state 750, the electronic device may recognize the release of the wearing of the electronic device and display a home screen.

Further, when the electronic device is in the non-worn state, the electronic device performs biometric measurement, and the electronic device may activate a corresponding medical sensor in the state 720. When the electronic device contacts the body, the electronic device may measure biometric information in a stable state through the already activated medical sensor. When the electronic device switches from the worn-state 730 to the non-worn state 750, the electronic device may stop an operation of the medical sensor.

The flexible electronic device having the configuration illustrated in FIG. 1 may perform various functions. For example, the electronic device may perform a biometric measurement function, a payment function, a voice call function, a message communication function, a scheduling function, and a multimedia reproduction function. Accordingly, in order to make the electronic device perform the above various functions, the sensor unit 130 may include a medical sensor, the input unit 150 may include a pressure detection function and/or a fingerprint recognition function, and the communication unit 120 may include a communication unit for performing a payment function.

Figure 8:
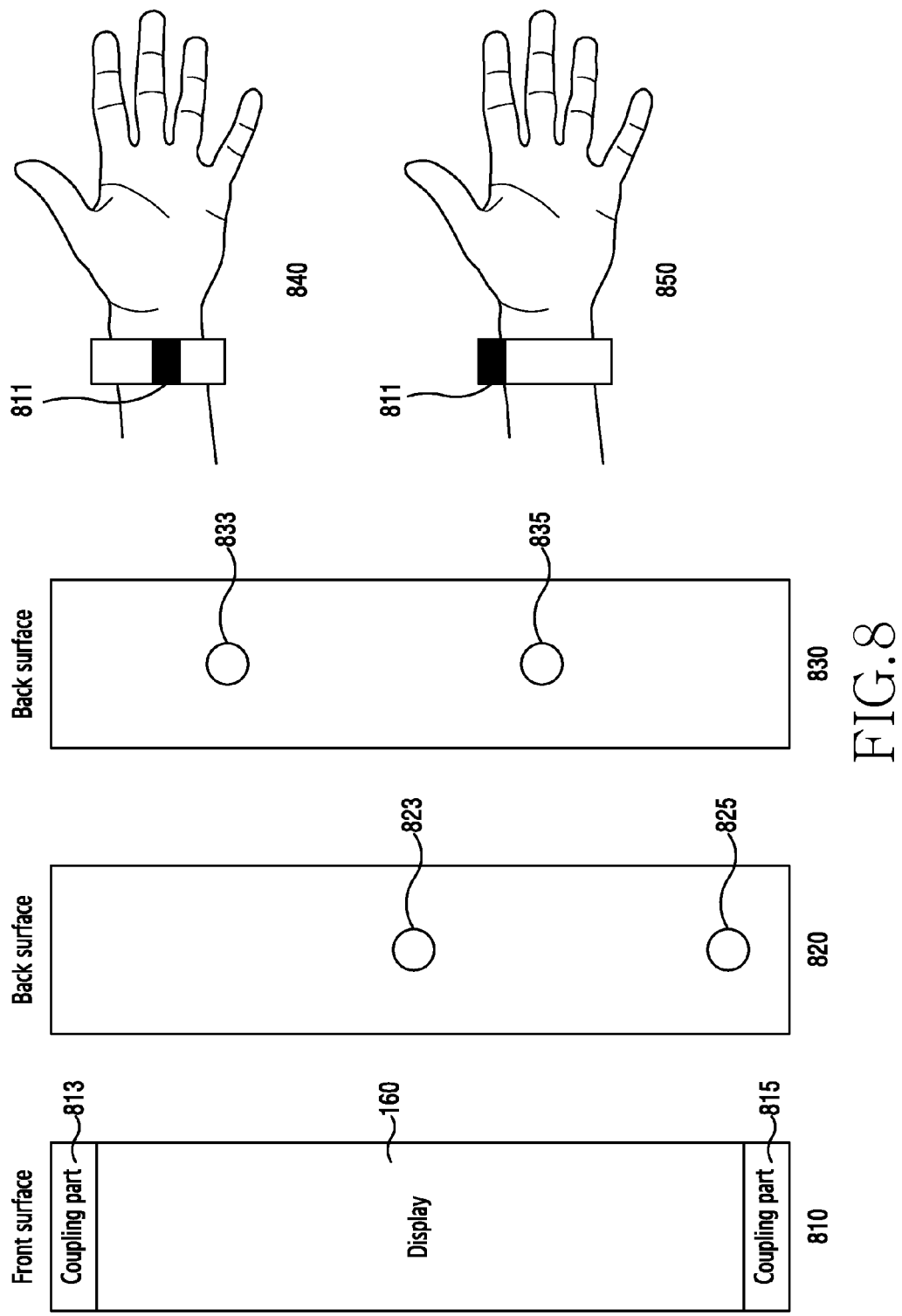
FIG. 8 illustrates a location at which a medical sensor is located in an electronic device, according to an embodiment of the present disclosure.

FIG. 8 is a diagram illustrating a location at which the medical sensor (e.g., an HRM sensor) can be located in the electronic device, according to an embodiment of the present disclosure. The medical sensor may be an HRM sensor.

Referring to FIG. 8, a front surface 810 of the electronic device may include coupling parts 813 and 815 and the display 160. Back surfaces 820 and 830 of the electronic device may have the medical sensor installed at locations 823, 825, 833, and 835. For example, the medical sensor can be placed at the center of the inside or outside of the wrist to perform a biometric measurement. When the user wears the electronic device, the coupling parts may be located at the center of the inside of the wrist (inner side of the wrist) or the outside (outer side of the wrist in the same direction as the back of the hand); this may be similar to wearing a wrist watch. The medical sensor may be installed at one or more of the center 823 of the back surface of the display 160 or at the location 825 of the coupling part. The electronic device may include devices such as a PCBA, key buttons, and/or sensors in the coupling parts. The user may wear the electronic device such that the coupling parts are placed in a direction (for example, direction of the edge of the hand) other than the center of the wrist as indicated by reference numeral 850. The medical sensor may be installed at the locations 833 and/or 835 as indicated by reference numeral 830.

As described above, the medical sensor may be installed on the back surface of the electronic device. Further, the medical sensor may be placed at the center of the inside or outside of the wrist when the user wears the electronic device.

Figure 9A:
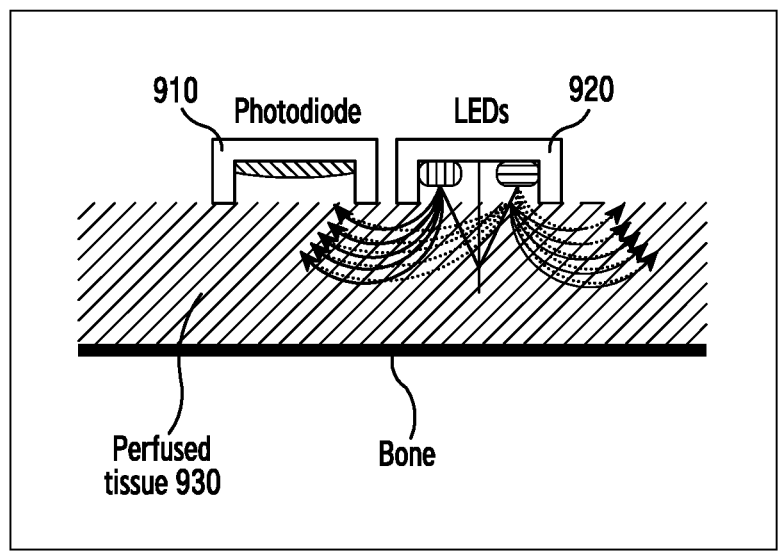
FIG. 9A is a diagram illustrating a heart rate monitoring (HRM) sensor of an electronic device, according to an embodiment of the present disclosure.
Figure 9B:
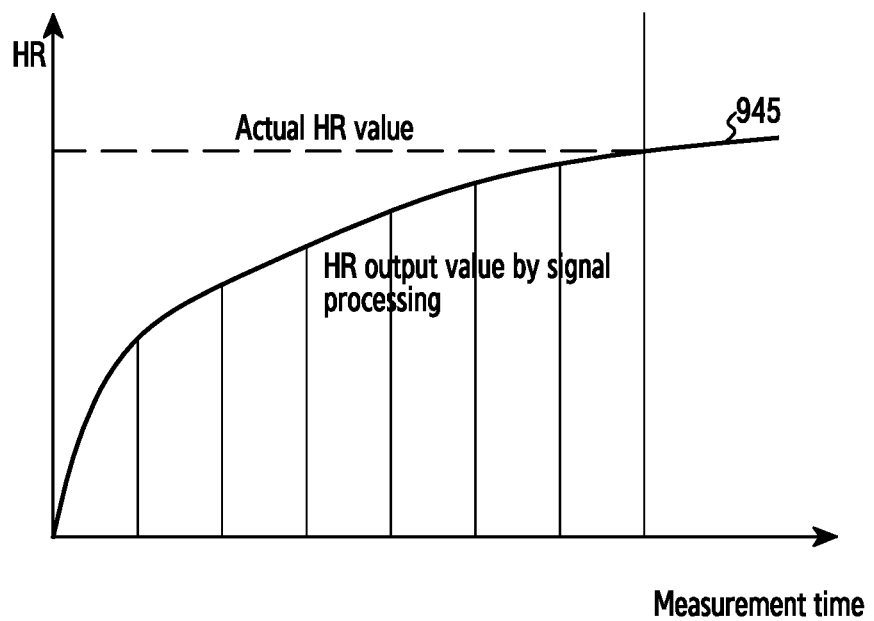
FIG. 9B is a graph of an output of the HRM sensor vs, time, according to an embodiment of the present disclosure.
Figure 9C:
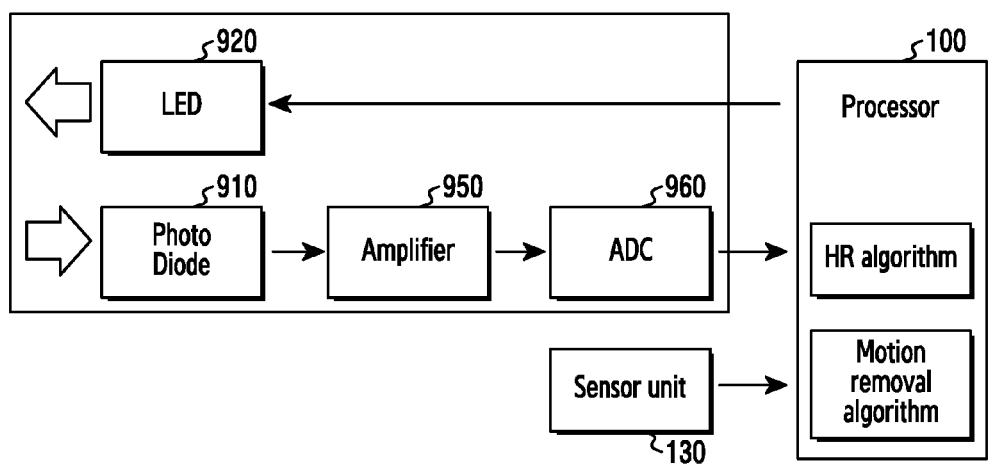
FIG. 9C is a diagram illustrating the components of an HRM sensor of an electronic device, according to an embodiment of the present disclosure.

FIG. 9A is a diagram illustrating an HRM sensor of an electronic device, according to an embodiment of the present disclosure, FIG. 9B is a graph of an output of the HRM sensor vs, time, according to an embodiment of the present disclosure, and FIG. 9C is a diagram illustrating the components of an HRM sensor of an electronic device, according to an embodiment of the present disclosure.

Referring to FIGS. 9A to 9C, through repetition of heart contraction and relaxation, a blood flow rate of peripheral blood vessels changes and a volume of blood vessels changes. The HRM sensor may measure a penetration amount of light according to the change in the blood vessels and display the heart beat with a waveform. That is, the HRM sensor may execute photoplethysmography (PPG), and the PPG may be used for measuring a change of blood within blood vessels and oxygen saturation.

The HRM sensor may include an LED 920 and a light receiving diode 910 (FIG. 9A). Further, the user may execute the PPG after bringing the HRM sensor into contact with a body part (for example, the wrist). The HRM sensor may perform biometric measurement (for example, a blood flow rate, a heart rate, oxygen saturation, and the like). When a biometric measurement mode is executed, light radiated from the LED 920 of the HRM sensor is widely spread while being diffused and/or distributed via several media 930 of the body, and the diffused and/or distributed light may be detected through the light receiving diode 910 (for example, a photo diode).

The HRM sensor may measure a change in the body (for example, a heart rate and the like) based on a change in that, during a contraction period, blood in the blood vessel increases and appears darker and during a relaxation period, blood in the blood vessel decreases and appears lighter according to the heartbeat. For example, while light received by the light receiving diode is relatively small in the contraction period, received light is relatively large in the relaxation period. The sensor may analyze a change of the light by searching for a least bright point and measure a change frequency in values greater than or equal to a particular threshold value. Further, a heart rate may be calculated using the number of beats per hour (or the number of beats measured per second) according to a result of the measurement.

In initial driving, the HRM sensor may output a measurement value different from the user's heart rate (actual heart rate). The HRM sensor may output a result value different from an actual HR value of the user during a time interval (initial driving time) in which the operation of the HRM sensor is stabilized as indicated by a reference numeral 945 (FIG. 9B). When the user wears the electronic device in the biometric measurement mode, the electronic device may prepare a biometric measurement operation by activating the HRM sensor in advance and perform the biometric measurement through the already activated HRM sensor after the wearing of the electronic device, so that the biometric measurement operation in initial driving may be stabilized.

Referring to FIG. 9C, a configuration for controlling the HRM sensor may include an optical unit including the light emitting diode 920 and the light receiving diode 910, an amplification unit 950 for amplifying a signal sensed by the optical unit, and a signal processing unit including an Analog to Digital Converter (ADC) 960 for converting an signal into digital data. The optical unit may include one light receiving diode and one or more light emitting diodes. For example, the optical unit may include a photo detector, an IR LED, and a red LED, include a photo detector and a green LED, or include a photo detector, an IR LED, a red LED, and a green LED. When a plurality of LEDs are used, oxygen saturation may be measured. Further, the electronic device may include the sensor unit 130 (for example, an acceleration sensor) for providing information on a device motion and the processor 100 for measuring and analyzing biometric information by analyzing an output of the signal processing unit and an output of a motion detection unit. The acceleration sensor may use an acceleration sensor with 3 or more axes. The processor 100 may include a motion removal algorithm and an HR calculation algorithm.

In an HR measurement operation, light output from the light emitting diode 920 of the HRM sensor may be transferred to the user's skin 930. Further, the light transferred to the skin 930 is diffused and/or distributed through the medium of the skin, and the diffused and/or distributed light may be detected by the light receiving diode 910 of the HRM sensor. The light detected by the light receiving diode 910 (the photo detector) may be amplified through the amplification unit 950, converted into digital data by the ADC 960, and transferred to the processor 100. The processor 100 may measure the HR while compensating for a motion component detected by an acceleration sensor.

A PPG signal output from the HRM sensor may be input in a peak to peak Interval (PPI) form. The processor 100 may remove noise (for example, noises caused by lighting) included in the converted PPG digital data, remove an influence of a motion by the output of the acceleration sensor, and then process the HR value. The HRM sensor may measure the HR by using the PPG. In an HR measurement mode, the electronic device may provide, as an output, an HR value measured before stable HR values are acquired and provide, as an output, a corresponding value when the stable HR value is acquired.

A fingerprint sensor which may be included in the flexible electronic device will be described.

The fingerprint recognition sensor may be a capacitive arrange sensor (for example, an Authentec™ sensor) for recognizing a fingerprint that contacts a silicon chip in a fingerprint size, an optical array sensor for recognizing a fingerprint by using total reflection of light incident to a prism from a light source, a thermal array sensor for measuring a temperature of a finger when a fingerprint contacts the sensor and recognizing the fingerprint by using a change according to a temperature difference, a CCD/CMOS sensor for acquiring an image of a fingerprint contact part that contacts the sensor, and an ultrasonic sensor for converting a sound wave reflected by projecting ultrasonic waves on a finger on a contact surface into an electric signal and acquiring a fingerprint image. However, in such a fingerprint recognition method, the finger should contact an electrode or a flexible printed circuit board (FPCB) type module may be used.

The wearable electronic device may recognize a fingerprint while the user wears the electronic device. Accordingly, it may prove advantageous that the fingerprint recognition sensor is installed at a location of the touch screen sensor where the user can make an easy touch.

In general, the touch panel may be combined with a display such as an LCD or an OLED and may be a device for generating a finger or pen touch (or hovering) input while the user views the screen. Further, it is possible to enhance a security function through the fingerprint recognition sensor installed on the touch panel. When the fingerprint recognition sensor is included in the touch panel, an Indium Tin Oxide (ITO) having a high penetration ratio may be used to not hide a screen content displayed through the display of the touch panel. However, a width of an electrode for fingerprint recognition should be considerably smaller than a width of an electrode of the existing touch panel and should be smaller than an interval of valleys and ridges of the fingerprint, and thus, as a result, electrode resistance becomes dozens of times larger compared to the touch panel. Further, when a sensor which can recognize a fingerprint through an ITO is arranged within a touch panel, it may prove advantageous that the sensor be put on the touch screen, so that a penetration of the screen deteriorates.

Accordingly, when the wearable electronic device including the touch screen sensor having the touch panel and the display are integrally formed with each other, it may prove advantageous to implement a touch panel which may simultaneously detect a general touch (hovering) input and a fingerprint input. To this end, the electronic device may form electrodes of the touch panel by depositing a metal wire on a black matrix line area between pixels of the display panel, thereby implementing the touch sensor having a high resolution while not hiding the pixels.

Figure 10A:
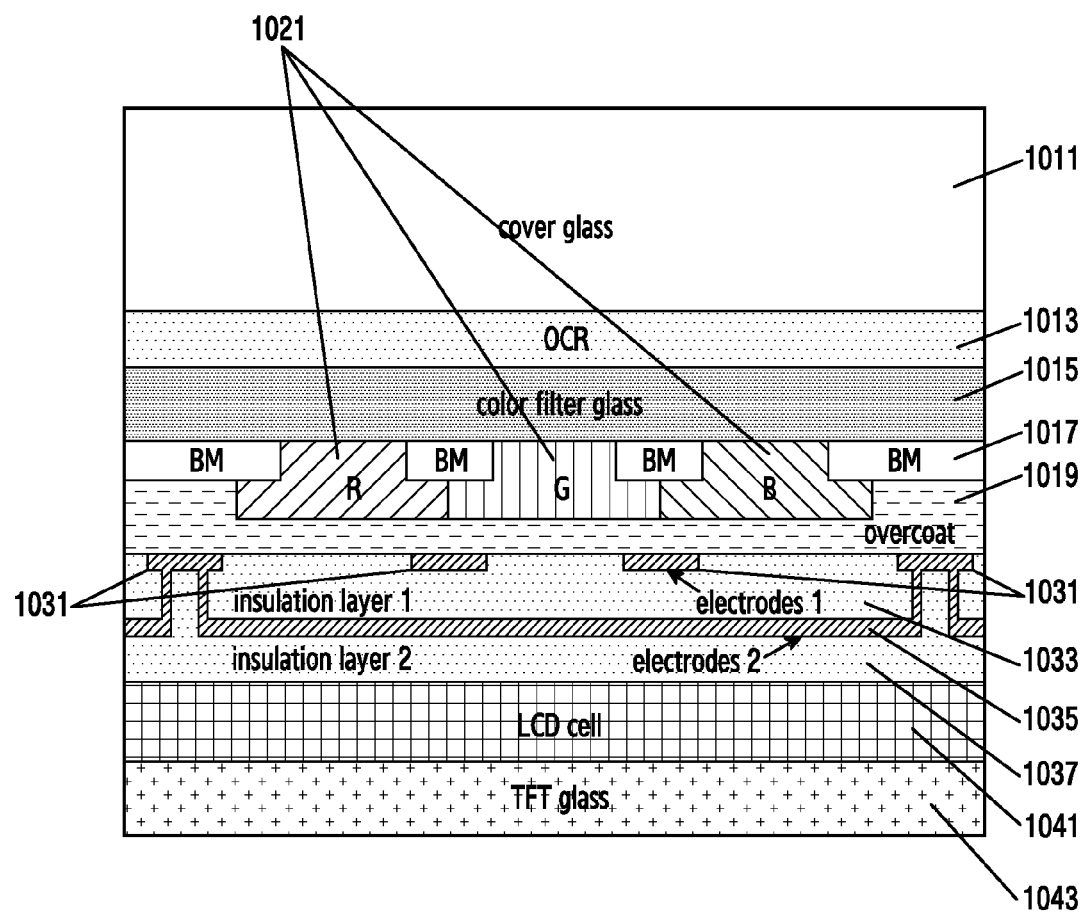
FIG. 10A is a diagram of an electrode structure of a touch screen sensor including a fingerprint recognition sensor included in a flexible electronic device, according to an embodiment of the present disclosure.
Figure 10B:
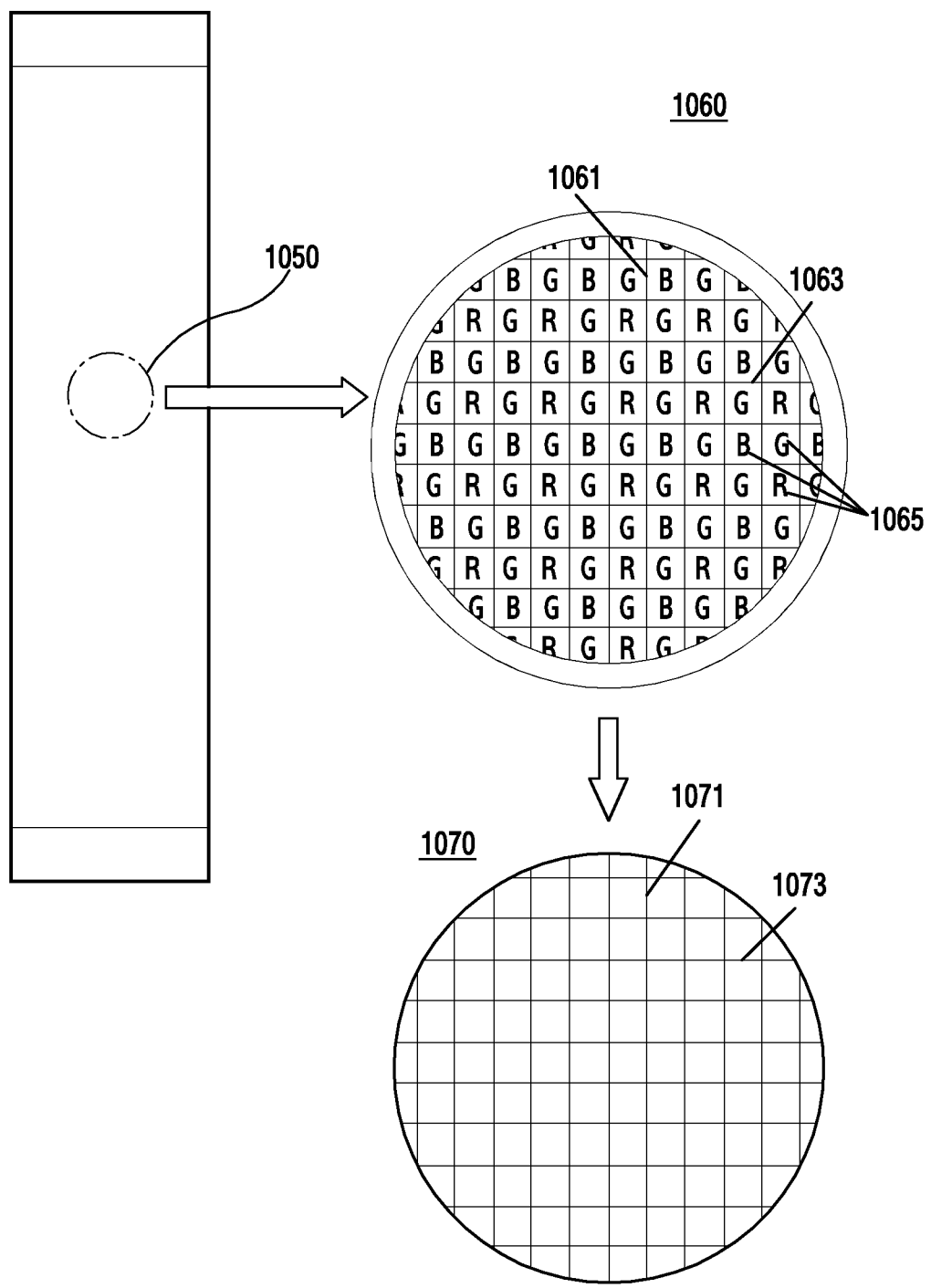
FIG. 10B is a diagram illustrating a structure of a color filter and a black matrix of a screen sensor, according to an embodiment of the present disclosure.

FIG. 10A is a diagram of an electrode structure of the touch screen sensor including the fingerprint recognition sensor in the flexible electronic device, according to an embodiment of the present disclosure. FIG. 10B is a diagram illustrating a structure of a color filter and a black matrix of the screen sensor, according to an embodiment of the present disclosure.

Referring to FIGS. 10A to 10B, the fingerprint detection method using the touch sensor may be implemented in a swipe type or a fixed area type. The swipe type may correspond to a method of dragging a predetermined location of the screen with a finger. The swipe type sequentially recognizes the finger (that is, its fingerprints) dragged on one-dimensionally or linearly arranged touch sensor electrodes and then combines the recognized fingerprints into a two-dimensional fingerprint image through post-processing. Further, the fixed area type may be a method of acquiring a two-dimensional fingerprint image while the finger is on the two-dimensionally arranged touch sensor. Accordingly, in the touch sensor for recognizing the fingerprint, electrodes may be arranged in one or two-dimensions.

The touch screen sensor having the input unit 150 (for example, the touch sensor) and the display 160 integrally formed with each other may include a fingerprint recognition sensor. The touch screen sensor may arrange a touch sensor array between a pixel cell array and a color filter array. At this time, the pixel cell array may include an LCD cell, an OLED cell, or an LED cell. FIG. 10A illustrates a case where the pixel cell array includes the LCD cell.

FIG. 10A illustrates an electrode structure of the two-dimensionally arranged touch sensor. As illustrated in FIG. 10A, sensor electrodes 1031 and 1035 within the screen may be arranged between an LCD cell 1041 and a color filter glass 1015. The LCD cell 1041 may be a part where liquid crystal is located between a TFT glass 1043 of the LCD and a color filter glass 1015. The electrodes of the touch sensor may be arranged using a method of depositing metal electrodes on the LCD cell 1041 and below the color filter glass 1015. The color filter glass 1015 may be arranged below a cover glass 1011 and an OCR (optical clear resin) 1013. The color filter 1021 may include R, G, and B filters, and may have a structure separated by a black matrix (BM) 1017. The BM 1017 may form a gap between the RGB color filters 1021 and may correspond to black materials injected into the gap. The BM 1017 may improve contrast by absorbing reflection of external light of the screen sensor and removing interference between colors. The electrodes 1031 and 1035 of the touch sensor may be arranged between the color filter 1021 and the LCD cell 1037 and may have the same matrix structure below the BM 1017. A width of the electrode may be equal to or (slightly) less than a width of the BM 1017, so that the user may not recognize the sensor electrode when viewing the screen.

In FIG. 10A, the LCD cell 1041 may include pixel electrodes, gate lines and data lines for driving the pixel electrodes, and liquid crystal. Further, the touch sensor array may include a first electrode 1031 and a second electrode 1035 for detecting a touch, a first insulation layer 1033 for insulating the first and second electrodes, and a second insulation layer 1037 for insulating the second electrode 1035 and the LCD cell 1041. The color filter array may include the color filters 1021 for expressing pixels by the pixel array and the BMs 1017 for expressing pixels by forming a gap between the color filters.

The electrodes 1031 and 1035 of the touch sensor can be formed with two-layered metal electrodes 1031 and 1035 for a two-dimensional electrode structure, two-layered insulation layers 1033 and 1037 may be arranged for insulation between the electrodes 1031 and 1035. The first insulation layer 1033 may perform a function for insulation between the first electrode 1031 and the second electrode 1035, and the second insulation layer 1037 may perform a function of separation between the second electrode 1035 and the LCD cell 1041. Through a hole formed on the first insulation layer 1033 between the two electrode layers including first electrode 1031 and the second electrode 1035, a part of the two electrode layers needed to be connected to each other may be connected according to a configuration of the electrodes.

FIG. 10B illustrates an electrode configuration of the touch sensor arranged in the touch screen sensor.

Referring to FIG. 10B, a structure 1060 corresponds to an expansion of a partial screen 1050 of the display 160. A reference numeral 1065 of the screen 1060 may represent the color filter 1021, and BM lines 1061 and 1063 are gaps between the color filters 1021 filled with black materials. Further, the BM line 1061 may be a BM line arranged in a column line (vertical line), and the BM line 1063 may be a BM line arranged in a row direction (horizontal direction). The electrodes of the touch sensor may be arranged to have the same array as that of the BM lines as indicated by reference numeral 1070. That is, as illustrated in FIG. 10A, the electrode 1071 may be located below the BM lines 1061 and the electrodes 1073 may be located below the BM lines 1063. Widths of the electrodes 1071 and 1073 of the touch sensor may be smaller than widths of the BM lines 1061 and 1063.

As described above, in the touch screen sensor device, the color filter array may include the color filters 1021 arranged in an entire area of the screen, and the BM lines arranged in the column direction and the BM lines arranged in the row directions, which are formed as gaps between columns and rows of the color filters 1021. Further, the touch sensor array may include the electrodes 1031 and 1035 arranged to overlap the array of the row and column BMs below the color filters 1021. Assuming that the column direction is a first direction and the row direction is a second direction, the first electrode 1031 may be arranged below the first BM line 1061, the second electrode 1035 may be arranged below the second BM line 1063, and the first electrode 1031 and the second electrode 1035 may have sizes smaller than the widths of the BM lines 1061 and 1063.

Since the first electrode 1031 and the second electrode 1035 have a structure in which they are orthogonal to each other as indicated by reference numeral 1070 of FIG. 10B, the first electrode 1031 and the second electrode 1035 can be configured in two dimensions. The first insulation layer 1033 may be formed between the first electrode 1031 and the second electrode 1035 and the second insulation layer 1037 may be formed between the second electrode 1035 and the LCD cell 1037. The first electrode 1031 and the second electrode 1037 may be formed by depositing metal wires parallel to the BMs 1017, while having sizes to not hide the color filters 1021.

Figure 11A:
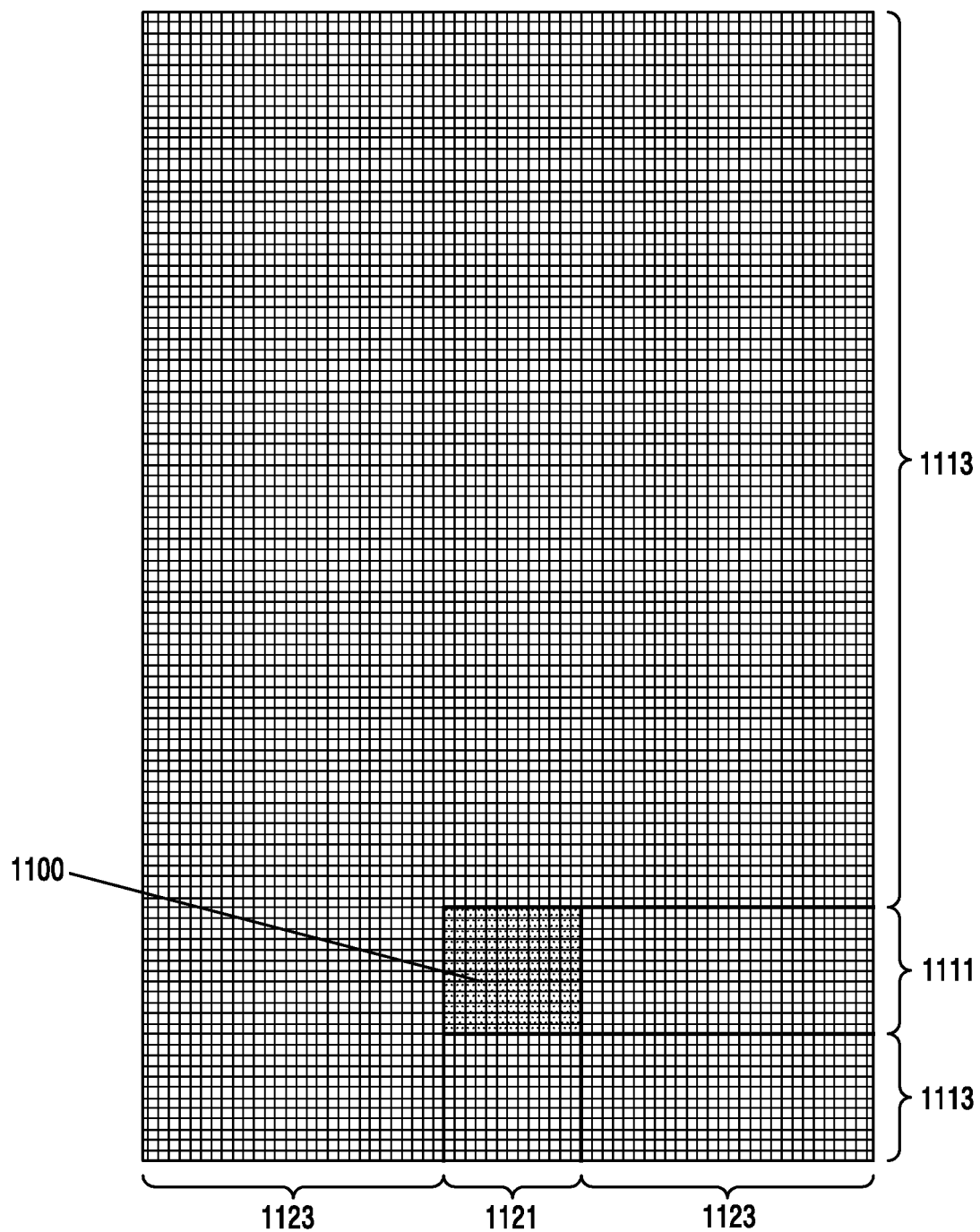
FIGS. 11A to 11C are diagrams illustrating a fingerprint recognition location in a touch screen sensor, according to an embodiment of the present disclosure.
Figure 11B:
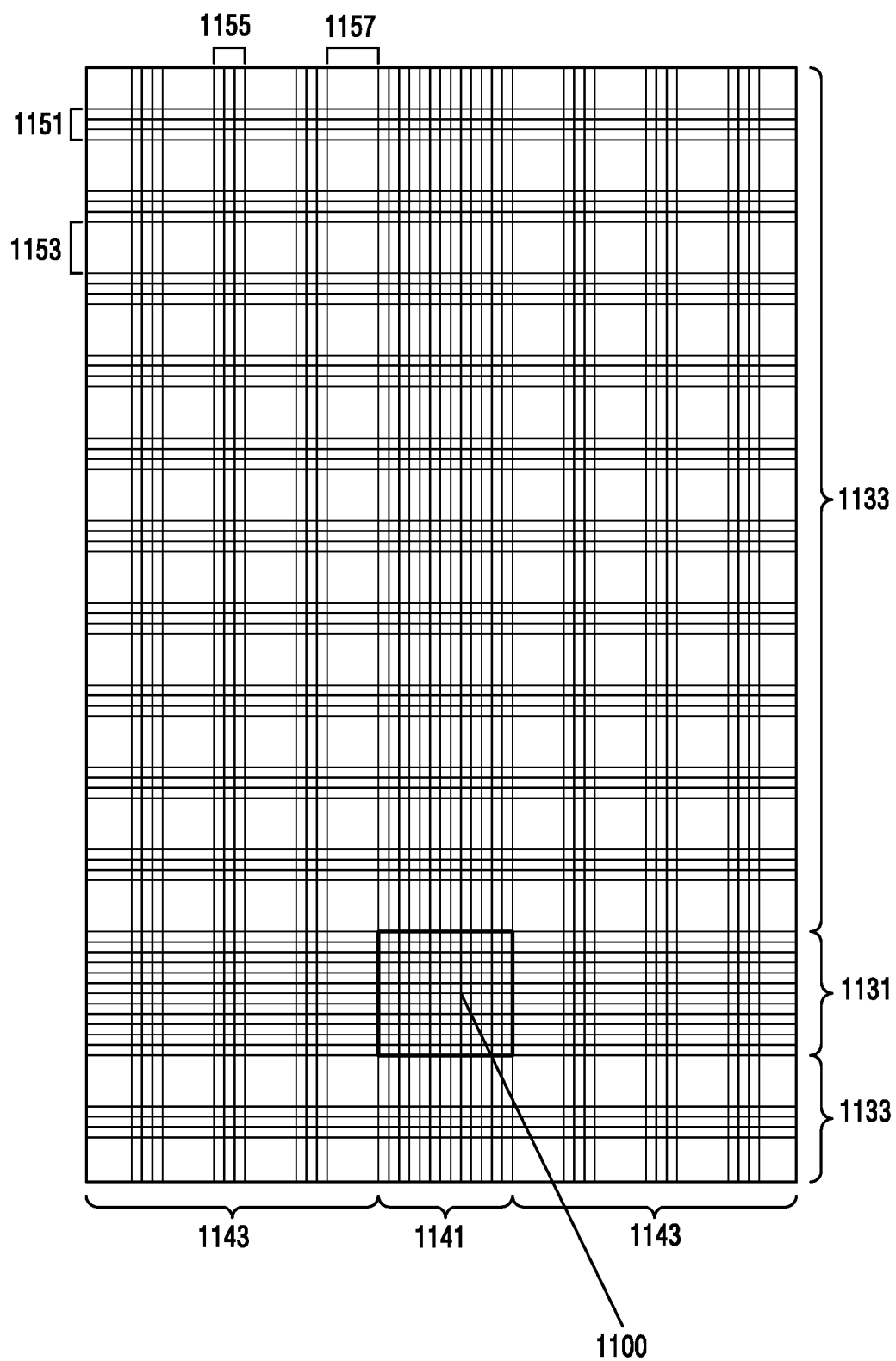
Figure 11C:
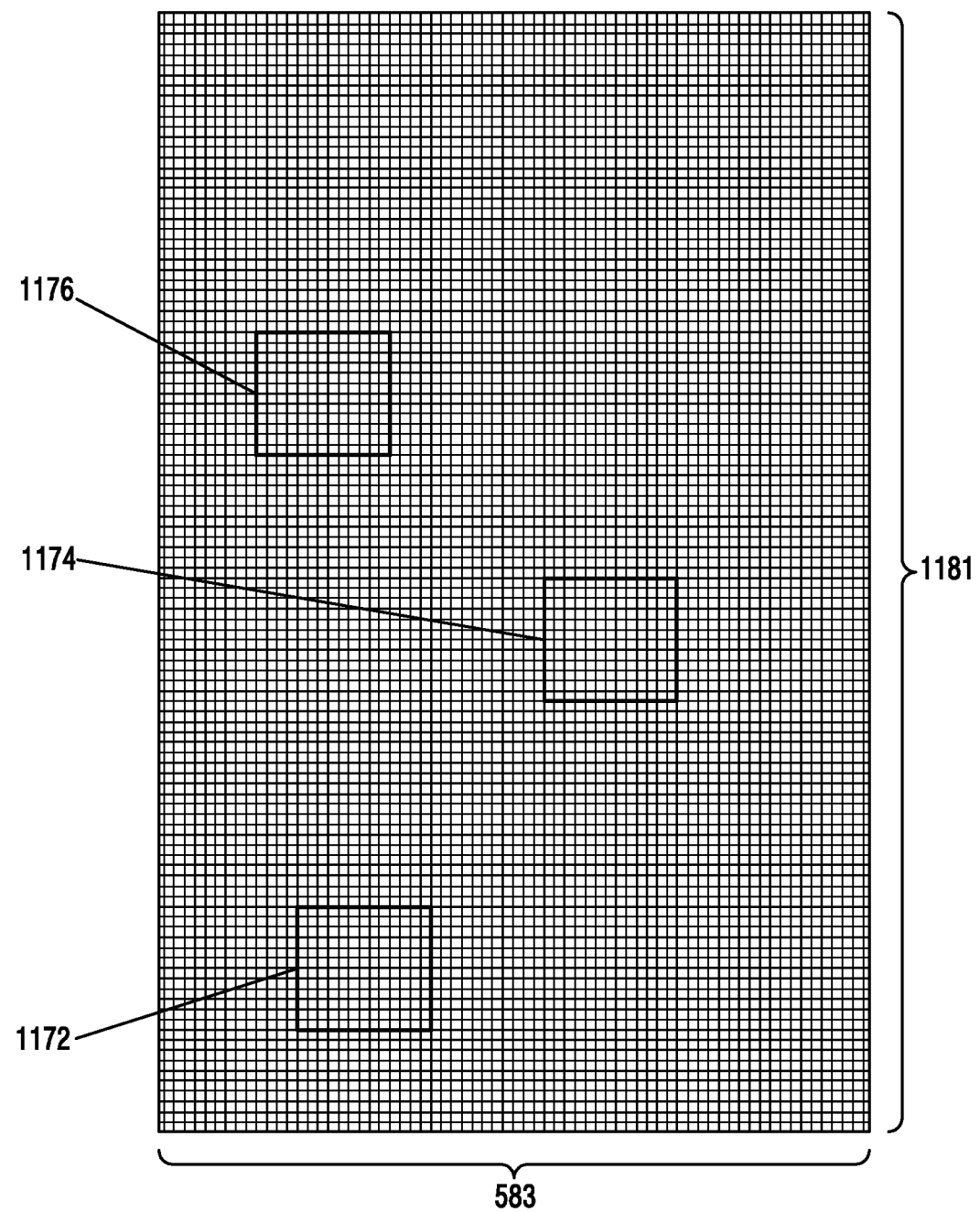

FIGS. 11A to 11C are diagrams illustrating a fingerprint recognition location in the touch screen sensor, according to an embodiment of the present disclosure.

When a fingerprint is recognized through the touch sensor, electrodes of the touch sensor may be configured in an x-y grid type as indicated by reference numeral 1070 of FIG. 10B. When fingerprint recognition is performed using the touch sensor, the touch sensor may arrange the electrodes at predetermined intervals smaller than valleys and ridges of the fingerprint; this means that hundreds of electrodes cross within a contact area of the finger (for example, 10 mm×10 mm). As the number of pixels of the screen increases, an interval between the pixels or an interval of the electrodes formed on the BM is less than or equal to dozens of micro meters, and thus the touch screen sensor may have an interval sufficient to perform the fingerprint recognition. However, as the density of the electrodes of the touch sensor for the fingerprint recognition increases, the number of wires for connecting the electrodes to the processor 100 (for example, a sensor controller for controlling the touch sensor) also increases, and thus a proper wire arrangement can be possible.

The fingerprint recognition location may be fixed as illustrated in FIGS. 11A and 11B or may be an entire area of the touch sensor as illustrated in FIG. 11C.

Referring to FIG. 11A, when the fingerprint recognition is performed, the electrodes of the touch sensor should be arranged at an interval smaller than an interval of the fingerprint ridges and valleys. Accordingly, it is possible to minimize the increase in the number of electrodes and electrode wires required for the fingerprint recognition by fixing the area 1100 for the fingerprint recognition and arranging the electrodes with the density required for the fingerprint recognition within only the fixed area 1100. The electrodes of the touch sensor for the fingerprint recognition may be arranged with the pixel density (resolution) in the entire screen or arranged with the pixel density within only the fixed area.

In FIG. 11A, the area 1100 may be a fixed area for the fingerprint recognition, an area where the electrodes of the touch sensor are equally arranged with the pixel density, or an area of the display 160 where the fingerprint recognition is possible. Reference numeral 1111 represents a drive line (for a sensing line for sensing a drive signal) for driving a signal to scan whether a touch is made in the area 1100, and reference numeral 1121 represents a sensing line (or a drive line) for sensing whether a touch is made in the area 1100. The drive line may also be referred to as a drive channel or a scan port. The sensing line may also be referred to as a sensing channel or a sensing port. Areas other than the area 1100 may have the same electrode density of the touch sensor as that of the area 1100, but may be connected to the processor (or the sensor controller) by tying several electrodes in a routing step. That is, in FIG. 11A, areas other than the area 1100 may be areas for detecting a finger and/or pen touch and may use the drive lines and sensing lines while skipping by the unit of predetermined electrodes without using all the drive lines 1113 (or sensing lines) and the sensing lines 1123 (or drive lines). For example, the processor 110 may apply drive signals to N electrode lines while interlacing the lines (that is, skipping non-used lines) in the unit of M first electrodes when the electrode lines 1113 are used as the drive lines, and detect X second electrode lines used as the sensing lines while interlacing the lines (that is, not detecting the drive signals) in the unit of Y second electrode lines, which are not used as the sensing lines, when the electrodes 1123 are used as the sensing lines.

Accordingly, when the fixed area is used to recognize the fingerprint as illustrated in FIG. 11A, the fingerprint recognition is performed by allowing the electrodes located in the area 1100 to operate as an individual channel and electrodes in the remaining areas may be used as the drive line and the sensing line for detecting finger and/or pen touch inputs while interlacing the electrodes in the unit of preset electrode lines.

The fingerprint recognition may be performed in a step for an authentication to unlock the screen and a security authentication such as payment and may be used at limited times and steps instead of being used continuously like finger and/or pen touches. Accordingly, the fingerprint recognition area may be restrictively designated at a natural location on the screen in consideration of the UI as illustrated in FIG. 11A.

FIG. 11B illustrates another structure of the touch sensor having the fixed fingerprint recognition area 1100.

Referring to FIG. 11B, a particular area of the touch sensor may be fixed as the fingerprint recognition area 1100. The fixed fingerprint recognition area 1100 may be a location where the electrodes of the touch sensor are arranged with the same density as the pixel density and fingerprint recognition can be performed on the screen. Reference numeral 1131 represents a drive line (or a sensing line) for scanning whether a touch is made in the area 1100, and reference numeral 1141 represents a sensing line (or a drive line) for detecting whether a touch is made in the area 1100. The number of drive lines and sensing lines may be the number of first and second electrodes existing in the area 1100.

Areas other than the area 1100 may be areas for detecting finger and/or pen touches and may be configured with a density different from the density of the area 1100 and the electrodes of the touch sensor. Accordingly, when the electrodes of the touch sensor are configured, the first electrodes and the second electrodes may be arranged with the size and at intervals by which the finger and/or pen touches can be detected, and electrodes may not be arranged in the other areas. In this case, the areas 1151 and 1155 may be areas where the electrodes of the touch sensor are arranged, and areas 1153 and 1157 may be areas where the electrodes of the touch sensor are not installed. That is, in the areas except for the fingerprint recognition area 1100, the first and second electrodes may be arranged in intervals of the area 1151 (for example, intervals of N electrodes) and the area 1155 (for example, intervals of X electrodes) while interlacing the area 1153 (for example, intervals of M electrodes) and the area 1157 (for example, intervals of Y electrodes) in the unit of intervals, and the controller 100 may apply drive signals to scan for the areas 1151 and 1155 and detect drive signals. When a drive and detection operation is performed through the lines of the area 1151 and the area 1155, the controller 100 may use all the lines or use only one or more lines among the lines. Here, the number of electrodes arranged in the areas 1151 to 1157 may be variously set as N≠M≠X≠Y, N=X or M=Y, and N=M=X=Y.

FIG. 11C illustrates an electrode array in which an entire area of the touch sensor can be used as a fingerprint recognition area and a finger and/or pen touch area.

Referring to FIG. 11C, electrodes arranged in the entire area of the touch sensor may be arranged with the same density as the pixel density. Further, the controller 100 may perform a drive and detection operation of all electrodes arranged in the entire area of the touch sensor. In this case, the processor may randomly determine a location for the fingerprint recognition unlike FIG. 11A and, accordingly, the fingerprint recognition can be performed at a random location on the entire screen. That is, in FIG. 11C, an arrangement of the sensor electrode for the fingerprint recognition within the screen may be the same as illustrated in FIG. 11A, and the processor may connect wires to drive and detect the entire area of the touch sensor. As illustrated in FIG. 11C, the fingerprint recognition can be performed in any area (for example, areas 1172, 1174, and 1176).

The fingerprint recognition can be used only when the electronic device is initially driven or a security authentication is required. Accordingly, the processor may identify an application (for example, a pay application) that requires fingerprint recognition and an application that does not require fingerprint recognition. Therefore, the electronic device may recognize the fingerprint by driving and detecting all electrodes of the touch sensor at a fingerprint recognition time point, and perform a drive and detection operation by tying several electrodes at a location where a contact of a large scale object (a finger and/or a pen) is recognized in an interval where fingerprint recognition is not required such as the drive and detect operation of FIGS. 11A and 11B.

As illustrated in FIGS. 11A to 11C, the electrodes of the touch sensor may be arranged with the same density as the pixel density or only some areas may be equally arranged, and a method of recognizing fingerprint may be fixed or variable.

Figure 12A:
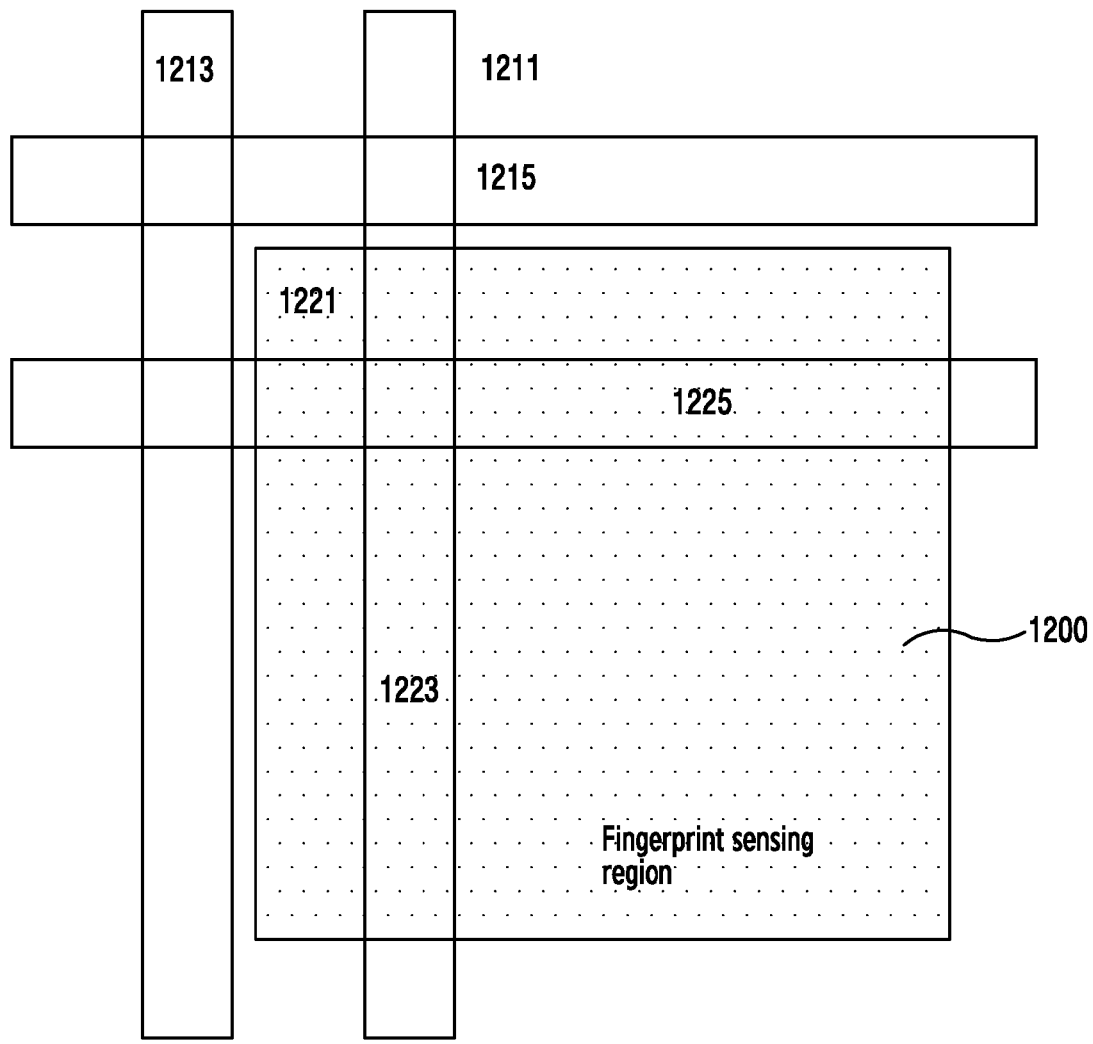
FIG. 12A is a diagram illustrating a function of electrodes of a fingerprint recognition area within a screen, according to an embodiment of the present disclosure.

FIG. 12A illustrates a function of electrodes of a fingerprint recognition area 1200 within the screen.

Referring to FIG. 12A, the fingerprint recognition area 1200 may recognize all of a fingerprint and a finger/pen touch. When the fixed fingerprint recognition area 1200 is used, the touch sensor may be configured to detect only the finger/pen touch in the remaining areas except for the fingerprint recognition area 1200. Accordingly, the touch sensor may include an area 1211 which is not used as the electrode, a vertical electrode (for example, second electrode) area 1213, a horizontal electrode (for example, first electrode) 1215, an electrode 1221 dedicated for fingerprint recognition, a vertical electrode 1223 for both the fingerprint and the finger/pen, and a horizontal electrode 1225 dedicated for the fingerprint and the finger/pen.

The sensor electrodes in the fingerprint recognition area illustrated in FIG. 12A may be divided into seven areas according to functions thereof. The area 1211 may be an empty part where there is no electrode in the BM part of the pixel. The area 1213 and 1215 may be the electrodes outside the fingerprint recognition area. At this time, the area 1213 may be a part in which electrodes formed along the BM of the pixel are tied into and operate as one electrode and correspond to a sensor electrode for recognizing the finger/pen touch. The area 1215 may be a part in which the same function as that of the area 1213 is performed and correspond to a horizontal direction electrode.

The area 1221 may be a part in which the horizontal and vertical direction electrodes are formed as the area dedicated for the fingerprint recognition and correspond to an area in which electrode lines are individually driven. The area 1223 may be an area in which an operation may be switched to recognize a large object such as a finger after fingerprint recognition ends within the fingerprint recognition area 1200. The electrode lines may individually operate like the area 1221 when the fingerprint recognition is progressed, but the electrodes may be combined into and operate as one electrode when the finger is recognized. Further, when an operation is switched to the fingerprint recognition or finger recognition, a switch within the processor (or sensor controller) may be used. The area 1225 may be an area in which the same function as that of the area 1223 is performed. The area 1223 may be a vertical direction electrode and the area 1225 may be a horizontal direction electrode.

Wires of the horizontal direction electrodes of the fingerprint recognition area may be connected in a vertical direction in which the sensor electrode is not installed. For example, in a wiring method of electrodes dedicated for the fingerprint recognition in the fingerprint recognition area, the wires may be extracted in a horizontal direction and then connected in a vertical direction (that is, areas where the vertical electrodes are not installed) outside the screen.

When the electrodes are arranged as illustrated in FIG. 12A, wiring between the electrodes and the processor may become long. For example, when it is assumed that the number of channels for detecting the finger/pen touch in the entire area of the touch sensor is 86*54, the processor requires 140 channels to detect whether the finger/pen touch of the touch sensor is performed. However, when it is assumed that an area for fingerprint recognition is 10.7 mm*10.7 mm and when the number of channels for fingerprint recognition (that is, the number of horizontal and vertical electrodes) is 160*160, the processor requires a total of 320 channels to recognize the fingerprint in the fingerprint recognition area. Accordingly, when the number of channels for interfacing with the electrodes arranged in the fingerprint recognition area becomes large, wiring for the interface between the processor 100 and the touch sensor corresponding to the input unit 150 may be complex. The fingerprint recognition area may be close to a sensor interface unit that interfaces the processor 100 and the touch sensor. Further, it is good to make a wiring length between the electrodes for the interface and the interface unit relatively short.

Figure 12B:
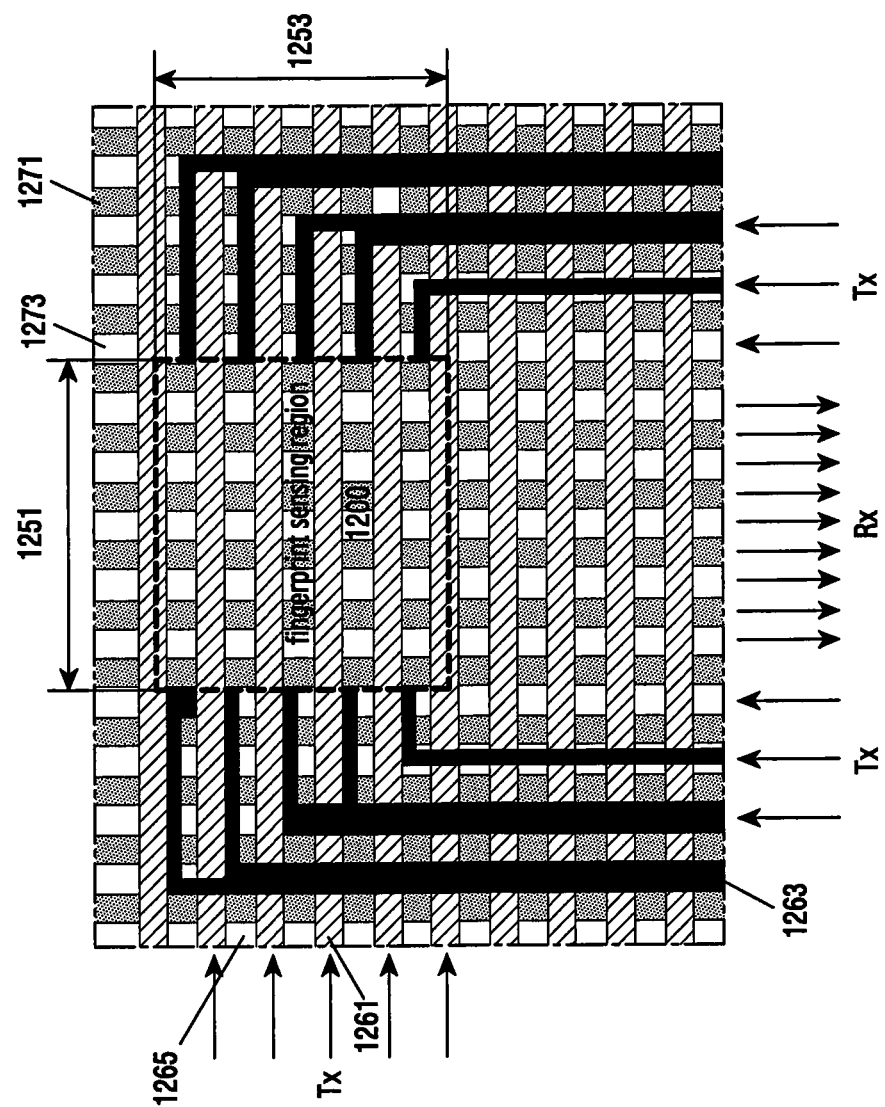
FIG. 12B is a diagram illustrating an example of wiring between the fingerprint recognition area and an interface circuit, according to an embodiment of the present disclosure.

FIG. 12B illustrates an example of wiring between the fingerprint recognition area 1200 and an interface circuit. In FIG. 12B, the fingerprint recognition area 1200 is located at the center or on the side surface (for example, left side surface or right side surface) of the display 160.

Referring to FIG. 12B, since an area in which vertical electrodes are arranged in the fingerprint recognition area 1200 corresponds to electrodes used for the fingerprint recognition and the finger/pen touch are in common, vertical electrode wiring of the area 1261 may be made in the area 1253. However, vertical electrode wiring dedicated for the fingerprint recognition in the fingerprint recognition area 1200 may be made in a horizontal direction while extending to an area 1273 which is not used as the electrode in the horizontal direction; this is to shorten the wires of the vertical electrodes. That is, an area where the electrodes are arranged in the horizontal direction as indicated by reference numeral 1271 is an area where electrodes are arranged to detect the fingerprint/pen touch. However, the horizontal area as indicated by the reference numeral 1273 is an area which is not used for the fingerprint/pen touch, so that the horizontal electrodes may not be used (or arranged). Further, the vertical area as indicated by the reference numeral 1265 is an area which is not used for the finger/pen touch, so that the vertical electrodes may not be used (or arranged). Accordingly, wiring of the vertical electrodes dedicated for the fingerprint recognition in the fingerprint recognition area 1200 is made using the vertical area 1265 and the horizontal area 1273 in which no electrodes are arranged, and thus may be connected to the interface unit.

The fingerprint recognition sensor having the structure illustrated in FIG. 12B may be arranged at the center or the side surface of the display 160 and may be, for example, an area type sensor having 160 vertical direction channels and 160 horizontal direction channels. At this time, when the electrode wires are arranged in the wire arrangement area dedicated for the fingerprint recognition sensor, 160 electrodes of the vertical direction may be directly connected in the horizontal direction (a left direction or a right direction) in the fingerprint recognition sensor area. Further, in the fingerprint recognition sensor, 160 electrodes of the horizontal direction may be divided in a part where wires are connected in the horizontal direction (that is, a left direction or a right direction) as indicated by the reference numeral 1263 and a part where wires are connected in the vertical direction as indicated by the reference numeral 1261, and an area portion occupied by the wires may be divided by distributing the wires in the two directions.

A transmitter (Tx) or a receiver (Rx) may be functionally divided for the operation of the fingerprint recognition sensor, and FIG. 12B illustrates an example in which the transmitter (Tx) is connected in horizontal and vertical directions and the receiver (Rx) is connected in the horizontal direction. However, the division of Tx and Rx of FIG. 12B is only an example and the connection may be inversely performed. Since the fingerprint recognition sensor has electrodes of a minute line width to fit a fingerprint scale, resistance by an electrode connection may be different according to a wire connection type and according to a channel. Accordingly, as illustrated in FIG. 12B, a width of a resistance change may be reduced by shortening electrode wires of the fingerprint recognition sensor.

Figure 12C:
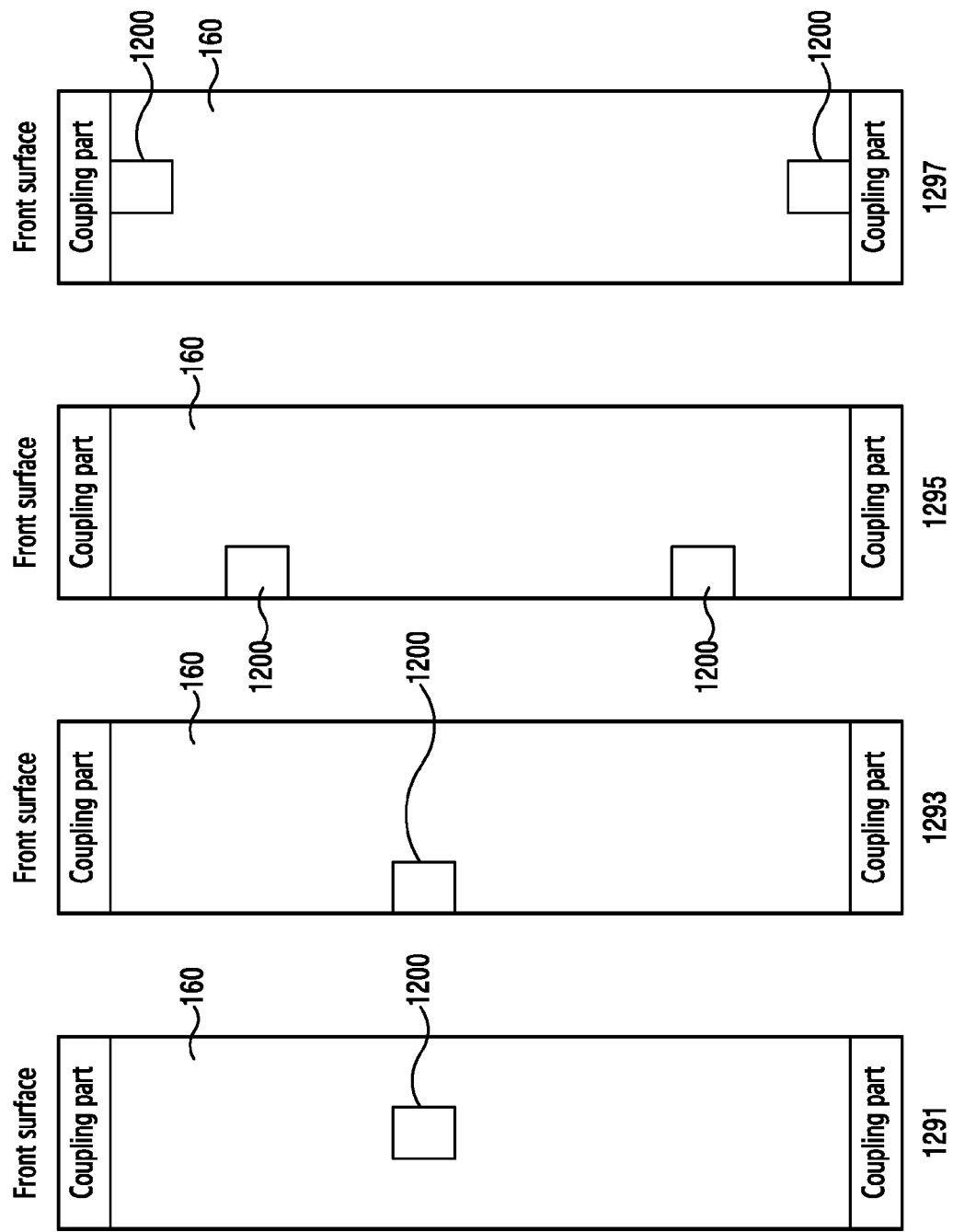
FIG. 12C is a diagram illustrating an example of an arrangement of a fingerprint recognition sensor included in a touch screen of an electronic device, according to an embodiment of the present disclosure.

FIG. 12C is a diagram illustrating an arrangement of the fingerprint recognition sensor configured on the touch screen in the electronic device, according to an embodiment of the present disclosure.

Referring to FIG. 12C, when a fingerprint recognition function is performed using the touch sensor, an arrangement of electrodes in the fingerprint recognition area may be the same as the arrangement of the BMs. When the resolution is high, the number of arranged electrodes may increase. Accordingly, in order to make wires of the touch electrodes for fingerprint recognition shorter, a drive channel and sensing channels of the fingerprint sensor may be configured as illustrated in FIG. 12B. For example, when the fingerprint recognition area 1200 is arranged on the touch screen, the fingerprint recognition area 1200 may be arranged at the center or on the side of the center of the display 160 as indicated by reference numerals 1291 or 1293. Further, when coupling parts are not located at the center of the wrist (for example, 850 of FIG. 8), the fingerprint recognition area 1200 may be arranged at the center or on the side of the center of the wrist when the electronic device is worn on the user's wrist as indicated by a reference numeral 1295 of FIG. 12C. In addition, in order to simply configure the electrode wires of the touch sensor, the fingerprint recognition area 1200 may be arranged relatively close to the coupling parts as indicated by reference numeral 1297 of FIG. 12C.

Accordingly, as described above, when the electrodes of the touch sensor are installed in a lower area of the BM in touch screen sensor, the touch sensor may be configured without damaging a transmittance of the screen by the BM, and may have an improved transmittance in the conventional touch screen since the ITO is not used. Further, the LCD uses a metal wire (for example, a copper (Cu) wire) below the color filter glass as the electrode, thereby having a decrease in electrode resistance smaller than the FPCB type fingerprint recognition sensor. In addition, a particular area of the screen may be used as the fingerprint recognition sensor area, a random area within the screen may be used to recognize the fingerprint, or the screen may operate as a touch screen by applying a driving circuit for the fingerprint recognition sensor operation to an entire screen channel through dynamic channel switching. Accordingly, the touch sensor of the touch screen may be implemented as a complex panel which can recognize all of the fingerprint, the finger touch, the pen touch, and the hovering.

When the input unit 150 is configured as the touch sensor, the touch sensor may have a function for recognizing touch pressure.

The wearable flexible electronic device may be used in both the non-worn state and the worn state. When the non-worn state switches to the worn state, the user may wear the electronic device on the body by bending the electronic device. The user may bend the electronic device by touching and applying pressure to the electronic device. Accordingly, when pressure having a predetermined intensity (or more) is recognized, the electronic device may recognize the pressure as an intention to wear the electronic device. To this end, the electronic device may include a pressure sensor. The electronic device may include an independent pressure sensor (for example, a piezo sensor) and also a touch sensor for recognizing pressure.

The touch sensor may detect a touch and/or a hovering input. Further, the touch sensor may determine an amount of pressure (or power) applied to the touch sensor. For example, the electronic device may determine an intensity of pressure based on an area (or a change in the area) of contact on the surface of the touch sensor. That is, the size of the touch area may change according to applied pressure, and the electronic device may estimate approximated applied pressure according to the touch area (or change).

The touch sensor may include elements of the pressure sensor for detecting pressure. For example, the pressure may be configured to radiate light to a lower end of the touch sensor and analyze a light amount changing according to touch pressure, so as to detect pressure. Further, the pressure sensor may use or include a film (a transparent pressure detection layer) that may detect pressure to a lower end of the touch sensor and detect touch pressure through the film.

The electronic device may measure a location of a touch input on the touch sensor and an intensity of pressure through the touch sensor and the pressure sensor. The electronic device may recognize a location where a user's touch input is generated through the touch sensor and recognize an intensity of the pressure through the pressure sensor.

Elements of the touch sensor capable of recognizing pressure may include a plurality of electrode layers (for example, the first electrode layer and the second electrode layer in FIG. 10A) and transparent pressure detection layers located between first electrode layer and second electrode layer sensors. The first and second electrode layers may be implemented as layers patterned with transparent conductive traces. Further, each conductive trace may have tabs for providing electric access to another circuit (for example, the drive channels and the sensing channels of FIG. 12A). The conductive electrodes may be arranged in the same pattern as that of the BMs of the touch screen sensor.

The first electrode layer of the pressure sensor of the touch sensor may be arranged on the transparent pressure detection layer, and the conductive traces may be aligned in a first direction (for example, aligned with an X axis and/or parallel to an X axis). The second electrode layer may be arranged below the transparent pressure detection layer, and the conductive traces may be aligned in a second direction (for example, aligned with a Y axis and/or parallel to a Y axis). The conductive traces of the first electrode layer and the second electrode layer may be orthogonal to each other.

Due to the orthogonal arrangement of the conductive traces, the conductive traces of the electrode layers may overlap each other along a z axis. Further, a plurality of available conductive paths from the conductive traces of the first electrode layer to the conductive traces of the second electrode layer may be formed at each location through the transparent pressure detection layer. The first and second electrode layers form an m×n array (or matrix) of potential conductive paths via the transparent pressure detection layer. Here, m may be the number of columns (or rows) of the conductive traces of the first electrode layer (or second electrode layer) and n may be the number of columns (or rows) of the conductive traces of the second electrode layer (or first electrode layer).

The transparent pressure detection layer may be formed with elastic materials in which transparent conductive particles are uniformly distributed. The transparent pressure detection layer may include a transparent elastic polymer matrix (for example, polyester or silicon rubber) material and, in this material, transparent conductive particles (for example, ITO or Tin Oxide) may be distributed. When pressure (or power) is applied to the touch sensor (for example, in a Z axis direction), the transparent pressure detection layer may be compressed (or squeezed) and, accordingly, an average distance between distributed particles within the transparent pressure detection layer may be reduced. That is, a density of a conductive path formed by adjacent particles increases (percolation) and thus conductance of the transparent pressure detection layer may increase (decrease in resistance).

The transparent pressure detection layer may perform a function of variable resistance which is located electrically in series with each conductive path between the electrode layers. That is, on the transparent pressure detection layer, an amount of resistance for each conductive path may be directly related to the pressure (or power) applied to the touch sensor at a location corresponding to each conductive path (that is, a location on the conductive path along the z axis). The pressure (or power) applied to the surface of the touch sensor corresponding to each conductive path (for example, along the z axis) may be detected by measuring or determining resistance (or a change thereof) for each conductive path, that is, each location of the m×n array. Based on the resistance (or the change thereof) for each conductive path, a pressure (or power) metric for each conductive path may be acquired and the pressure (or power) metric may indicate a size of the pressure (or power) applied to the touch sensor on each conductive path.

The electronic device may apply, for example, a reference voltage (or current) to the conductive trace of the first electrode layer and measure a voltage (or current) in each conductive trace of the second layer. That is, the electronic device may scan for each conductive path (for example, each location of the m×n array). The measurement voltage (or current) of each conductive trace of the second electrode layer may be determined by resistance (that is, an intensity of pressure touched on the touch sensor) of a transparent pressure detection layer between conductive traces of the first electrode layer and conductive traces of the second electrode layer. The measurement voltage (or current) may be a voltage related to pressure (or power) applied along the z axis by overlap between the conductive traces of the first electrode layer and the conductive traces of the second layer.

As described above, the touch sensor may include the pressure sensor. When a touch input is detected, the electronic device may measure a pressure value (for example, a voltage) of the touch input, process the touch input as a simple touch input according to the measured pressure value, and process the touch input as another function according to a size of the pressure value. The electronic device including the touch sensor having a pressure sensor function may perform another operation according to an input touch degree (pressed intensity). For example, the touch sensor detects a user's touch input, the electronic device may process a preset touch input according to a two-dimensional location information when a measurement voltage according to the touch input is less than or equal to a threshold voltage Th1, and process a preset function according to the measured pressure value when the measurement voltage has a value greater than or equal to the threshold voltage Th1 and less than or equal to a threshold voltage Th2.

When the user applies one or more pressures on the touch sensor, the electronic device may calculate measurement voltages (z values) of the corresponding pressures, map two-dimensional (x and y) location information where the pressures are generated, and determine locations and pressure values of the input signals. When the locations where the input signals are detected change (for example, the user moves the finger in a state where the pressures are applied to the touch sensor), the electronic device may designate a movement direction based on the change in the locations where the pressures are detected. For example, when the electronic device detects a movement direction of pressure detection signals including an input gesture and uses the movement directions as signals for controlling and/or adjusting contents displayed on the screen, and a size of the control and/or adjustment may be determined according to a movement size and/or direction of the detected pressure value.

The flexible electronic device may perform a payment function in the worn or non-worn states. The electronic device may include a payment application (wallet application) and/or a payment manager.

The payment application may include, for example, a Samsung Pay™ application. The payment application may provide a UI or a User Experience (UX) related to payment. The UI related to payment may include a wallet user interface (UI/UX). For example, the payment application may provide a UI related to card registration, payment, or transaction. The payment application may provide an interface related to card registration through, for example, a text reader (for example, an optical character reader/recognition (OCR)) or an external input (for example, a user input). Further, the payment application may provide an interface related to a user authentication through identification and verification (ID&V).

The payment application may perform a payment transaction through the payment application. For example, the payment application may provide a payment function to the user through execution of simple pay, quick pay, or a designated application. The user may perform the payment function through the payment application and receive information related to the payment function.

The payment manager may include information related to a card company. For example, the payment manager may include a card company software development kit (SDK).

The payment application included in the electronic device and a payment service server included in the payment server may be functionally connected to each other. For example, the payment application may transmit and receive information related to the payment to and from the payment server. The payment manager included in the electronic device and a token demander server included in the payment server may be functionally connected to each other. For example, the payment manager may transmit and receive information related to the payment to and from the token demander server.

The electronic device may perform a payment function. The electronic device or a payment server may register a card (for example, a credit card such as Master Card™ or Visa™) to perform the payment function. The payment server may manage information on a plurality of registered cards including a card registered through another electronic device of the user corresponding to the electronic device or another card registered through an electronic device of another user as well as the card registered through the electronic device.

The electronic device may perform payment by using at least one of one or more other electronic devices functionally connected based on short range communication (for example, BT or Wi-Fi). The other electronic device may be an accessory (for example, a key fob type device of LoopPay™ company) and, the electronic device may be functionally connected to the accessory (for example, the key fob type device of LoopPay™ company) through an input/output interface (for example, earphones).

In the configuration of FIG. 1, the camera unit 140 may acquire card information by photographing a card required for payment. The camera unit 140 may recognize card information (for example, a card company, a card number, a card expiration date, or a card owner) marked on the card through an OCR function. Alternatively, the user may input the required card information into the electronic device by using an input device (for example, the input unit 150 of the touch panel and the pen sensor, an ultrasonic input device, or a microphone input device).

An acceleration sensor or a gyro sensor of the sensor unit 130 may acquire a location state of the electronic device when payment is performed. For example, location information of the electronic device may be transferred to the processor 100, and the processor 100 may control an intensity (a current intensity) of a magnetic field which an MST module of the communication unit 120 outputs to a POS terminal based on the acquired location state of the electronic device or, when there are a plurality of coil antennas, select a used coil antenna. The MST module may include a data reception module and an output conversion module. The data reception module may receive a logical low/high type pulse signal including payment information transmitted by the processor 100 (for example, a security module (for example, eSE (embedded secure element))). Data received by the data reception module may have the form into which a token and payment authentication (verification) data are inserted. The output conversion module may include a circuit for converting the data recognized by the data reception module into a necessary form in order to transfer the data to the MST module.

The electronic device may store the data in the form necessary for the payment information memory 110 or a separate security module (for example, eSE). Further, the electronic device may guide the user to a location which can be easily recognized by displaying a substantial location of an MST antenna among loop antennas on the display 160.

The electronic device may execute a payment application by receiving a user input in the non-worn state. For example, the electronic device may execute the payment application (for example, Samsung Pay: an application for making payment through an NFC module or an MST module without any credit card by inserting a credit card function into an electronic device manufactured by Samsung) through a preset gesture (for example, sweeping the screen from a lower bezel area to a display direction of the electronic device). When the user bends the electronic device to wear the electronic device, the processor 100 may recognize the bending and display a fingerprint sensor area for a user authentication on the display 160. Thereafter, when the electronic device switches to the worn state, the processor 100 may detect the wearing of the electronic device through the coupling sensor and detect a touch input of a fingerprint sensor area, so as to analyze the user's fingerprint. When the input fingerprint is authenticated as the preset user, the electronic device may display at least one card among the card pre-registered in the electronic device through the display 160 in response to a user input.

The processor 100 may select a card to be used for payment among a plurality of pre-registered cards by receiving a user input. For example, the electronic device may select a card to be used for payment among a plurality of cards through a user input of scrolling the screen in a left/right direction. The processor 100 may make a request for authentication to the user for payment of the selected card. For example, when the re-authentication is requested, the electronic device may perform a payment operation by scanning for a user's fingerprint through a fingerprint recognition sensor.

An electronic device may include: a flexible touch screen comprising a touch panel and a display; a sensor configured to recognize bending and coupling of the electronic device; and a processor functionally connected to the display and the sensor, wherein, when the bending of the electronic device is recognized, the processor may determine whether the electronic device is worn and, when the wearing of the electronic device is recognized, perform an operation of an application executed before the electronic device is worn. When the bending of the electronic device is recognized, the processor of the electronic device may recognize an executed application and, when the wearing of the electronic device is recognized, continuously perform a function and/or a UI of the recognized application.

When multiple touches are detected on the touch panel, the processor may activate a sensor that detects the bending, and recognize the bending of the electronic device when the sensor that recognizes the bending detects the bending.

The touch panel may include a pressure sensor, and, when the multiple touches are detected on the touch panel, the processor may analyze a pressure intensity at multiple touch locations detected by the pressure sensor and, when the pressure intensity is greater than or equal to a set intensity, recognize the bending of the electronic device.

The sensor may include a medical sensor, and, when the multiple touches are detected on the touch panel, the processor may activate the medical sensor and, when the medical sensor detects a body contact, recognize the bending of the electronic device. The medical sensor may be a heartbeat sensor.

The sensor that detects the bending may include a pressure sensor and a medical sensor, and, when the multiple touch inputs are detected on the touch panel and a pressure greater than or equal to a set intensity is detected by the pressure sensor, the processor may activate the medical sensor and, when the medical sensor detects a body contact, recognize the bending of the electronic device.

When the bending is recognized, the processor may divide a display area of the display into a main display area and a sub display area. The processor may more brightly display the main display area compared to the sub display area.

When the bending of the electronic device is recognized, the processor may analyze an operation of the electronic device in a non-worn state, switch a function and/or a UI of the analyzed operation to a function and/or a UI of an operation to be performed in a worn state of the electronic device, and display the switched function and/or UI.

An operation of a non-worn state may correspond to a lock state, and, when the bending is recognized, the processor may display a lock release input window and, when the wearing of the electronic device is recognized, release the lock state by input lock release information. The lock release information may correspond to fingerprint recognition, and the processor may display a fingerprint input window on the display when the bending is recognized.

The operation in the non-worn state may correspond to biometric measurement, and, when the bending is recognized, the processor may activate a medical sensor and, when the wearing of the electronic device is detected, recognize biometric information through the medical sensor. The medical sensor may be a Heart Rate Monitor (HRM) sensor. When squeezing of the HRM sensor is recognized in the worn state, the processor may execute a biometric measurement mode.

The operation of the non-worn state may be a payment operation, and, when the bending is recognized, the processor may display a security input window on the display and, when wearing of the electronic device is recognized, perform an authentication processor according to a security input and perform the payment operation. When touch inputs of preset multiple locations are recognized in the worn state, the processor may display a security input window and, when a security input is recognized, perform a security authentication and execute a payment mode.

The operation of the non-worn state may be a call, and, when the bending is recognized, the processor may turn on a speaker phone and, when wearing of the electronic device is recognized, service a speaker phone call operation of the worn state. When multiple touches and a tap touch interaction are recognized in a speaker phone call of the worn state, the processor may control a call volume according to a tap location.

The operation of the non-worn state may be a text input operation, and, when the bending is recognized, the processor may activate a medical sensor and, when the medical sensor recognizes a body contact, set a function of converting a voice into a text and input text through a voice in the worn state.

The operation of the non-worn state may be an alarm ringing, and when wearing of the electronic device is recognized, an alarm may be released.

An electronic device according to various embodiments of the present disclosure may be a wearable flexible electronic device and, when the form of the electronic device changes at a time point when the non-worn/worn state is switched, determine an operation of the electronic device and activate in advance an operation function/UIs after the change and, when the switching of the non-worn/worn state is completed, continuously perform the operation based on the activated function/UI.

Figure 13:
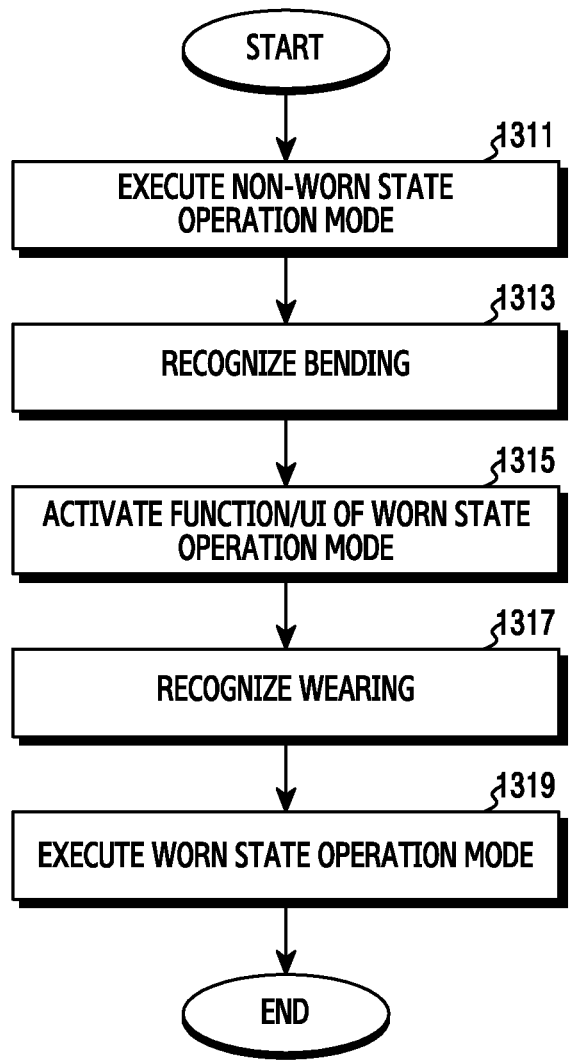
FIG. 13 is a flowchart of a state switching method of an electronic device, according to an embodiment of the present disclosure.

FIG. 13 is a flowchart of a state switching method of the electronic device, according to an embodiment of the present disclosure.

Referring to FIG. 13, the electronic device y performs a general operation of a non-worn state in step 1311. The electronic device in the non-worn state may be in the state indicated by the reference numeral 710 of FIG. 7. When the electronic device in the non-worn state is bent, the electronic device may recognize the bending of the electronic device in step 1313, analyze an operation mode of the electronic device, and activate a function and/or a UI for executing an operation mode corresponding to a worn state of the electronic device in step 1315. Thereafter, when it is recognized (or detected) that the electronic device is worn by a user (reference numeral 730 of FIG. 7) in step 1317, the electronic device may switch to the operation mode of the worn state and execute the operation in step 1319.

Figure 14A:
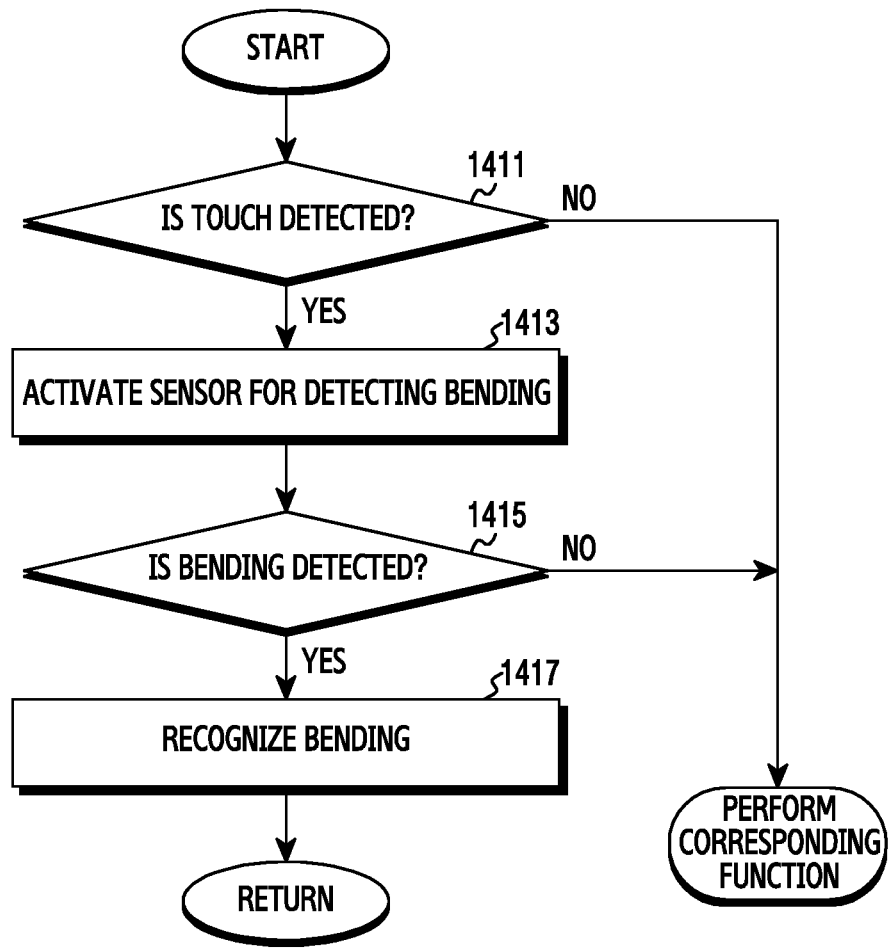
FIGS. 14A to 14C are flowcharts of a method of recognizing bending of the electronic device, according to an embodiment of the present disclosure.
Figure 14B:
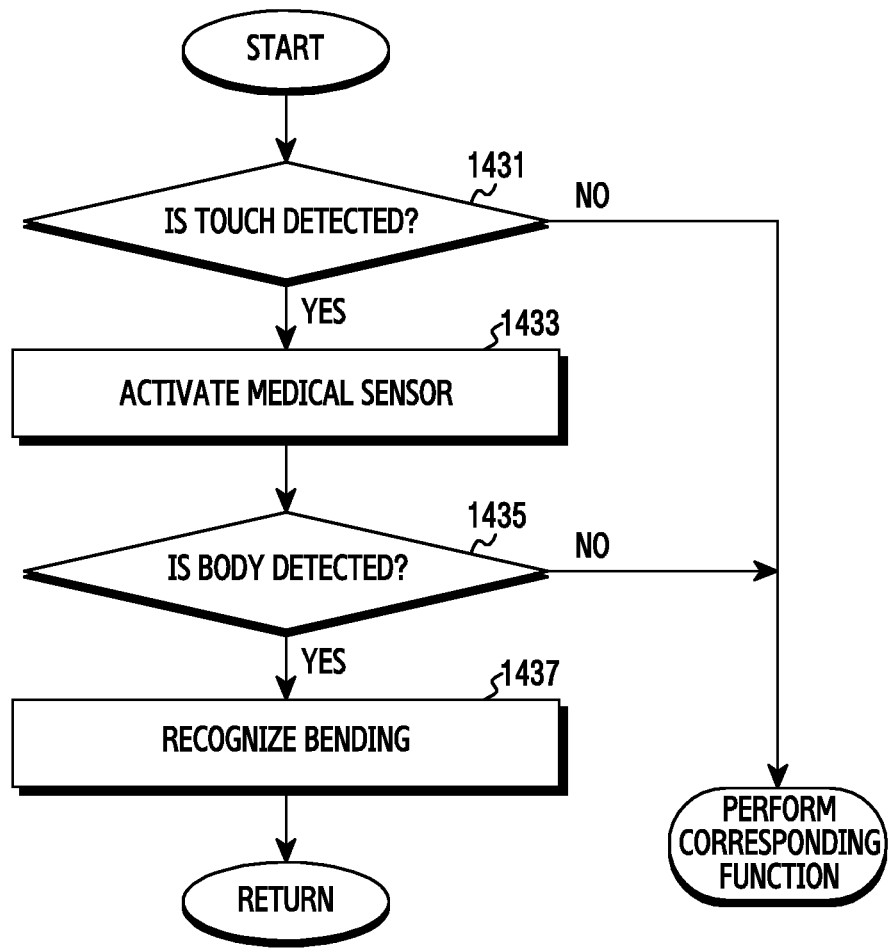
Figure 14C:
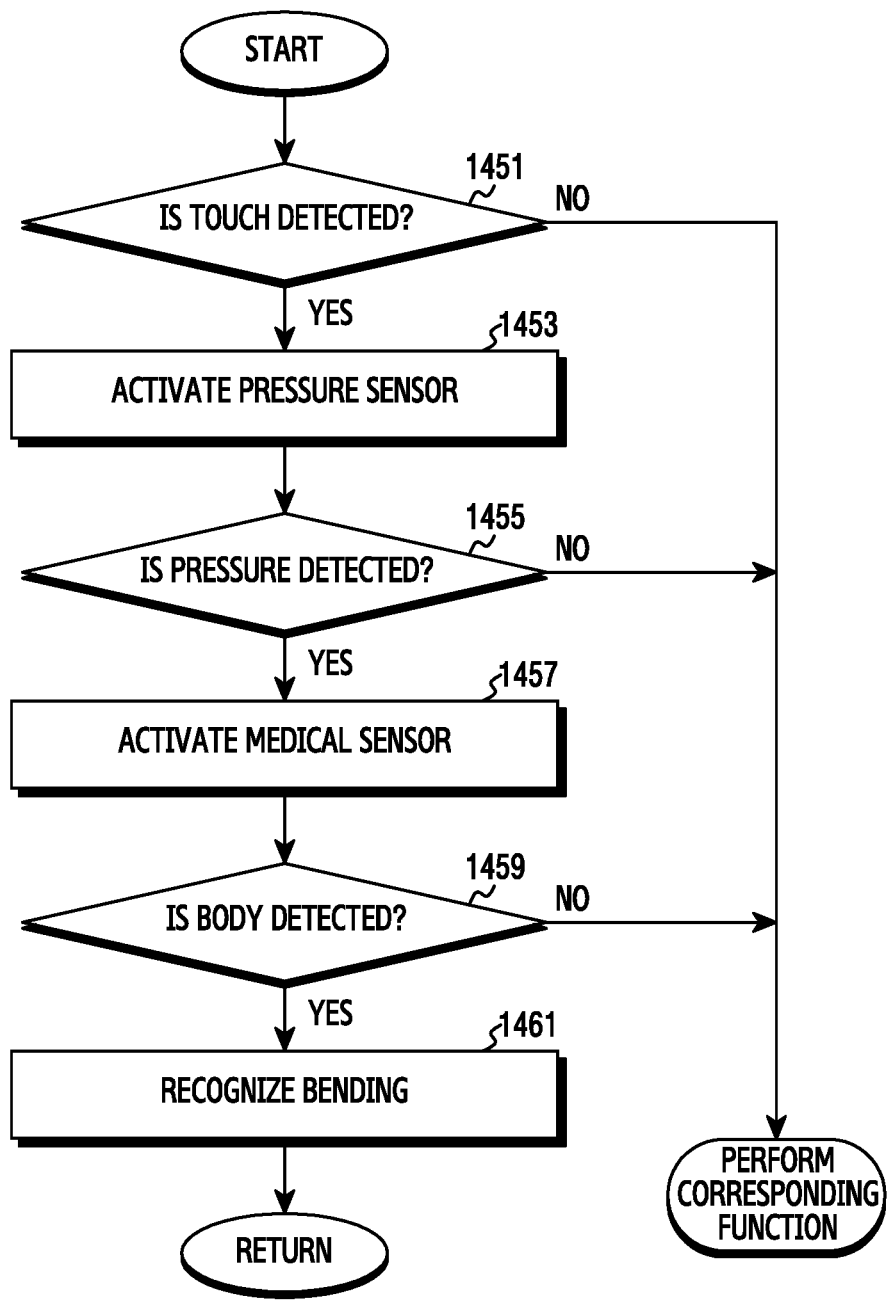

FIGS. 14A to 14C are flowcharts of a method of recognizing bending of the electronic device, according to an embodiment of the present disclosure.

Referring to FIGS. 14A to 14C, bending of the electronic device may be recognized through various methods. When the non-worn state of the electronic device switches to the worn state, the user may switch the electronic device through the method as indicated by reference numeral 220 of FIG. 2. For example, the user may bend the electronic device by applying pressure in an upwardly and a downwardly to the electronic device. The user may place the bent electronic device on the wrist and perform a coupling operation. Accordingly, when the bending operation is performed by the user, the electronic device may recognize user's multiple touch inputs (for example, up and down touches (inputs) to the display and/or the coupling part) and recognize pressure due to the bending operation by the user. The electronic device may recognize the body of the user on whose wrist the electronic device is to be located. The electronic device may recognize the user's multiple touch inputs through the input unit 150. The electronic device may detect pressure applied to the electronic device through a pressure sensor integrally formed with the touch panel of the input unit 150 or a pressure sensor independently operable from the sensor unit 130. The electronic device may recognize the bending of the electronic device through a bending sensor (for example, a sensor installed in a bezel area of the electronic device to detect the bending of the electronic device) independently operable from the sensor unit 130. The electronic device may recognize that the electronic device is located on the wrist through a medical sensor (for example, an HRM sensor) independently operable from the sensor unit 130.

Referring to FIG. 14A, when a touch input is recognized (or detected) in step 1411, the electronic device may activate the sensor which may detect the bending of the electronic device in step 1413. The sensor which may detect the bending may be a pressure sensor, a bending sensor, and/or medical sensors. When the sensor detects the bending of the electronic device, the electronic device may detect the bending in step 1415, and recognize a bent state of the electronic device in step 1417.

Referring to FIG. 14B, when a touch input is recognized in step 1431, the electronic device may activate the medical sensor which may detect a body contact of the user in step 1433. When the medical sensor detects the contact of the user, the electronic device may detect that the electronic device contacts the user's body in step 1435, and recognize the bent state of the electronic device in step 1437.

Referring to FIG. 14C, when a touch input is recognized in step 1451, the electronic device may activate the pressure sensor in step 1453. Further, when pressure is detected in step 1455, the electronic device may activate the medical sensor in step 1457. Thereafter, when the electronic device detects the user's body in step 1459, the electronic device may recognize the bent state of the electronic device in step 1461.

As described above, when the touch input is recognized in the non-worn state and a touch is made, the electronic device may analyze outputs of a pressure sensor, a bending sensor, and/or a medical sensor and recognize the bending of the electronic device. The electronic device may recognize the bending of the electronic device by analyzing the outputs of the pressure sensor, the bending sensor and/or the medical sensor without recognizing the touch input. Further, when the electronic device is in a lock state in the non-worn state, the electronic device may be configured not to detect a user's touch input. Thus, in the lock state, the electronic device may activate a sensor for detecting a user's input in the lock state (for example, a touch sensor at a particular location where a touch can be made to bend the device). Alternatively, when the user wears the device in the lock state, a button may be installed at a particular location that can be touched by the user and the button may be pressed when the user holds the electronic device.

Figure 15A:
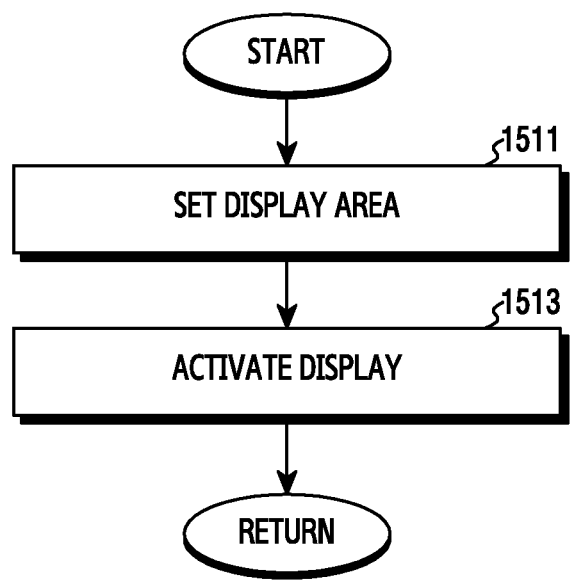
FIGS. 15A to 15B are flowcharts of a method of activating a function and/or a UI when an electronic device recognizes bending, according to an embodiment of the present disclosure.
Figure 15B:
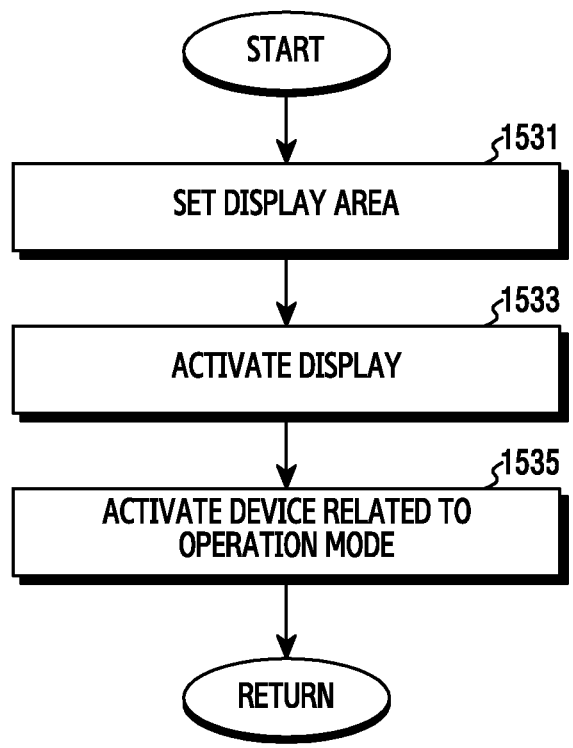

FIGS. 15A to 15B are flowcharts of a method of activating a function and/or a UI when the electronic device recognizes bending, according to an embodiment of the present disclosure. The screen displayed in the non-worn state as indicated by reference numeral 210 of FIG. 2 and the screen display area of the display 160 displayed in the worn state as indicated by reference numeral 230 of FIG. 2 may be different from each other. Further, the operation performed in the non-worn state may also be continuously performed in the worn state. For example, when the electronic device is bent in the lock state, the electronic device may display a lock release window on the display 160 in a bent state and switch to the worn state. When the electronic device is bent in a biometric measurement mode, the electronic device may activate the medical sensor in the bent state and switch to the worn state.

Referring to FIG. 15A, when the bending is recognized, the electronic device may set a display area of the display 160 to be displayed in the worn state in step 1511. The display area may be set as a main display area and a sub display area, and the main display area may be set as an area of the display 160 in which the user can easily identify displayed information in the worn state. Further, the electronic device may turn on the main display area and the sub display area of the display 160 in step 1513. When displaying information on the display 160, information in the main display area may be displayed relatively brighter than information in the sub display area, so that power can be saved.

Referring to FIG. 15B, when bending is recognized, the electronic device may set the display area of the display 160 to be displayed in the worn state as a main display area and a sub display area in step 1531. Further, the electronic device may activate the main display area and the sub display area of the display 160 in step 1533. Thereafter, the electronic device may activate a function and/or a UI of a corresponding operation to perform an operation, which is performed in the non-worn state, in the worn state in step 1535.

Figure 16A:
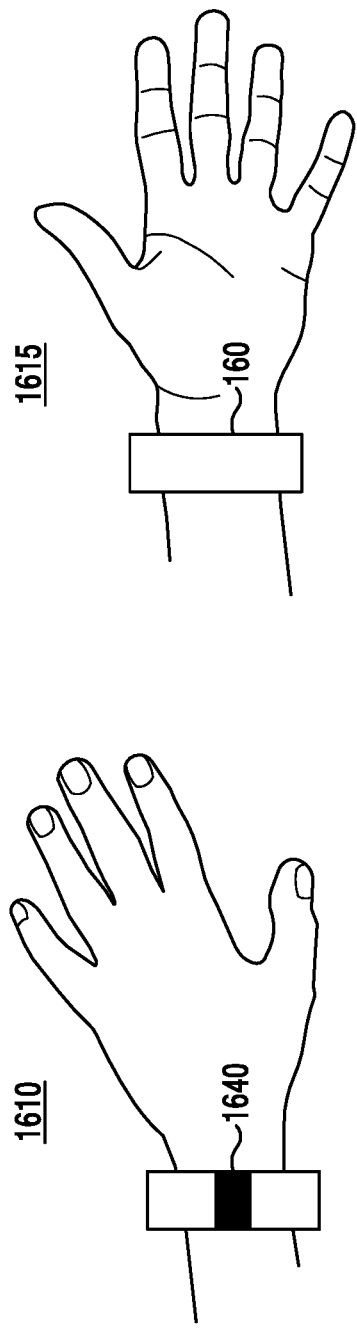
FIGS. 16A to 16C are diagrams illustrating an example of a display area set in a bending state of an electronic device, according to an embodiment of the present disclosure.
Figure 16B:
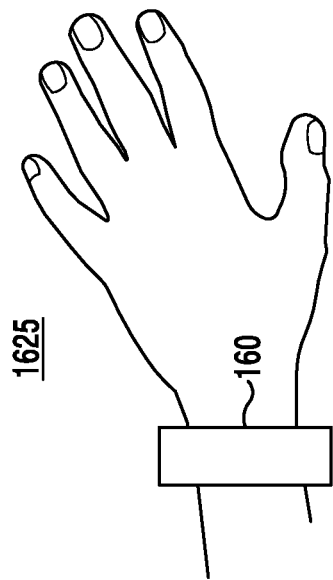
Figure 16B:
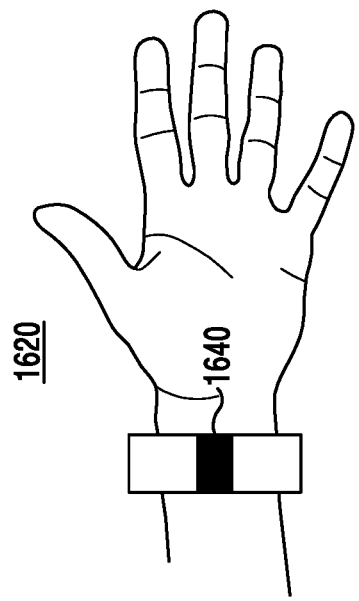
Figure 16C:
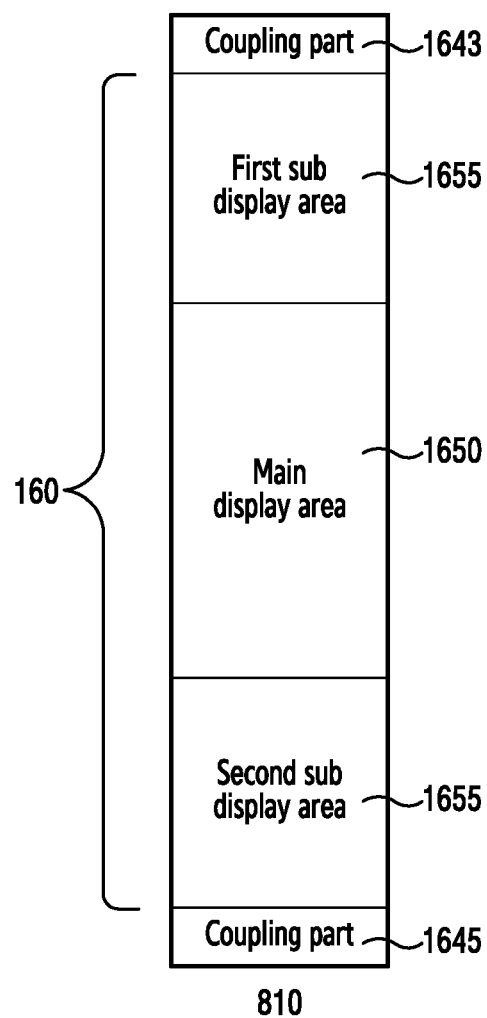

FIGS. 16A to 16C are diagrams illustrating an example of a display area set in a bent state of the electronic device, according to an embodiment of the present disclosure.

Referring to FIGS. 16A to 16C, reference numeral 1610 of FIG. 16A illustrates a worn state where a coupling part 1640 is located in an outside direction of the wrist (a direction of the back of the hand). The user may view the screen of the display 160 in an inside direction of the wrist (an opposite direction of the back of the hand) as indicated by reference numeral 1615 of FIG. 16A. Reference numeral 1620 of FIG. 16B indicates a worn state where the coupling part 1640 is located in an inside direction (an opposite direction of the back of the hand) of the wrist. The user may view the screen of the display 160 in an outside direction of the wrist as indicated by reference numeral 1625 of FIG. 16B. As illustrated in FIGS. 16A and 16B, when the user wears the electronic device, the user may view the screen displayed in a center area of the display 160, or in some instances a user may view the screen of areas of the display 160 close to the coupling part 1610.

When bending of the electronic device is recognized, the electronic device may set the display area of the display 160 as illustrated in FIG. 16C. That is, the electronic device may set the center area of the display 160 as a main display area 1650 and set display areas of the display 160 located close to the coupling parts 1643 and 1645 as sub display areas 1655 in step 1511 of FIG. 15A. The electronic device may activate the display area to display the main display area 1650 in a relatively bright manner and display the sub display areas 1655 less bright when compared to the main display area 1650 in step 1513 of FIG. 15A.

FIGS. 16A and 16B illustrate an example where the coupling parts 1640 are located at the center of the inside or outside of the wrist. However, in some instances, the coupling parts 1640 may include a coupling device of the electronic device and circuit units, thereby increasing a number of the coupling parts 1640. Thus, the user may place the coupling parts 1640 on the wrist in a direction of the edge of the hand. The user may view the screen of the display 160 on the inside or outside of the wrist. When the coupling parts 1640 are located on the wrist in the direction of the edge of the hand, the electronic device may activate an entire area of the display 160. The electronic device may set an area adjacent to one coupling part between the coupling parts 1643 and 1645 on the display 160 as the main display area. Alternatively, the electronic device may analyze the location of the coupling parts 1640 and the direction of the user's wrist (the direction of the inside or outside of the wrist) and set the area adjacent to the coupling part 1643 or 1645 as the main display area according to the analyzed direction.

When the bending of the electronic device is recognized (as described above), the electronic device may set display areas of the display 160 in which the user can view the screen in the worn state. Further, after analyzing the operation of the non-worn state, the electronic device may activate a function and/or a UI related to the operation to be performed in the worn state. Thereafter, when a detection signal is generated in the coupling sensor indicating that the electronic device is being worn, the electronic device may recognize the wearing of the electronic device in step 1317 of FIG. 13 and perform an operation mode of the worn state in step 1319.

Figure 17:
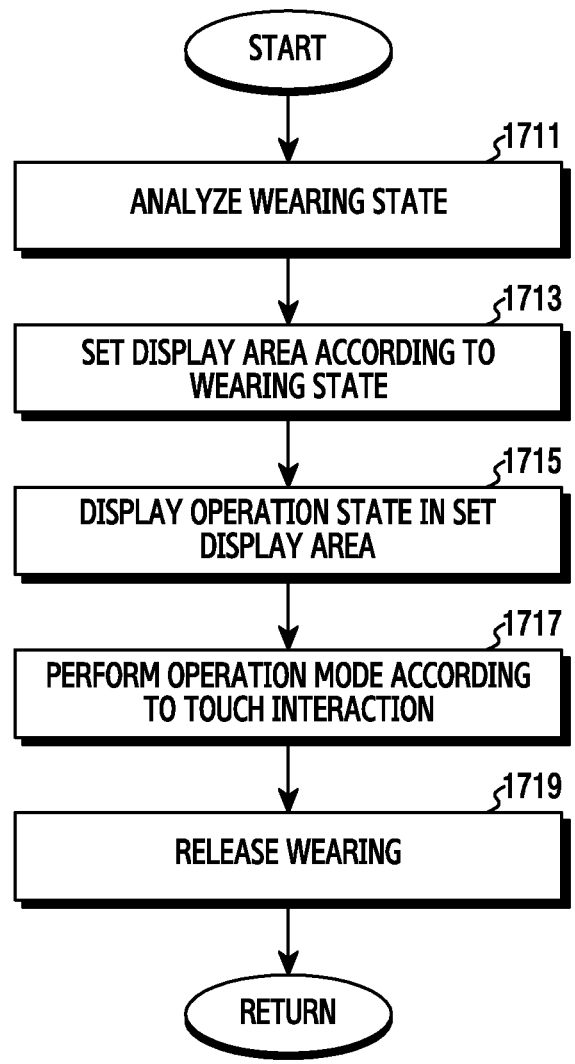
FIG. 17 is a flowchart of a method of an electronic device for controlling an operation in a worn state, according to an embodiment of the present disclosure.

FIG. 17 is a flowchart of a method of an electronic device for controlling an operation in a worn state, according to an embodiment of the present disclosure.

Referring to FIG. 17, the electronic device may perform a set operation in the worn state. When the worn state is recognized, the electronic device may analyze the wearing state of the electronic device in step 1711. The worn state may be an operation of analyzing a location of coupling parts of the electronic device. The coupling parts of the electronic device may be located at the center of the inside or outside of the user's wrist. The coupling parts of the electronic device may perform an operation of coupling both ends of the electronic device when the electronic device is worn on the wrist. The coupling parts include elements for coupling (for example, a connection part including a buckle, a hook, and/or a magnet) and all or some elements of the circuit unit of the electronic device (for example, the processor, the memory, the camera, and the sensor unit). Accordingly, the coupling part may be relatively larger than a part where the display 160 is located. The user may wear the electronic device such that the coupling parts are located in a direction of the edge of a hand (Sonnal) (or such that the coupling parts are located at the inside of the wrist). In the following description, it is assumed that the coupling parts of the electronic device are located in a direction of the edge of the hand at the user's wrist.

After analyzing the wearing state of the electronic device, the electronic device may set a display area of the display 160 in step 1713. The display area may be divided into a main display area and a sub display area. When the coupling parts are located at the center of the inside or outside of the wrist, the electronic device may set the display area of the display 160 as illustrated in FIG. 16C in step 1713. When the coupling parts are located at the wrist in the direction of the edge of the hand, the electronic device may set the main display area and the sub display area of the display 160 according to a location (the inside or outside of the wrist) from which the user views the worn electronic device.

After setting the display area of the display 160, the electronic device may display information of a set operation mode in step 1715. For example, when the electronic device is worn in a lock state, the electronic device may display a lock release window in the main display area and, when lock release information is input, may release the lock state and then display information of a set operation mode. Further, when the electronic device is worn in a biometric measurement mode, the electronic device may activate the medical sensor, display UN related to the biometric measurement in the main display area of the display 160, and display additional UI information related to the biometric measurement in the sub display area. Further, the electronic device may display information of the set operation mode on the display 160 and control an operation according to the information input through the input unit 150 in step 1717. The input information may be a touch (or hovering) interaction.

As described above, when the user releases the worn state while the operation mode is executed in the worn state, the electronic device may recognize the release of the coupling sensor and control the operation of the electronic device by switching to the operation of the non-worn state in step 1719.

Figure 18:
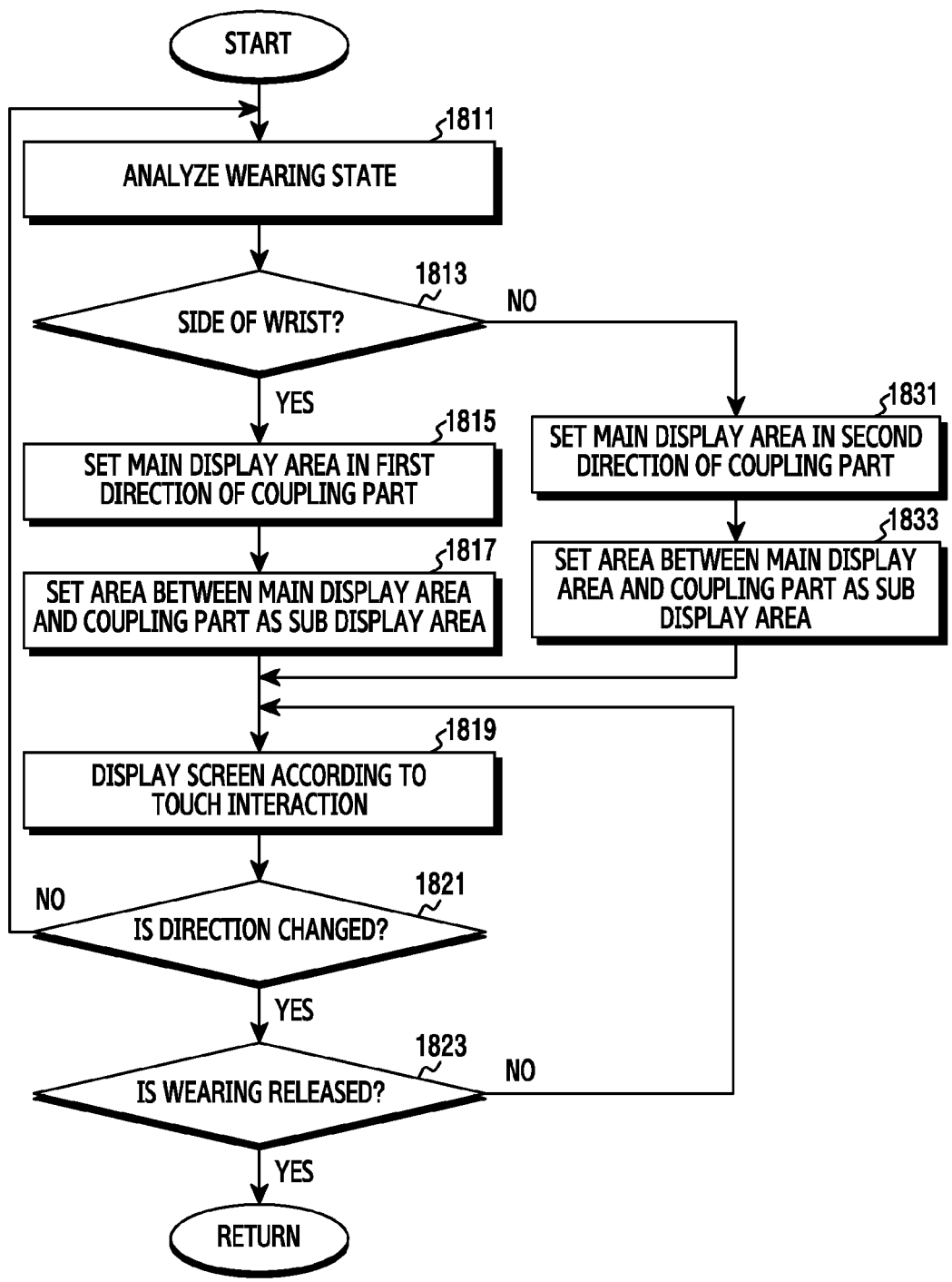
FIG. 18 is a flowchart of a method of an electronic device for displaying a display according to a worn state, according to an embodiment of the present disclosure.
Figure 19A:
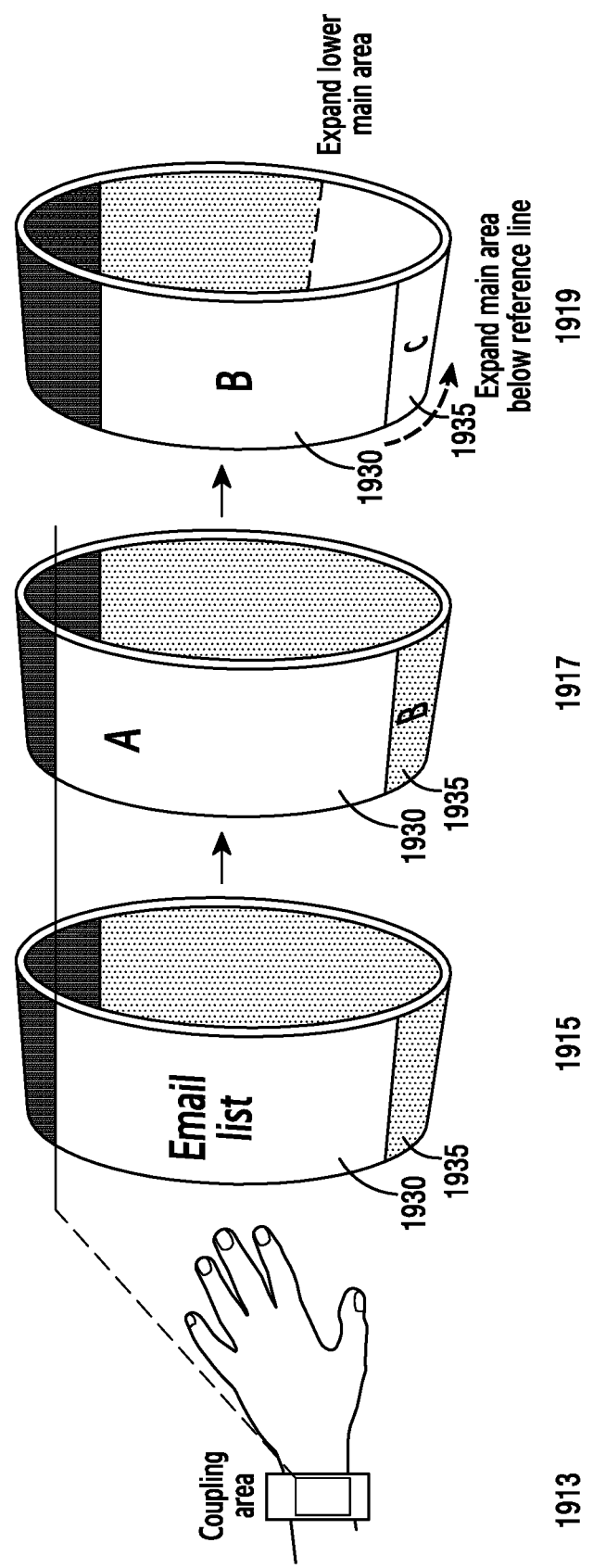
FIGS. 19A and 19B are diagrams illustrating examples of displaying information on a display according to a worn state of an electronic device, according to an embodiment of the present disclosure.
Figure 19B:
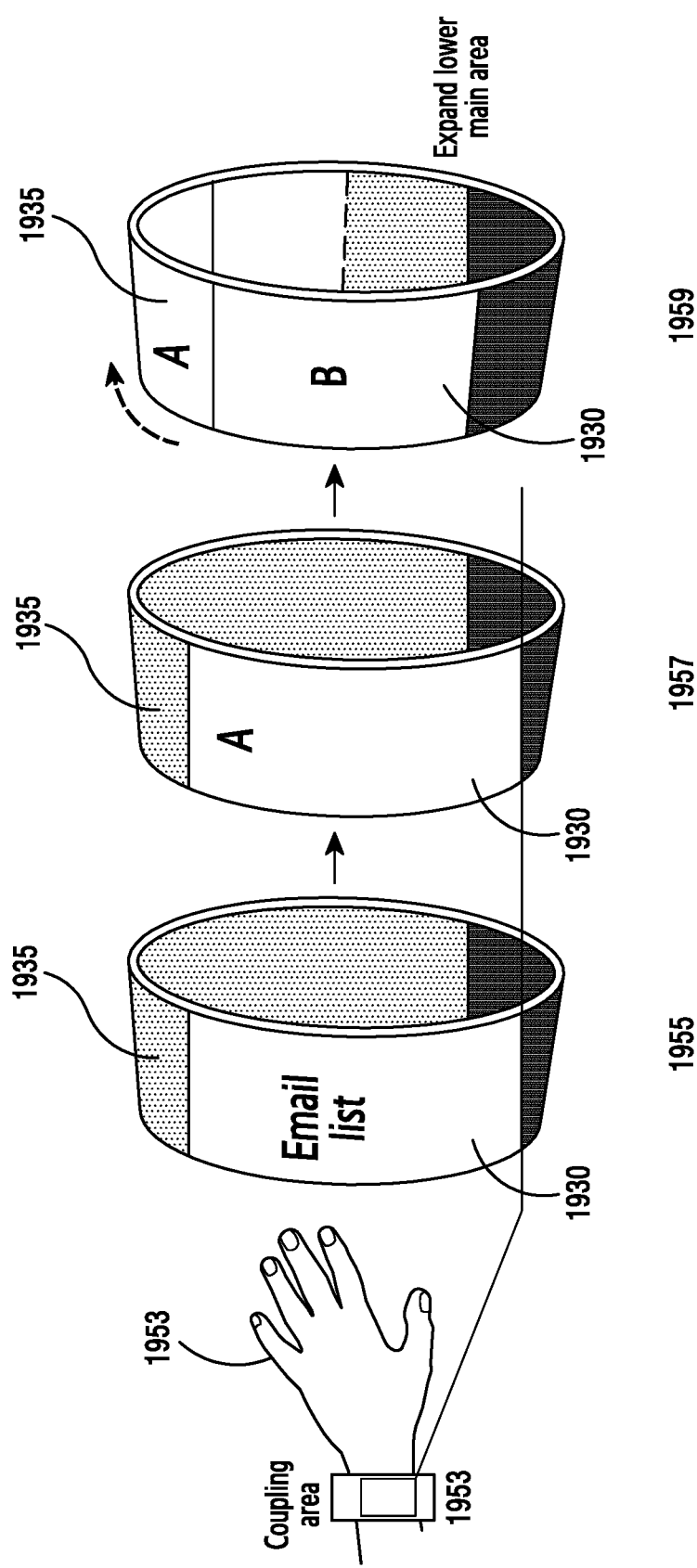

FIG. 18 is a flowchart of a method of an electronic device for displaying a display according to a worn state, according to an embodiment of the present disclosure. FIGS. 19A and 19B are diagrams illustrating examples of displaying information on a display according to a worn state of an electronic device, according to an embodiment of the present disclosure.

Referring to FIGS. 18 to 19B, when the display 160 is activated (screen on) or an application is executed in the worn state, the electronic device may analyze the wearing state of the electronic device in step 1811. The worn state may be when the coupling parts are located at the wrist in the direction of the edge of the hand as indicated by reference numeral 1913 of FIG. 19A or reference numeral 1953 of FIG. 19B. The worn state may be determined through an analysis of an output of the sensor unit 130 or an output of the camera unit 140. For example, the worn state of the inside or outside of the wrist may be determined according to whether the user's face is recognized in the output of the camera unit 140, which can be installed close or adjacent to the coupling part. Further, the worn state of the inside or outside the wrist may be determined using a proximity sensor of the sensor unit 130. Alternatively, the worn state of the inside or outside of the wrist may be determined according to a user's set input (for example, a touch input).

When the worn state corresponds to the outside direction of the wrist, the electronic device may recognize the outside direction in step 1813, set a main display area 1930 in a first direction from the coupling part in step 1815, and set a sub display area 1935 from the main display area 1930 to the coupling part in step 1817. When the worn state corresponds to the inside direction of the wrist, the electronic device may recognize the inside direction in step 1813, set the main display area 1930 in a second direction from the coupling part in step 1831, and set the sub display area 1935 from the main display area 1930 to the coupling part in step 1833.

After performing steps 1817 to 1833, the electronic device may set the main display area 1930 brighter than the sub display area 1935 and display information in step 1819. Further, the electronic device may control the screen displayed according to a touch (or hovering) interaction generated through the input unit 150 in step 1819. By repeating step 1819, the electronic device may display the display information in the main display area according to the touch interaction.

When the user switches the direction (for example, by rotating the wrist) while information is displayed, the electronic device may recognize the switching in step 1821 and may return to step 1811. Further, the operation of setting the display area of the display 160 and controlling the information displayed in the set display area according to the touch interaction may be repeatedly performed until the worn state is released. When the worn state is released, the electronic device may recognize the release of the wearing of the electronic device and reset an entire area as the display area of the display 160 in step 1823.

Referring to FIG. 19A, when the electronic device is worn as indicted by reference numeral 1913, the electronic device may set the main display area 1930, which has the set size in a downward direction from the coupling part as indicated by reference numeral 1915 of FIG. 19A, and set the sub display area 1935 from the main display area 1930 to the other end of the coupling part in step 1815 and step 1817. For example, in an initial state, the electronic device may display information "A" in the display area 1930 and display information "B" and "C" in the sub display area 1935 as indicated by the reference numeral 1917. When the user makes an upward touch interaction (for example, an upward swipe) in the main display area 1930, the electronic device may scroll display information and display "B" in the main display area 1930 and "C" in the sub display area 1935 as indicated by reference numeral 1919 of FIG. 19A in step 1819.

Referring to FIG. 19B, when the electronic device is worn in a manner as indicated by reference numeral 1953, the electronic device may set the main display area 1930 having the set size in an upward direction from the coupling part and set the sub display area 1935 from the main display area 1930 to the other end of the coupling part as indicated by reference numeral 1955 of FIG. 19B in step 1831 and step 1833. Thereafter, the electronic device may set the main display area 1930 brighter than the sub display area 1935 and display information in step 1819. Further, the electronic device may control the screen displayed according to a touch (or hovering) interaction generated through the input unit 150 in step 1819. For example, in an initial state, the electronic device may display information "A" in the main display area 1930 and may not display information in the sub display area 1935 as indicated by reference numeral 1917. When the user makes an upward touch interaction (for example, an upward swipe) in the main display area 1930, the electronic device may scroll display information and display "B" in the main display area 1930 and "A" in the sub display area 1935 as indicated by reference numeral 1919 of FIG. 19A in step 1819.

FIGS. 19A and 19B are examples of a text view application such as an e-book. However, depending on a specific application, different pieces of information may be displayed in the sub display area of the display 160. That is, in the sub display area 1935, the electronic device may display information associated with the information displayed in the main display area 1930. When the information displayed in the sub display area 1935 is selected, the electronic device may display the selected information of the sub display area in an area expanded from the main display area 1930.

Figure 20:
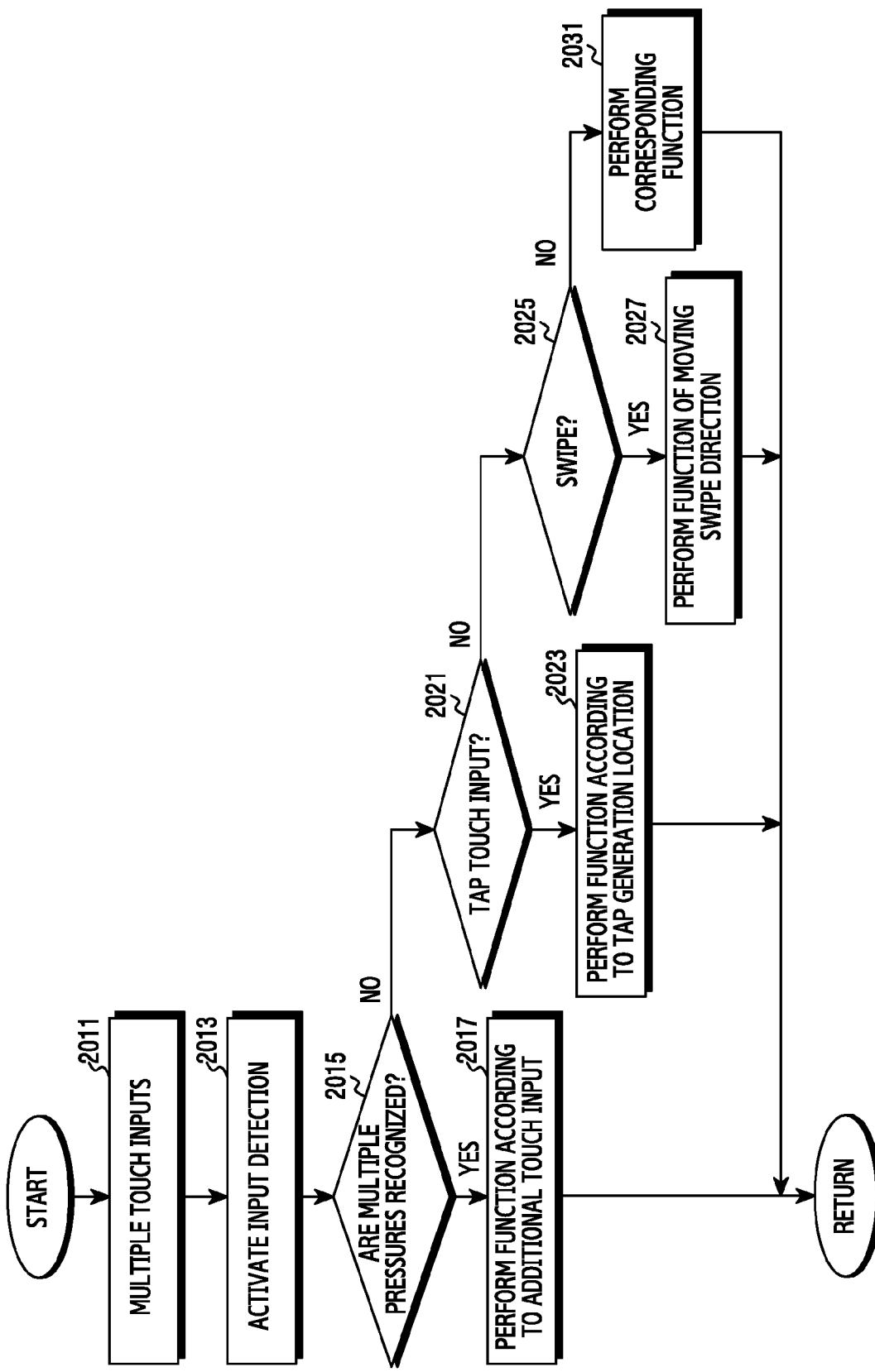
FIG. 20 is a flowchart of a method of controlling an operation of an executed application according to a touch input and pressure recognition in a worn state of an electronic device, according to an embodiment of the present disclosure.
Figure 21:
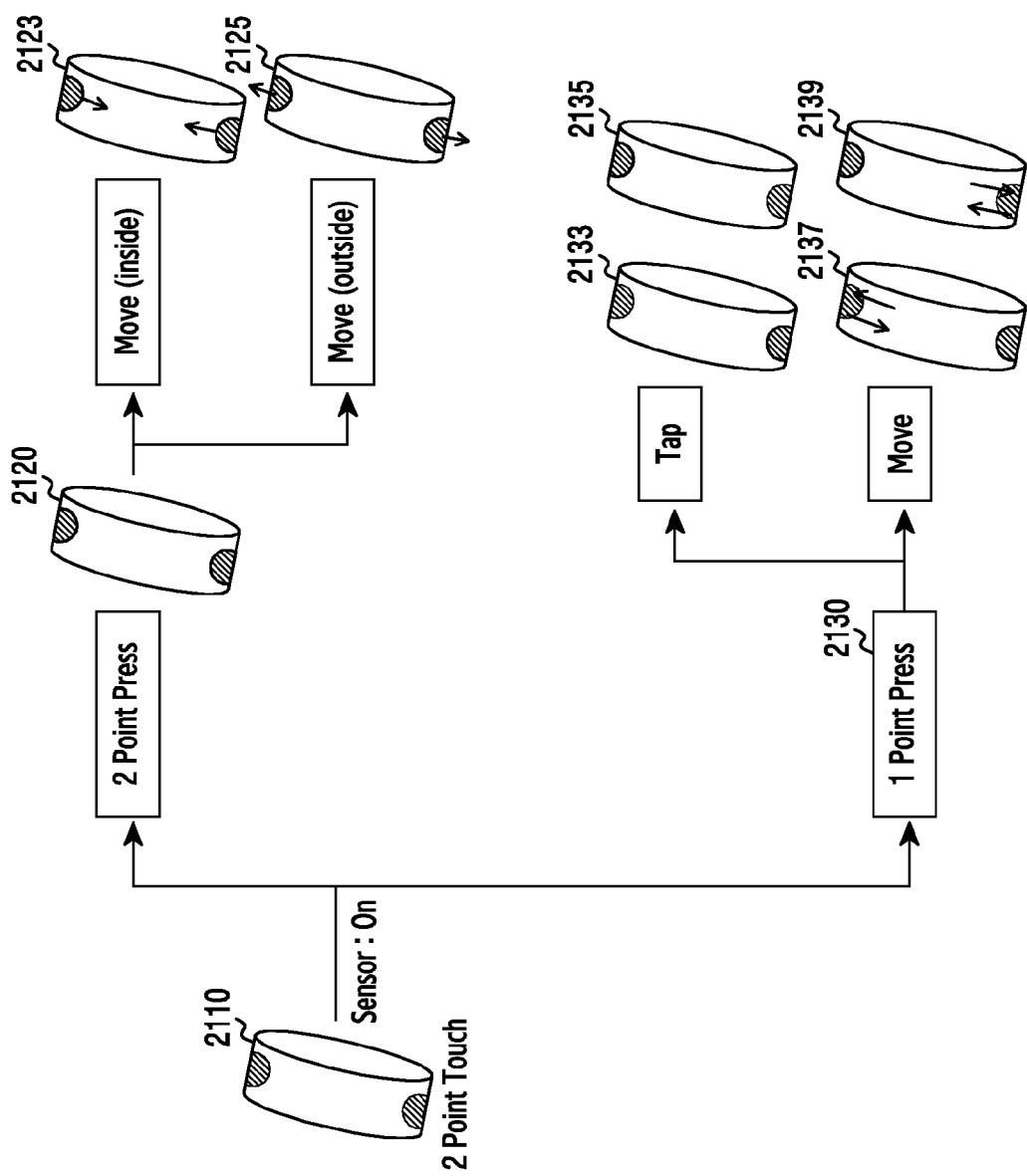
FIG. 21 is a diagram illustrating an example of a touch input type and a pressure recognition type in an electronic device, according to an embodiment of the present disclosure.

Further, an operation mode of the executed application may be determined or an executed operation may be controlled according to the touch interaction in step 1717 of FIG. 17 and step 1819 of FIG. 18. FIG. 20 is a flowchart of a method of controlling an operation of an executed application according to a touch input and pressure recognition in the worn state of the electronic device, according to an embodiment of the present disclosure. FIG. 21 is a diagram illustrating an example of a touch input type and a pressure recognition type in the electronic device, according to an embodiment of the present disclosure.

The electronic device may use different touch interactions based on whether the electronic device is worn or not. For example, when the electronic device in the non-worn state, it may display an icon, a soft button, a widget, and/or indicators for switching an operation mode or selecting a function on one screen of the display 160; however, the electronic device in the worn state may have a limitation in the display area compared to the electronic device in the non-worn state. The electronic device may analyze a user's touch and pressure in the worn state and perform a set function according to a result of the analysis. The touch input may be multiple touch inputs (for example, 2 point touches) and, when the multiple touch inputs are recognized, analyze whether pressure is applied for the touch inputs. After analyzing the multiple touches and whether the pressure is applied for the multiple touches, the electronic device may perform a corresponding function by analyzing an additional touch interaction.

Referring to FIGS. 20 and 21, when the multiple touch inputs are generated in the worn state, the electronic device may recognize the generation of the multiple touch inputs in step 2011 and activate the pressure sensor in step 2013. That is, when the input unit 150 detects the multiple touches, the electronic device may activate the pressure sensor and identify whether pressure having a set pressure intensity (or greater than the set pressure intensity) is recognized at multiple touch locations. When the pressure having the set pressure intensity is recognized at each location of the multiple touch inputs, the electronic device may detect the multiple touches and the multiple pressures (for example, 2 point touches and 2 point presses) in step 2015 and activate a function set to the number of touch locations and touch pressures in step 2017.

For example, when the 2 point touch input is generated in the worn electronic device as indicated by reference numeral 2110 of FIG. 21, the electronic device may recognize the 2 point touch input in step 2011, activate the pressure sensor in step 2013, and then identify whether the 2 point touch input has pressure of a set pressure intensity in step 2015. When the user generates the 2 point touch input having the set pressure intensity, the electronic device may recognize that locations and pressures of touch inputs are detected as indicated by reference numeral 2120 in step 2015. Then, the electronic device may perform a set function according to an additional touch interaction in step 2017. For example, when the touch inputs having the pressure of the set pressure intensity are inwardly swiped as indicated by reference numeral 2123, the electronic device may perform a function (for example, move inside) corresponding to the inward swipe. When the touch inputs are outwardly swiped, the electronic device may perform a function (for example, move outside) corresponding to the outward swipe.

When only one touch input among the multiple touch inputs has the pressure of the set pressure intensity (for example, 2 point touch and 1 point press) in step 2015, the electronic device may analyze a touch interaction of the point of which the pressure is not recognized. The touch interaction may be a tap or a swipe. At this time, when a tap touch is recognized in step 2021, the electronic device may perform a set function according to a touch location where pressure is detected and a location where the tap is recognized in step 2023. Further, when a swipe touch interaction is recognized in step 2025, the electronic device may perform a set function according to a touch location where pressure is detected and a direction of the swipe interaction in step 2027. In addition, when an interaction other than the tap and the swipe is recognized, the electronic device may perform a function according to the corresponding touch interaction in step 2031.

For example, when the 2 point touch input is generated in the worn electronic device as indicated by reference numeral 2110 of FIG. 21, the electronic device may recognize the 2 point touch input in step 2011, activate the pressure sensor in step 2013, and then identify whether the 2 point touch input has a pressure of a set pressure intensity in step 2015. When the user recognizes that only one touch input among the 2 point touch inputs has the pressure of the set pressure intensity, the electronic device may recognize it in step 2015. With respect to the point input, a pressure may be recognized only in a bottom touch input of the worn state as indicated by reference numerals 2133 and 2137, or a pressure may be recognized only in a top touch input as indicated by reference numerals 2135 and 2139. When a tap touch interaction is recognized in the touch input having no detected pressure, the electronic device may recognize it in step 2021, and perform a function (for example, volume up/down) set to the touch interaction recognized as indicated by reference numeral 2133 or 2135 of FIG. 21 in step 2023.

Further, when a swipe touch interaction is recognized in the touch input having no detected pressure, the electronic device may perform a function (for example, up or down scrolling the screen) set to the touch interaction recognized as indicated by reference numeral 2137 or 2139 of FIG. 21 in step 2027.

Figure 22:
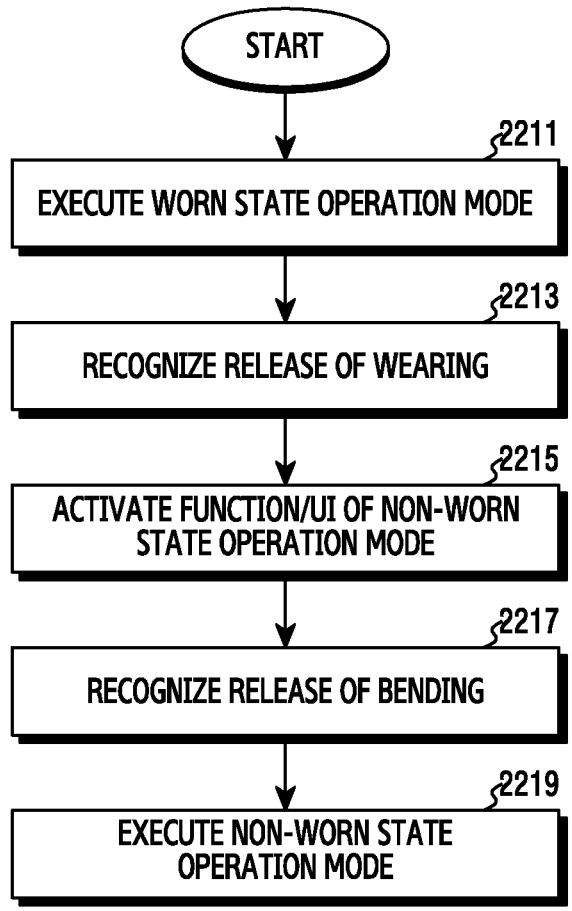
FIG. 22 is a flowchart of a method for when an electronic device switches from a worn state to a non-worn state, according to an embodiment of the present disclosure.

FIG. 22 is a flowchart of a method for when the electronic device switches from the worn state to the non-worn state, according to an embodiment of the present disclosure.

Referring to FIG. 22, the electronic device may perform a set function in the worn state as indicated by reference numeral 730 of FIG. 7 in step 2211. When the electronic device is no longer worn by the use (i.e., wearing of the electronic device is released), the electronic device may recognize the release of the wearing of the electronic device through a coupling sensor in step 2213. When the release of the wearing of the electronic device is recognized, the electronic device may activate a function and/or a UI of a non-worn state operation mode in step 2215. For example, when the coupling parts are no longer coupled to each other (i.e., coupling is released), the electronic device may be removed from the user's body as indicated by reference numeral 740 of FIG. 7 and may execute the UI in the non-worn state operation mode. For example, when the electronic device switches from the worn state to the non-worn state, the electronic device may release settings of the main display area and the sub display area set on the display 160. Further, when the electronic device switches from a state where a biometric measurement mode is executed to the non-worn state, the electronic device may stop the measurement operation. In addition, when the electronic device switches from a state where a payment mode is executed to the non-worn state, the electronic device may change a security level.

Thereafter, when the user unfolds the electronic device as indicated by reference numeral 750 of FIG. 7, the electronic device may recognize bending release in step 2217, and switch the electronic device to the non-worn state operation mode in step 2219.

When the electronic device switches from the non-worn state to the worn state, the electronic device may switch to a suitable function and/or UI by which successive operations can be performed in the worn state by analyzing the operation performed in the non-worn state when bending is recognized.

Figure 23:
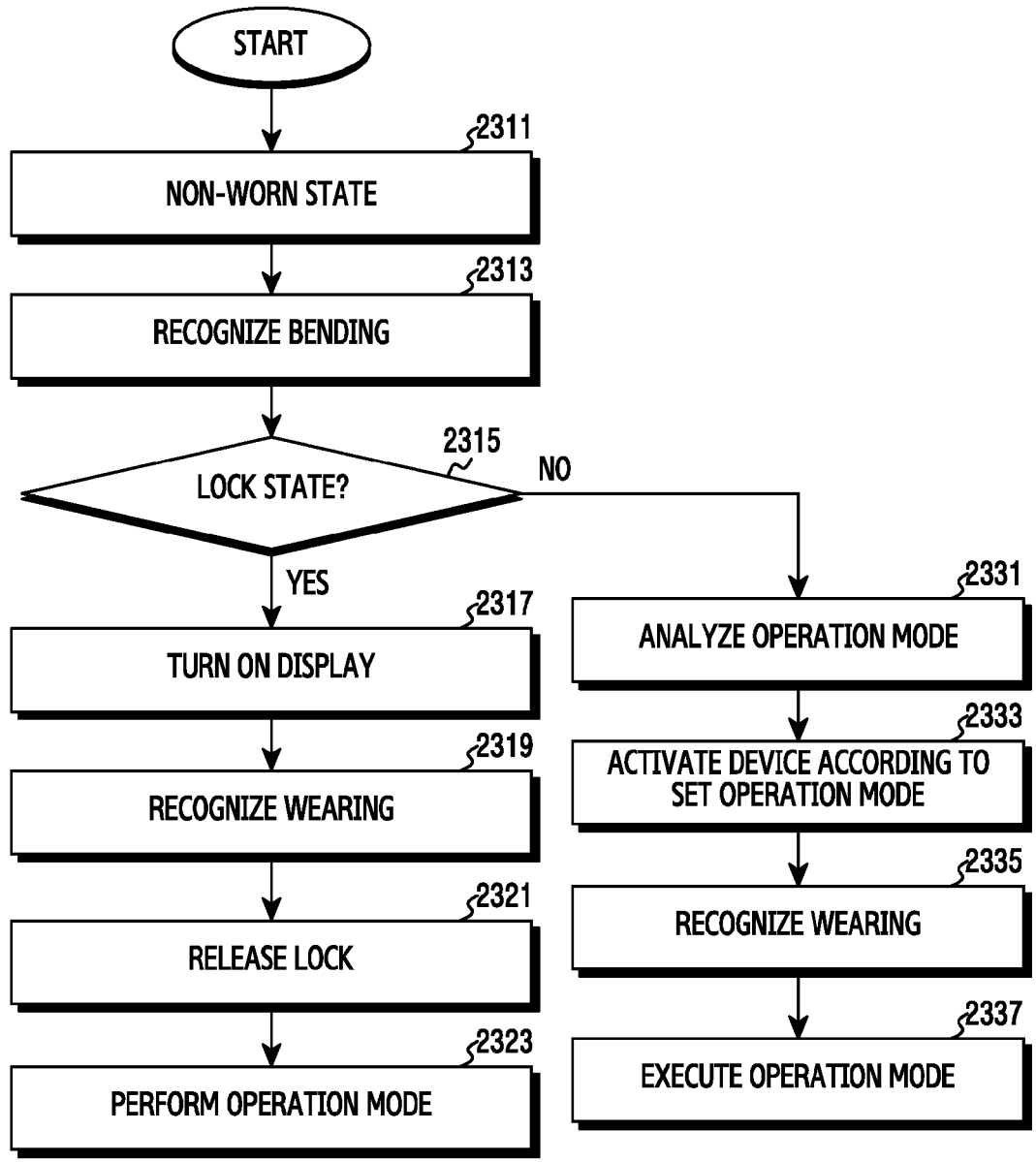
FIG. 23 is a flowchart of a method for when an electronic device switches from a non-worn state to a worn state, according to an embodiment of the present disclosure.

FIG. 23 is a flowchart of a method for when the electronic device switches from the non-worn state to the worn state, according to an embodiment of the present disclosure.

Referring to FIG. 23, the electronic device may be in the non-worn state in step 2311 and may perform a set operation in the non-worn state. When the user bends the electronic device in the non-worn state to wear the electronic device, the electronic device may recognize the bending of the electronic device in step 2313. The electronic device may recognize the bending of the electronic device through one or more of the various methods described above. For example, when a set touch input is recognized, the electronic device may activate a pressure sensor and, when the pressure sensor recognizes a touch input having a set pressure intensity, recognize the bending of the electronic device. The set touch input may be multiple touch inputs, multiple touch inputs detected at set locations, and an input detected at a particular location (for example, a touch input at a particular location where the touch panel is activated even in a turned off state or a particular button input (for example, a home button)). Further, the electronic device may activate the pressure sensor when a set touch input is recognized, activate the medical sensor when the pressure sensor recognizes the pressure having the set pressure intensity, and recognize the bending of the electronic device when the medical sensor recognizes the user's body. The electronic device may activate the bending sensor when the set touch input is recognized, and recognize the bending of the electronic device when the bending sensor recognizes the bending of the electronic device. The electronic device may activate the bending sensor when the multiple touch inputs are recognized, activate the medical sensor when the bending sensor detects the bending of the electronic device, and recognize the bending of the electronic device when the medical sensor recognizes the body. The electronic device may activate the pressure sensor in the non-worn state, activate the bending sensor and/or the medical sensor when the pressure sensor recognizes multiple pressures having the set pressure intensity, and recognize the bending of the electronic device when the bending sensor and/or the medical sensor recognizes the bending and/or the body detection of the electronic device. The bending of the electronic device may be recognized through other methods not herein described.

When the bending of the electronic device is recognized, an operation of the electronic device in the non-worn state may be analyzed in step 2315. When the electronic device in the non-worn state is in a lock state, the electronic device may recognize the lock state in step 2315, and may turn on the display 160 in step 2317. When the display 160 is activated, the electronic device may activate the display area of the display 160 such that an area in which information is displayed and a user's touch input can be performed in a relatively efficient manner. For example, an area of the screen which the user can easily view after wearing the electronic device may be set as a main display area and an area of the screen which the user cannot easily view may be set as a sub display area. Further, the electronic device may set the display area of the display 160 such that the main display area is brighter than the sub display area, and activate the touch panels of the input unit 150 to detect a touch input in an entire area.

The electronic device may display a lock release window into which lock release information can be input on the activated display 160 in step 2317. The lock release window may be displayed as a fingerprint input window, a pattern information input window, or a password input window. When the lock release information is registered as a fingerprint, the electronic device may include a fingerprint recognition sensor in a touch screen sensor. The fingerprint recognition sensor may have the configuration as illustrated in FIGS. 10A and 10B, and may be configured in a manner consistent with one of the methods illustrated in FIGS. 11A to 11C. The fingerprint recognition sensor may be implemented through the method illustrated in FIG. 12B. Further, when displaying the fingerprint input window on the display 160, the electronic device may use one of the display methods illustrated in FIG. 12.

When the user wears the electronic device on the body (for example, wrist), the electronic device may recognize the wearing of the electronic device through a coupling sensor and maintain the lock release window (for example, the fingerprint input window, the pattern input window, or the password input window) on the display 160 in step 2319. Further, when the user inputs lock release information (for example, a fingerprint touch, pattern information, and a password) into the lock release window, the electronic device may analyze the input lock release information, release the lock state when the lock release information matches registered information, and display initial screen information on the display 160 in step 2321.

Thereafter, the electronic device may provide an operation mode set by the user in the worn state in step 2323.

When the electronic device is not in the lock state at a bending recognition time, the electronic device may recognize it in step 2315, and may analyze an operation mode executed in the non-worn state in step 2331. Further, the electronic device may activate a function and/or a UI according to the analyzed operation mode in step 2333. When the electronic device switches from the non-worn state to the worn state (when the user bends the electronic device to be worn), the electronic device may activate the function and/or the UI of the executed operation mode while the electronic device is bent in order to perform the operation before wearing the electronic device and after the electronic device is no longer worn. Further, the electronic device may set screen areas (for example, the main display area and the sub display area) of the display 160 to be displayed after the electronic device is worn in step 2333. For example, when the electronic device is executing a biometric measurement mode, the electronic device may set the main display area and the sub display area of the display 160, turn on the medical sensor, and display the biometric measurement mode in the main display area while the electronic device is bent or being bent. When the electronic device is performing a voice call, the electronic device may set the main display area and the sub display area of the display 160, activate a speaker phone or speaker of the electronic device, and switch to a speaker phone call mode while the electronic device is bent. Further, when the electronic device switches from the non-worn state to the worn state, the electronic device may switch to a lock state and, when bending is recognized, display a lock release input window on the display 160. A function for switching to the lock state may be set in the electronic device by default or may set by the user. Further, under a condition that the electronic device executes an operational mode in the non-worn state and does not switch to the lock state when switching to the worn state, the electronic device may not display the lock release input window when the electronic device is bent.

When the user bends and wears the electronic device, the electronic device may recognize the wearing of the electronic device through the coupling sensor in step 2335, and continuously perform an operation mode executed in the non-worn state in step 2337. Since the electronic device was previously activated, the function and/or the UI executed in the non-worn state while the electronic device is bent may be rapidly and consistently performed after wearing the electronic device. When the executed operation mode ends, the electronic device may process the end of the operation mode and switch to a sleep state or a lock state in step 2337. Further, when another operation mode is set by the user, the electronic device in the worn state may perform the set operation mode again in step 2337.

Figure 24:
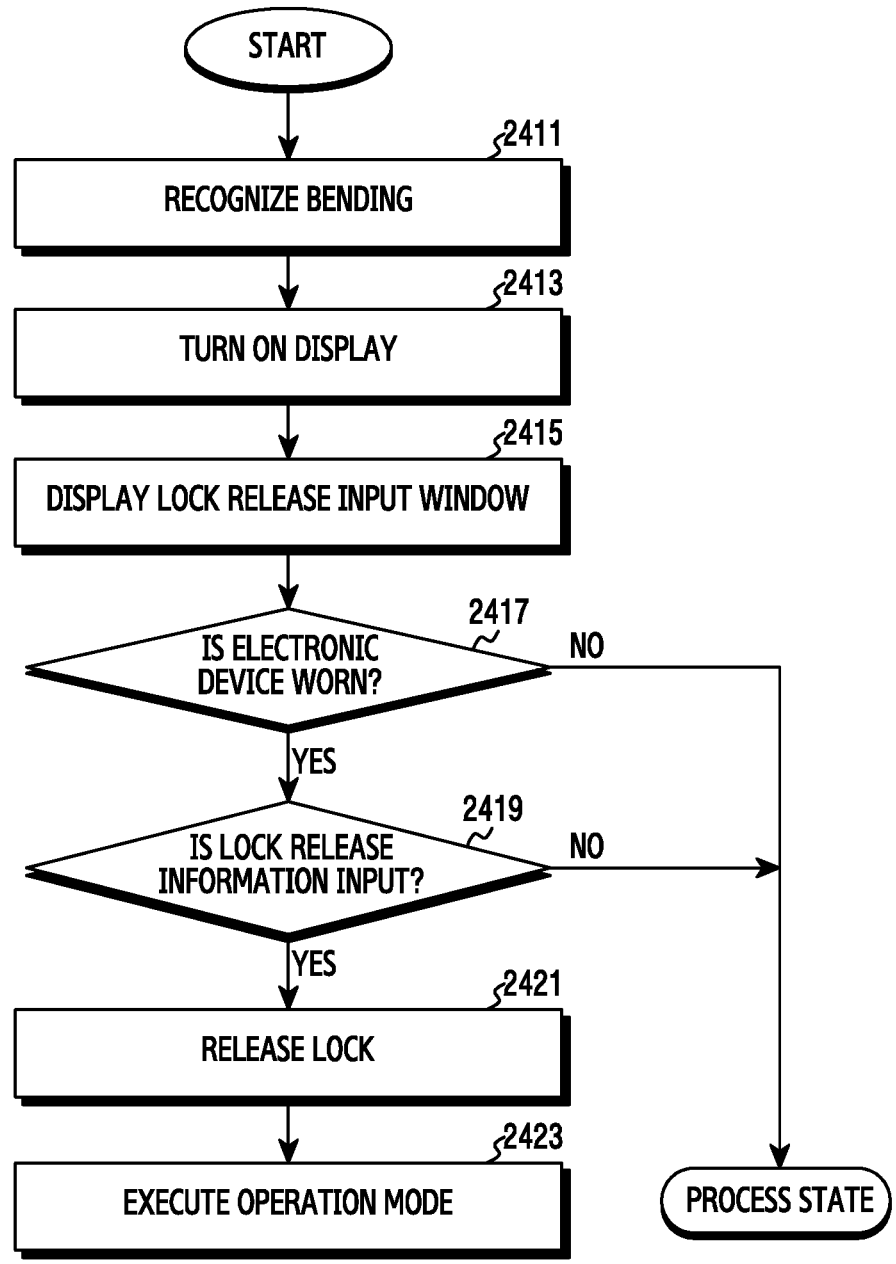
FIG. 24 is a flowchart of a lock state release method of an electronic device, according to an embodiment of the present disclosure.
Figure 25:
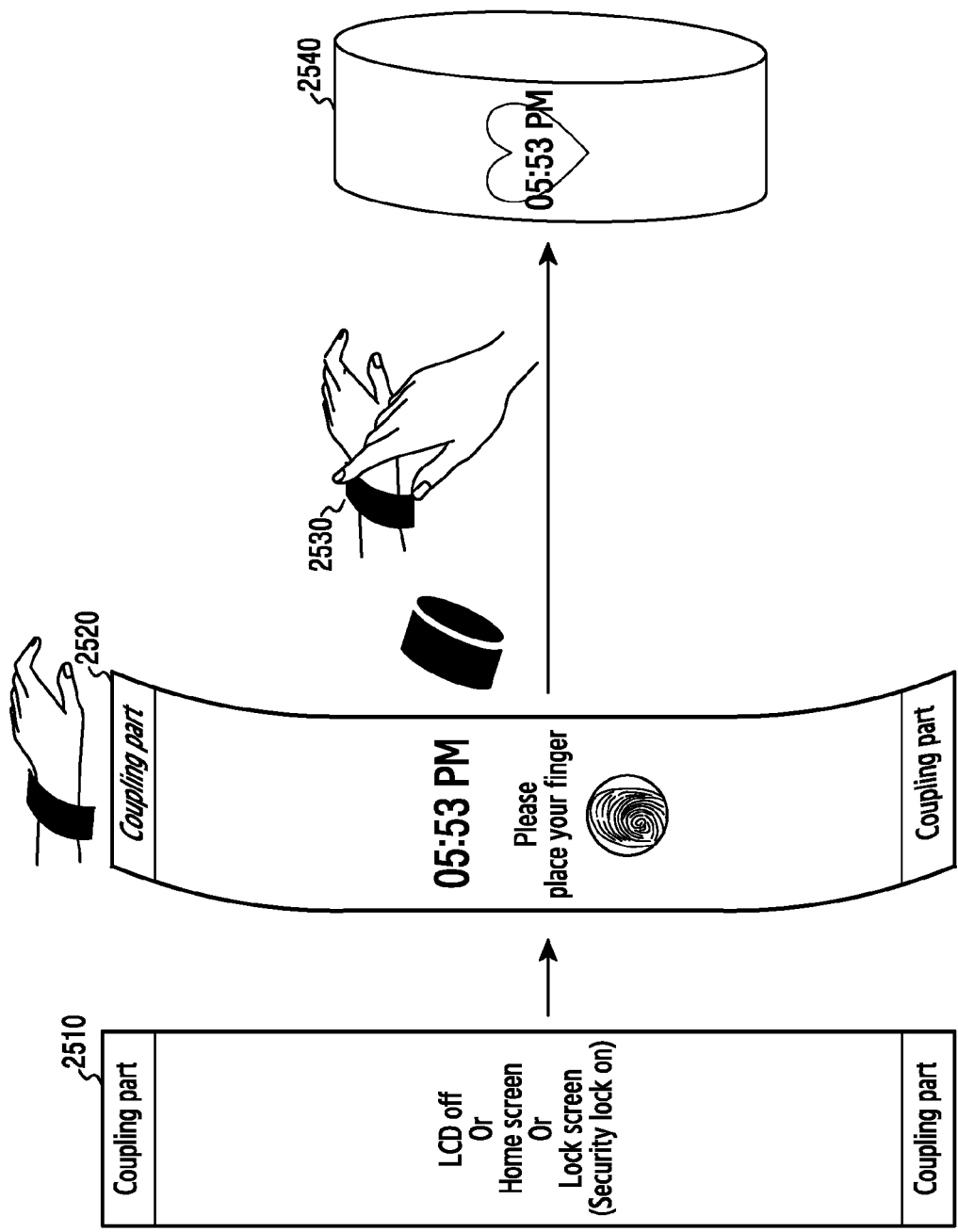
FIG. 25 is a diagram illustrating an example of displaying a lock state release operation of an electronic device, according to an embodiment of the present disclosure.

FIG. 24 is a flowchart of a lock state releasing method of the electronic device, according to an embodiment of the present disclosure. FIG. 25 is a diagram illustrating an example of displaying a lock state release operation of the electronic device, according to an embodiment of the present disclosure.

Referring to FIG. 24, when bending is recognized in the non-worn state of the lock state in step 2411, the electronic device may turn on the display 160 in step 2413, and display a lock release input window in step 2415. At this time, when the display 160 is turned on, the electronic device may activate an entire area of the display 160, or set the display area of the display 160 as a main display area and a sub display area according to the worn state, and may display the main display area brighter than the display of the sub display area. When the user wears the electronic device, the electronic device may recognize the wearing of the electronic device through the coupling sensor in step 2417 and, when the user inputs lock release information into the lock release input window, detect the input of the lock release information in step 2419. Then, the electronic device may analyze the input lock release information and, when the input lock release information is registered lock release information, release the lock state of the electronic device in step 2421 and process a function of a set operation mode in step 2423.

Referring to FIG. 25, in the non-worn state 2510, the lock state of the electronic device may be an off state of the display 160, a home screen state, or a state where a lock screen is displayed. Thereafter, when the user bends the electronic device to wear the electronic device from the non-worn state as indicated by reference numeral 2520, the electronic device may recognize the bending in step 2411, turn on the display 160 in step 2413, and display a lock release input window in step 2415. Reference numeral 2520 of FIG. 25 indicates an example where the display area of the display 160 is not used as the main and sub display areas in the worn state and an example where a lock function is executed by a fingerprint. Thereafter, when the user wears the electronic device as indicated by reference numeral 2530, the electronic device may release the lock state of the electronic device according to a fingerprint input and display lock-released screen information on the display 160 as indicated by reference numeral 2540.

Figure 26:
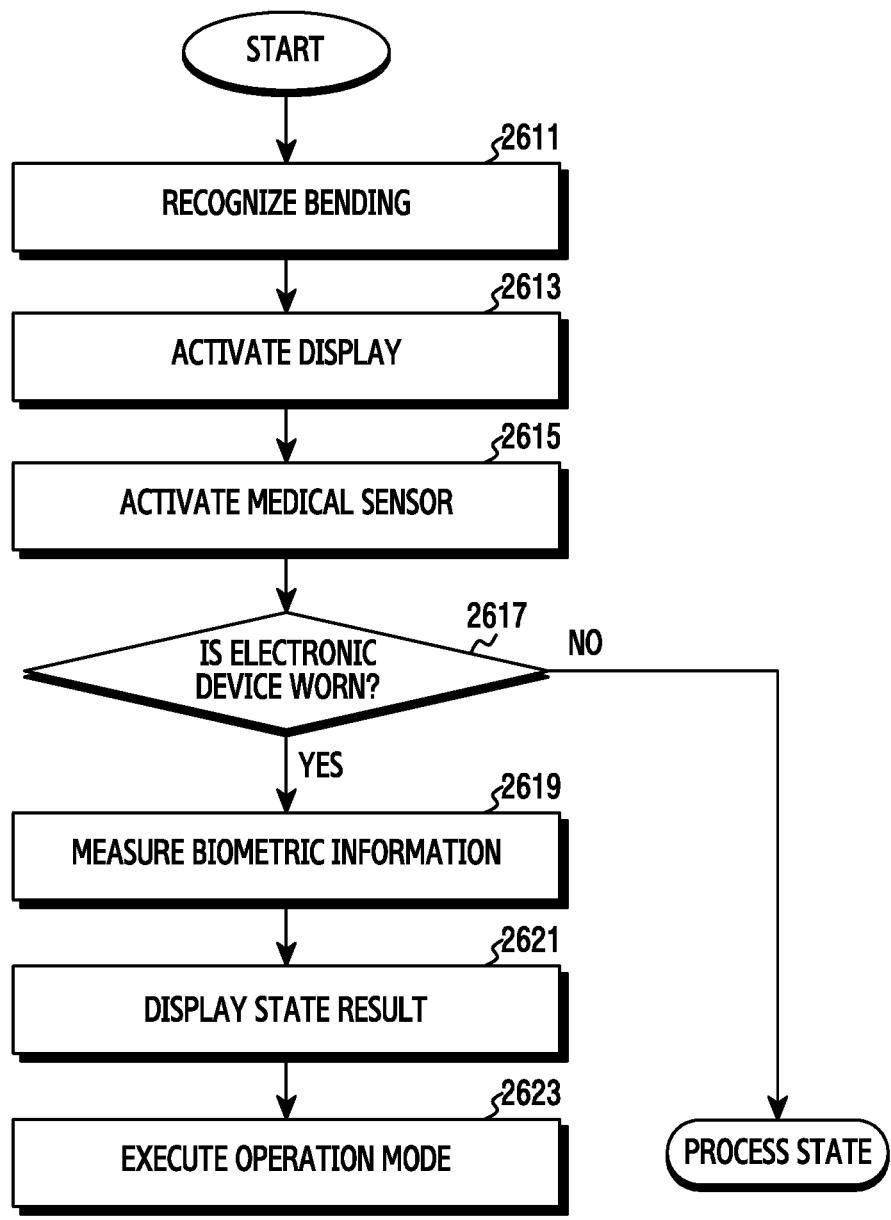
FIG. 26 is a flowchart of a biometric measurement method of an electronic device, according to an embodiment of the present disclosure.
Figure 27:
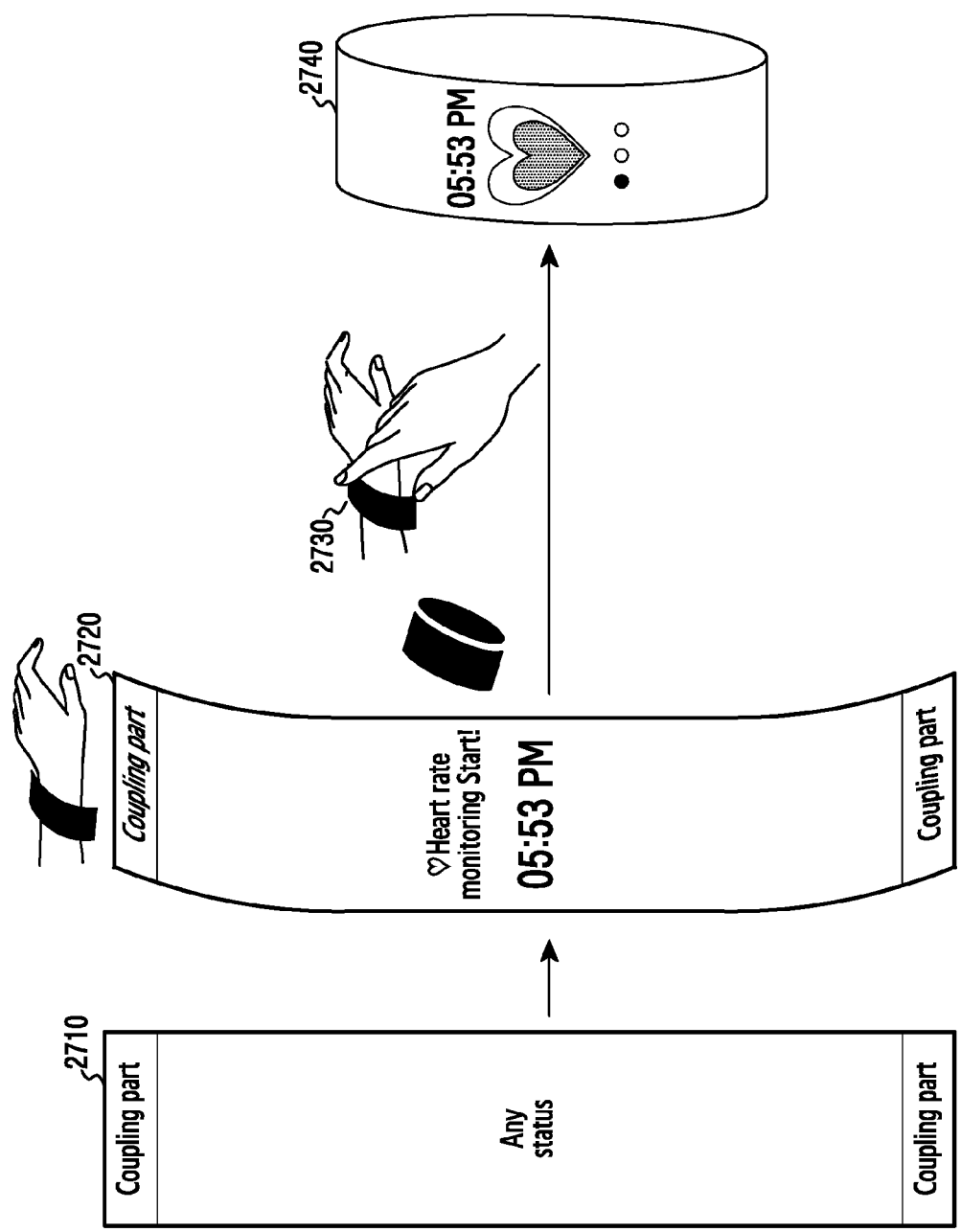
FIG. 27 is a diagram illustrating an example of displaying a biometric measurement operation of an electronic device, according to an embodiment of the present disclosure.

FIG. 26 is a flowchart of a biometric measurement method of the electronic device, according to an embodiment of the present disclosure. FIG. 27 is a diagram illustrating an example of displaying a biometric measurement operation of the electronic device, according to an embodiment of the present disclosure.

Referring to FIG. 26, the biometric measurement may be set in the non-worn state, and, when the non-worn state switches to the worn state, the set biometric measurement may be continuously performed. Further, the biometric measurement may be automatically performed when the non-worn state switches to the worn state. Further, the biometric measurement may be automatically performed when the electronic device is worn in a particular situation. For example, the particular situation may correspond to when the electronic device is in the non-worn state for a relatively long period of time (for example, the user releases the wearing of the electronic device to go to sleep and then wakes up and wears the electronic device), when a time set by the user arrives, or after exercise.

When bending of the electronic device is recognized in the non-worn state in step 2611, the electronic device may activate the display 160 in step 2613. When the display 160 is activated, the electronic device may activate the entire display area, set the display area of the display 160 as a main display area and a sub display area according to the worn state, and display the main display area brighter than the sub display area. Further, a lock release input window may be displayed according to a state of the electronic device. When a biometric measurement mode is performed, the electronic device may activate a medical sensor in step 2615. The electronic device may display information on the activation of the medical sensor on the display 160 in step 2615.

When the user wears the electronic device, the electronic device may recognize the wearing of the electronic device through a coupling sensor in step 2617, and perform a biometric measurement operation in step 2619. When the biometric information measurement operation is performed, the electronic device may display a menu according to a biometric measurement type in step 2619, and display a guide information to instruct the user to maintain a state optimized for the biometric measurement. For example, an HRM sensor may be installed on the back surface (surface that contacts the user's body when the electronic device is worn) of the display of the electronic device. The user can make the HRM sensor accurately or sufficiently contact the user's body by applying a pressure to an area where the HRM sensor is located. Such guide information may be displayed on the display 160 or may be provided through a voice. The biometric measurement operation of the set type may be performed through the contact with the user's body. When the biometric measurement operation ends, the electronic device may store a biometric measurement result in the memory 110 and display the result on the display 160 in step 2621. When the biometric measurement operation ends, the electronic device may display a standby mode screen on the display 160 in step 2623. Further, other operation modes set by the user may be performed.

The biometric measurement mode may include a state where the user sets the biometric measurement mode, a particular situation set to execute the biometric measurement mode, and/or a case where the electronic device is worn (for example, a case set to automatically execute the biometric measurement mode when the electronic device switches from the non-worn state to the worn state).

Referring to FIG. 27, the electronic device in the non-worn state 2710 may execute a biometric measurement mode or another operation mode, or may be in a lock state. When the user bends the electronic device to wear the electronic device as in the non-worn state 2710 of the electronic device indicated by reference numeral 2720, the electronic device may recognize the bending in step 2611, and activate the display 160 in step 2613. At this time, the electronic device may display a lock release input window after activating the display 160 in step 2613. Further, the electronic device may activate a medical sensor in step 2615. Reference numeral 2720 of FIG. 27 illustrates an example where the display area of the display 160 is not used as main and sub display areas in the worn state and an example where information on activation of an HRM sensor corresponding to the medical sensor is displayed. When the user wears the electronic device as indicated by reference numeral 2730, the electronic device may display a measurement state of the biometric measurement mode while providing guide information for the biometric measurement 2740 in step 2619. When the biometric measurement ends, the electronic device may display a biometric measurement result on the display 160.

Figure 28:
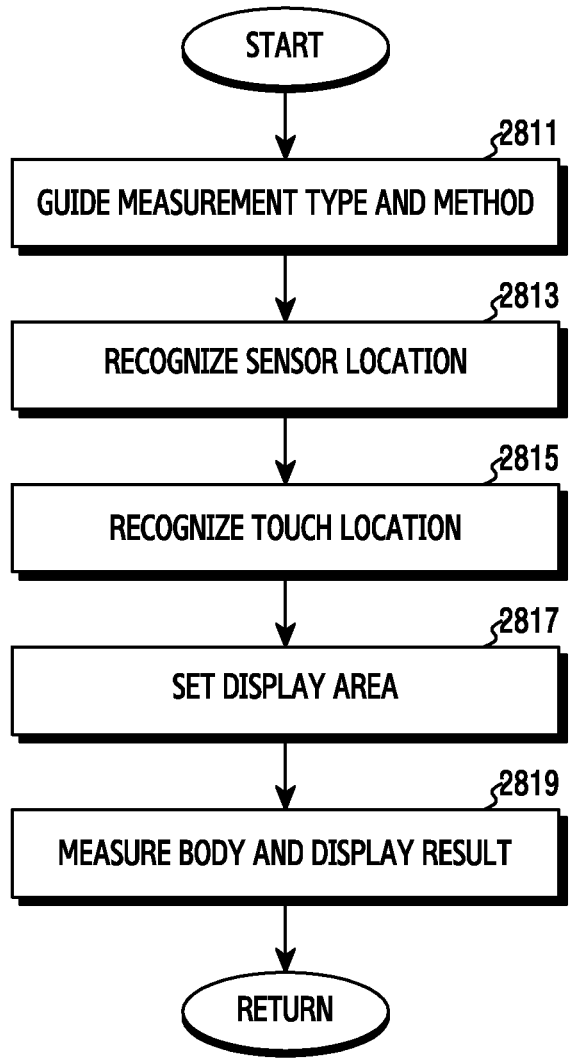
FIG. 28 is a flowchart of a biometric measurement method of an electronic device, according to an embodiment of the present disclosure.
Figure 29A:
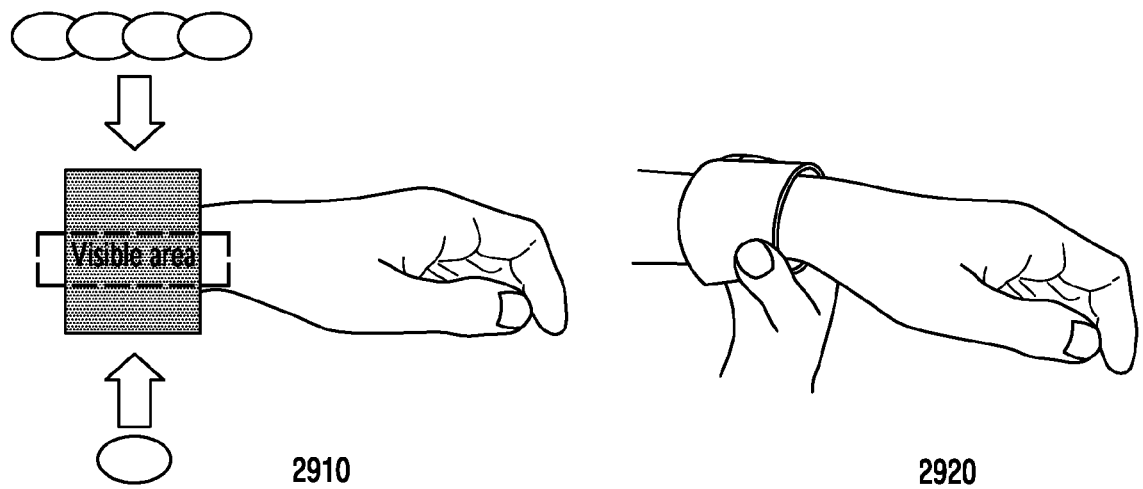
FIGS. 29A and 29B are diagrams illustrating an example of displaying a biometric measurement method of an electronic device, according to an embodiment of the present disclosure.
Figure 29A:
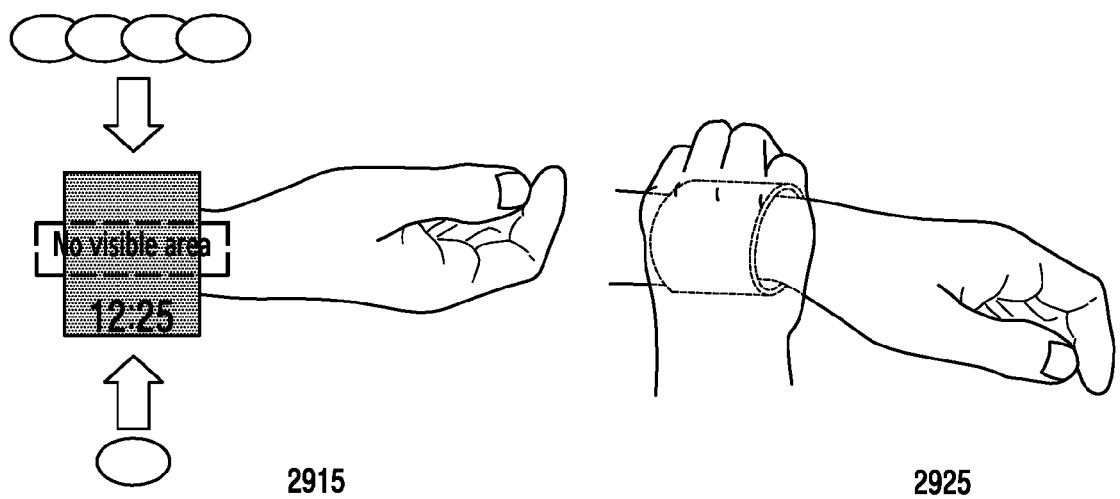
Figure 29B:
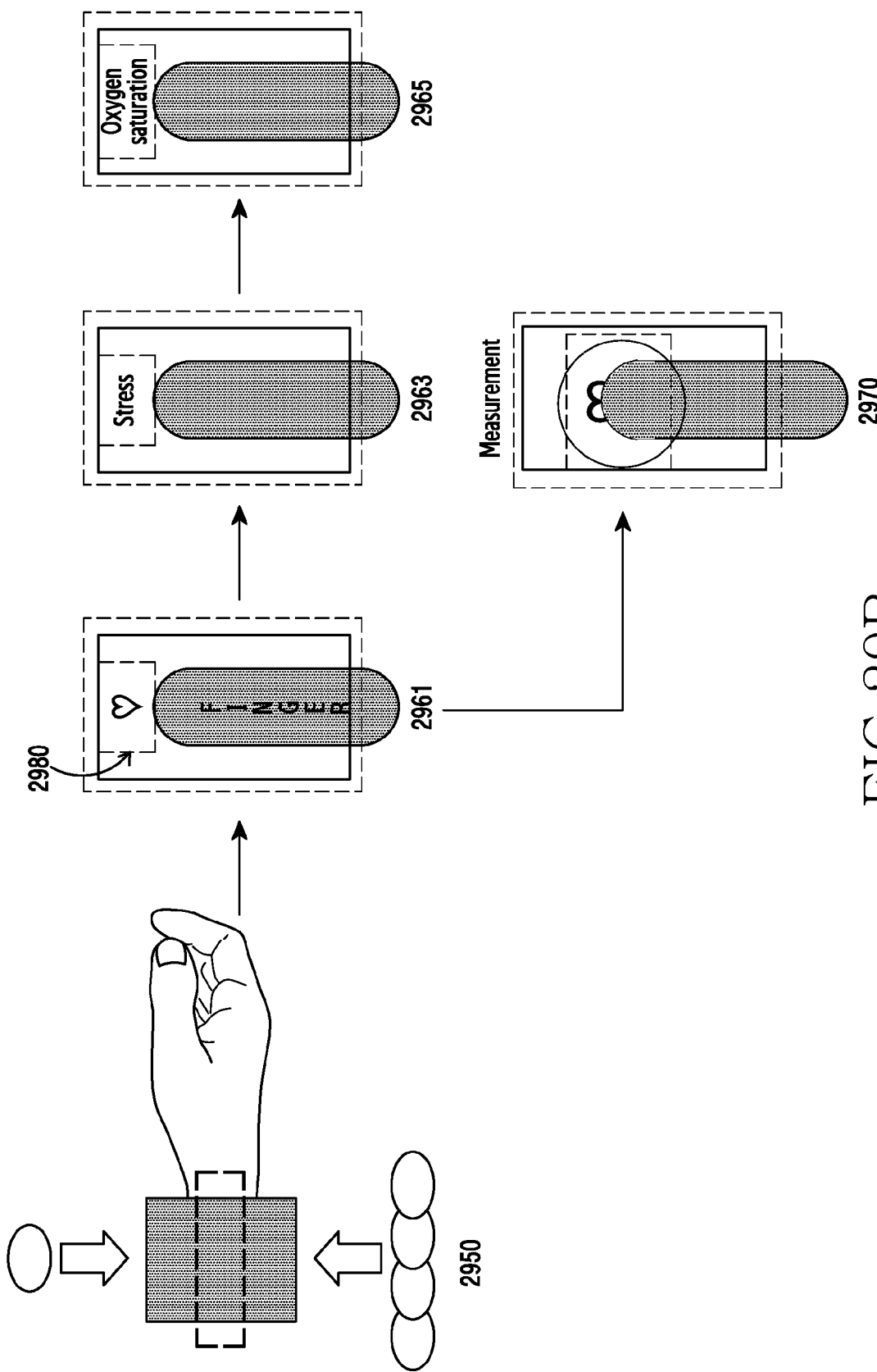

FIG. 28 is a flowchart of a biometric measurement method of the electronic device, according to an embodiment of the present disclosure. FIGS. 29A and 29B are diagrams illustrating an example of displaying a biometric measurement operation of the electronic device, according to an embodiment of the present disclosure.

The medical sensor may be an HRM sensor. The HRM sensor may be arranged on the back surface of the electronic device and, when the user wears the electronic device, may contact a user's body (for example, wrist). The HRM sensor may have the configuration illustrated in FIG. 9A, and a signal measured by the HRM sensor may be processed by the configuration illustrated in FIG. 9C. When the electronic device includes the HRM sensor having the configuration illustrated in FIG. 9A, the electronic device may measure a heart rate, stress, and oxygen saturation. When the biometric measurement mode is executed by the HMR sensor, the user may apply pressure to a location where the HRM sensor is installed and thus the HRM sensor can properly contact the user's body. In order to apply the pressure to the HRM sensor, the user may point to a partial area of the display 160 with a user's finger. When the body is measured by the HRM sensor, the electronic device may display a biometric measurement operation in a display area other than areas hidden by the user's finger.

FIG. 28 is a flowchart illustrating the step 2619 of FIG. 26. Referring to FIG. 28 and FIGS. 29A to 29B, the electronic device may display information for guiding a biometric measurement type and a biometric measurement method in step 2811. The information may be displayed on the display 160 or may be announced or outputted as a voice through a speaker. The biometric measurement type may be a heart rate 2961, stress 2963, and oxygen saturation 2965. Further, the biometric measurement method may be a notification message to start the measurement by pressing an area where the HRM sensor is located to make the HRM sensor contact the user's body. The electronic device may recognize a direction in which the electronic device is worn in step 2813. The electronic device may be worn such that the HRM sensor is located on the outside of the wrist as indicated by reference numeral 2910 of FIG. 29A and may be worn such that the HRM sensor is located on the inside of the wrist as indicated by reference numeral 2915 of FIG. 29A.

Thereafter, the electronic device may recognize a location (touch location and area) where the HRM sensor is squeezed (or pressed) in step 2815. When the HRM sensor is squeezed, a visible area of the display 160 may be a side surface of the wrist 2910 of FIG. 29A (for example, a thumb direction or an edge of the hand direction). When the FIRM sensor is squeezed as indicated by reference numeral 2920 of FIG. 29A, the visible area of the display is not hidden by the user's hand, but, when the HRM sensor is squeezed as indicated by reference numeral 2925 of FIG. 29A, the visible area of the display may be hidden by the user's hand. Accordingly, when executing the biometric measurement mode through the HRM sensor, it may prove advantageous for the user to squeeze the HRM sensor such that the visible area of the display 160 is not hidden.

After recognizing the location of the HRM sensor and the squeezed location, the electronic device may set the visible area on the display 160 in step 2817. Further, the electronic device may perform the biometric measurement operation of the set type, store a measurement result in the memory 110, and display the result on the display 160 in step 2819.

When the squeezing of the sensor for the biometric measurement is recognized in the biometric measurement mode as indicated by reference numeral 2950 of FIG. 29B, the electronic device may recognize a direction of the HRM sensor (for example, a direction (top/bottom) of the electronic device), recognize a location (touch location) where the squeezing is applied and a touch area, and then set a visible area 2980 where the measurement result can be displayed on the display 160. The areas 2961, 2963, and 2965 of FIG. 29B which are not hidden by the fingers may be set as the visible area 2980. Thereafter, the electronic device may perform the biometric measurement operation as indicated by reference numeral 2970 of FIG. 29B, while displaying a measurement menu and a measurement progress status in the visible area of the display 160.

Figure 30:
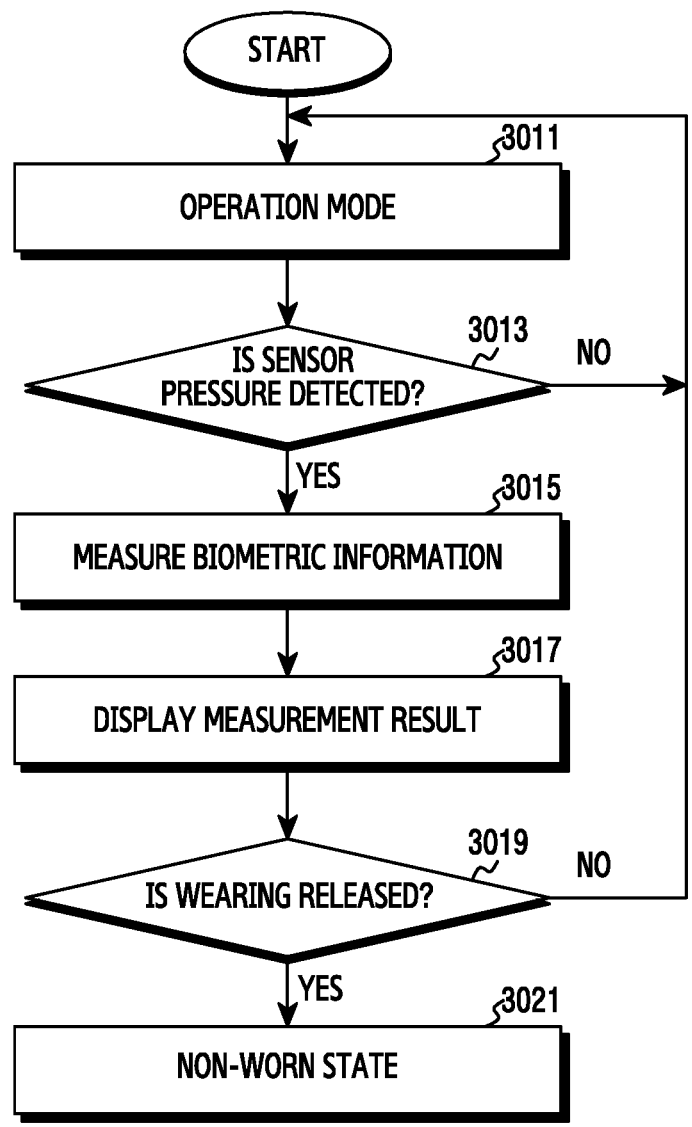
FIG. 30 is a flowchart of a biometric measurement method, in a worn state of an electronic device, according to an embodiment of the present disclosure.
Figure 31:
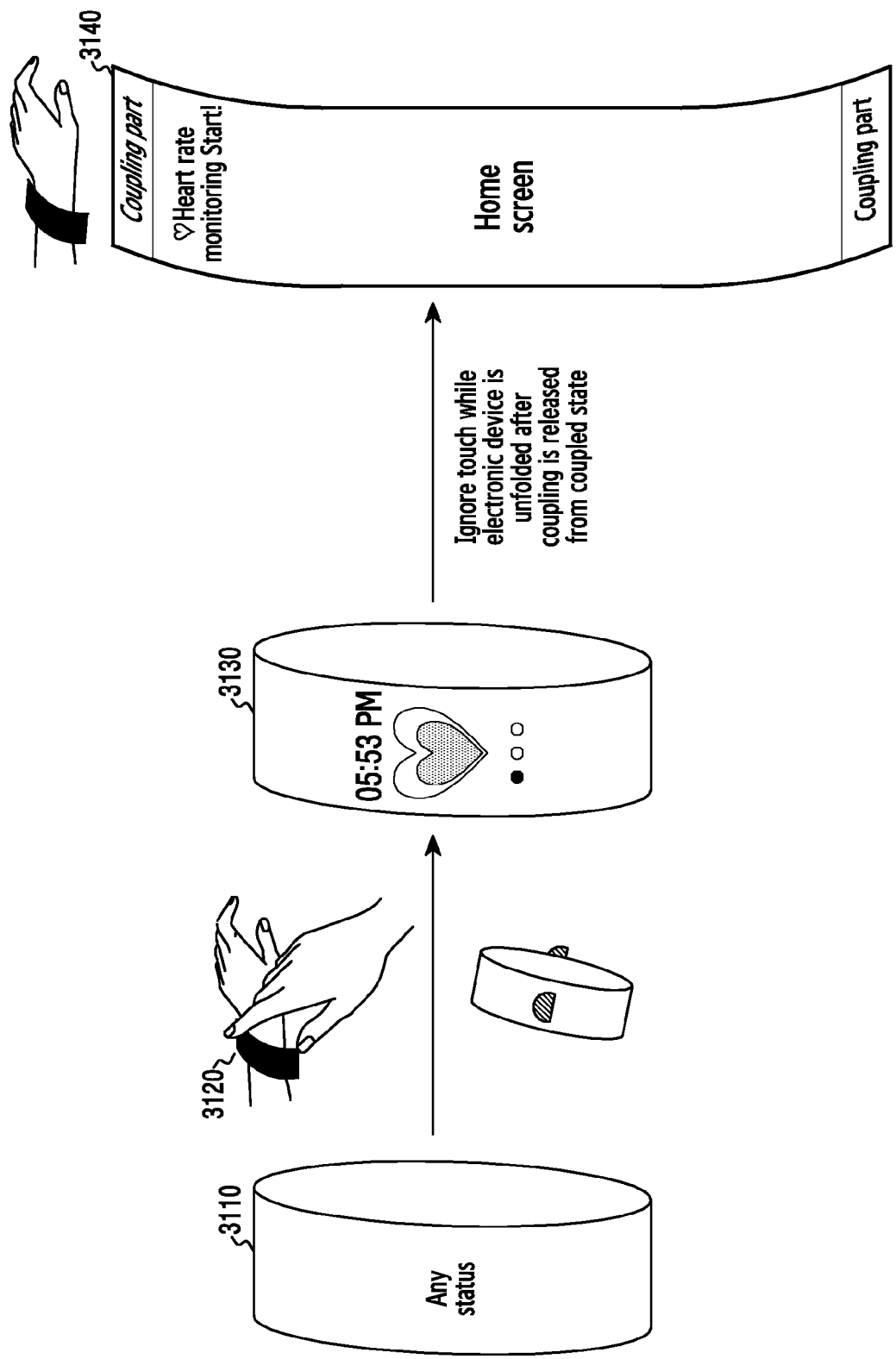
FIG. 31 is a diagram illustrating an example of displaying a biometric measurement method performed in a worn state of an electronic device, according to an embodiment of the present disclosure.

FIG. 30 is a flowchart of a biometric measurement method in the worn state of the electronic device, according to an embodiment of the present disclosure. FIG. 31 is a diagram illustrating an example of displaying a biometric measurement operation performed in the worn state of the electronic device, according to an embodiment of the present disclosure.

The electronic device may perform various operations according to a multi-touch interaction in the worn state. As illustrated in FIGS. 20 and 21, the electronic device may perform each of the set functions according to multiple touches and a pressure intensity of touch inputs. When multiple touches including a location of the medical sensor or a location adjacent to the medical sensor are recognized and squeezing of the medical sensor is recognized in the worn state, the electronic device may automatically execute the biometric measurement mode.

Referring to FIG. 30, the electronic device may be in the worn state and the worn electronic device may execute a status operation mode in step 3011. In a state where the electronic device is worn, the user may squeeze the medical sensor and execute the biometric measurement mode. When the biometric measurement is performed, the user may squeeze the medical sensor of the worn electronic device. When pressure is recognized at locations including the location where the medical sensor is installed, the electronic device may recognize the pressure as a biometric measurement demand in step 3013, and perform the biometric measurement operation in step 3015. The biometric measurement may be performed through the method illustrated in FIG. 28 and FIGS. 29A to 29B. Further, the electronic device may store a measured biometric result in the memory 110 and display the result on the display 160 in step 3017.

When the wearing of the electronic device is released during the biometric measurement operation, the electronic device may recognize the release of the wearing of the electronic device through a coupling sensor in step 3019 and stop the measurement operation in step 3021. A touch input may be ignored while the bending is released (while the electronic device is unfolded) after the release of the wearing of the electronic device.

Referring to FIG. 31, in a state 3110 where the electronic device is worn, the electronic device may perform a predetermined operation mode. When multiple touches and squeezing are applied to locations including the medical sensor as indicated by reference numeral 3120 in the state 3110 where the electronic device is worn, the electronic device may recognize the multiple touches and squeezing, activate the medical sensor, and execute the biometric measurement mode as indicated by a reference numeral 3130. Further, when the wearing of the electronic device is released after the biometric measurement mode ends or while the biometric measurement mode is performed, the wearing of the electronic device is released as indicated by a reference numeral 3140, and thus the touch input may be ignored and information indicating that the biometric measurement mode is released may be displayed while the bending of the electronic device is released. In addition, when the worn state is released and the electronic device switches to the non-worn state, the electronic device may display a home screen on the display 160 as indicated by the reference numeral 3140.

Figure 32:
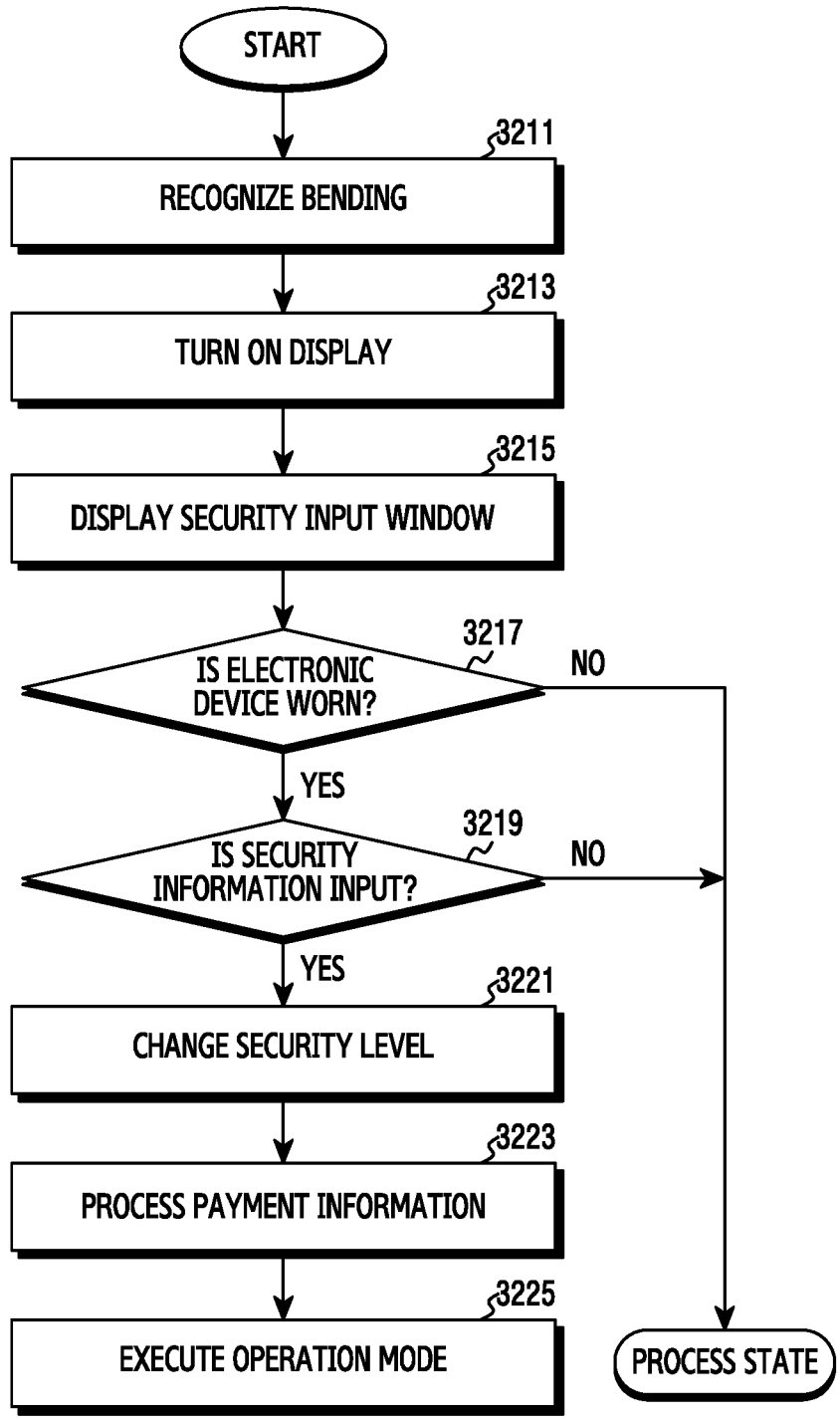
FIG. 32 is a flowchart of a payment method of an electronic device, according to an embodiment of the present disclosure.
Figure 33:
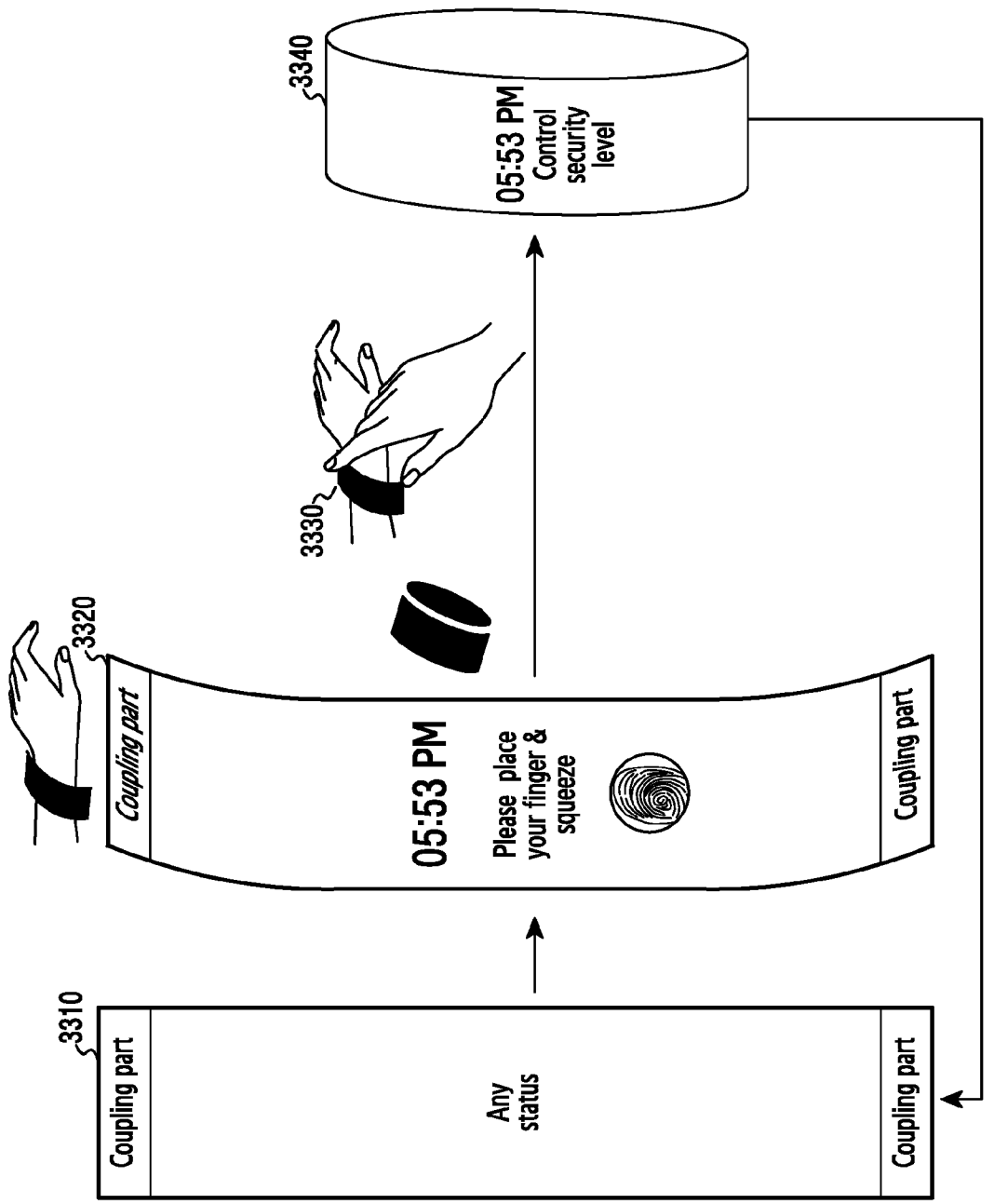
FIG. 33 is a diagram illustrating an example of displaying a payment method of an electronic device, according to an embodiment of the present disclosure.

FIG. 32 is a flowchart of a payment method of the electronic device, according to an embodiment of the present disclosure. FIG. 33 is a diagram illustrating an example of displaying a payment operation of the electronic device, according to an embodiment of the present disclosure.

Referring to FIG. 32, the payment operation may be set by the user in the non-worn state, and the set payment operation may be continuously performed when the electronic device switches to the worn state. Further, the payment operation may be automatically performed when the electronic device is worn in a particular place (for example, a particular place in which the payment operation is frequently performed (for example, a department store, a restaurant, or a shop)). For example, the payment operation may be executed when a POS terminal device of a counter is recognized in a particular place.

When bending of the electronic device is recognized in the non-worn state in step 3211, the electronic device may activate the display 160 in step 3213. When the display 160 is activated, the electronic device may activate the entire display area, set the display area of the display 160 as a main display area and a sub display area according to the worn state, and display the main display area brighter than the sub display area. The electronic device may display a security input window in step 3215. The security input window may be an input window in the same type of the lock release input window.

When the user wears the electronic device, the electronic device may recognize the wearing of the electronic device through a coupling sensor in step 3217. Further, when the user inputs security information into the security input window, the electronic device may compare and analyze the security information and registered security information in step 3219. When the input security information matches the registered security information, the electronic device may change a security level (security level down) in step 3221. Thereafter, the electronic device may process payment information by driving a payment application in step 3223. After performing the payment operation, the electronic device may display a sleep mode screen on the display 160 in step 3225. Further, other operation modes set by the user may be performed.

Referring to FIG. 33, the electronic device in the non-worn state may set a payment mode as indicated by reference numeral 3310. When the user bends the electronic device to wear the electronic device as indicated by reference numeral 3320 in a state where the payment mode is set, the electronic device may recognize the bending of the electronic device in step 3211 and activate the display 160 in step 3213. After activating the display 160 in step 3213, the electronic device may display a security input window in step 3215. Reference numeral 3320 of FIG. 33 illustrates an example where the display area of the display 160 is not used as main and sub display areas in the worn state and an example where information is displayed on the display 160. When the user wears the electronic device as indicated by reference numeral 3330, the electronic device may analyze the input security information and the registered security information in step 3219 and, when the two pieces of security information match each other, adjust and display a security level to perform the payment operation as indicated by reference numeral 3340. Thereafter, the electronic device may perform the payment operation and display a result processed by the payment operation on the display 160.

Figure 34:
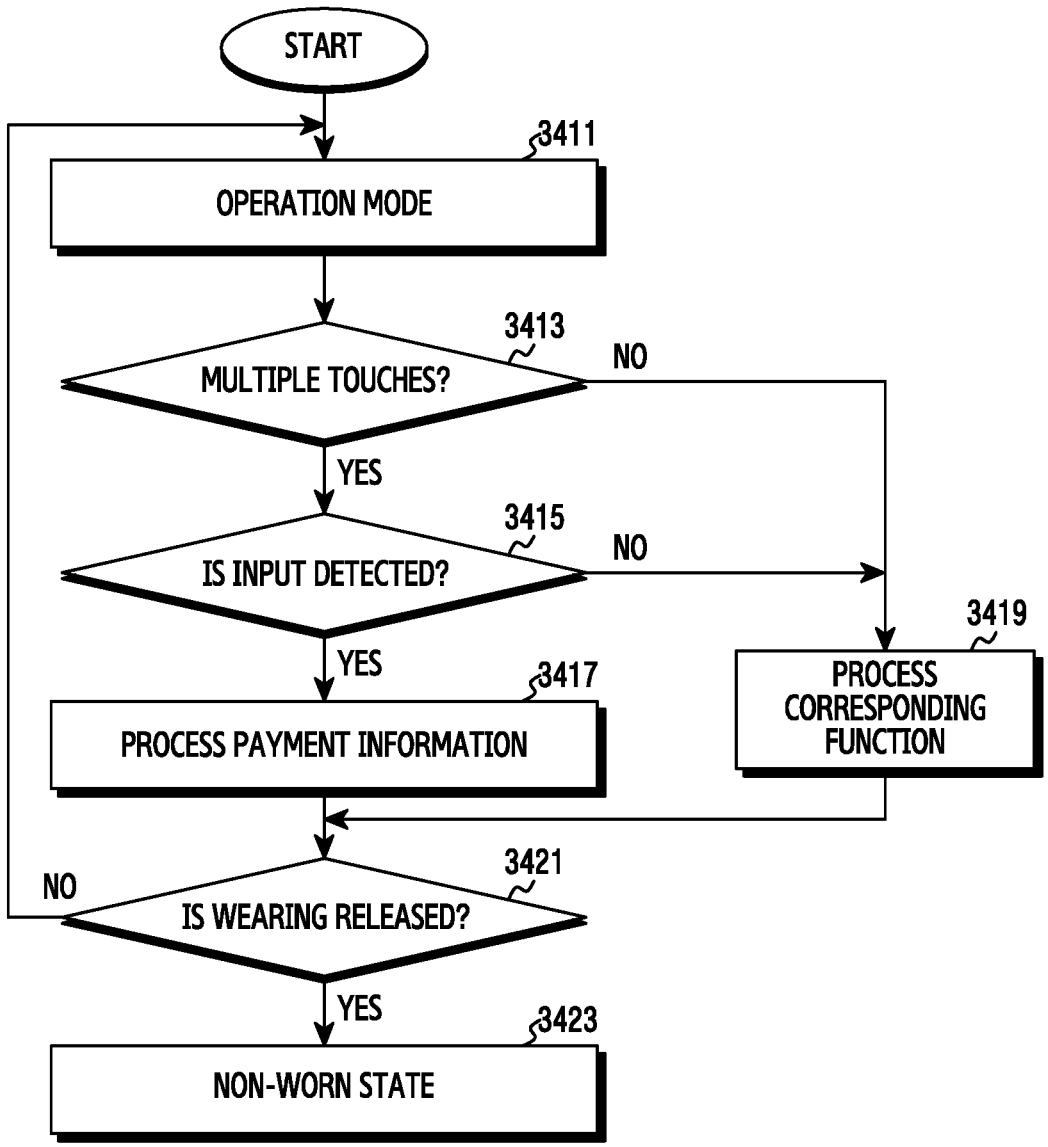
FIG. 34 is a flowchart of a payment method, in a worn state of an electronic device, according to an embodiment of the present disclosure.
Figure 35:
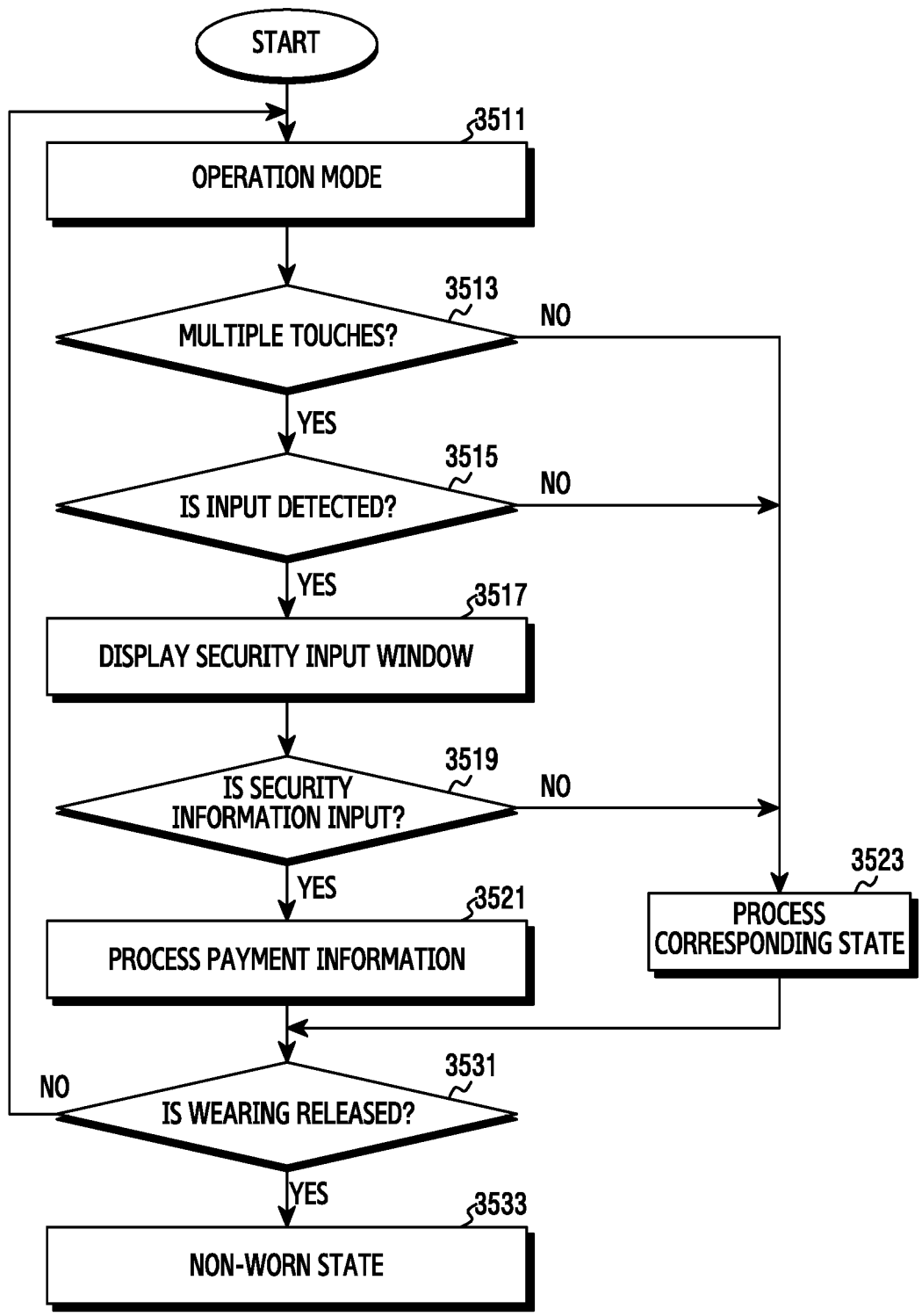
FIG. 35 is a flowchart of a payment method, in a worn state of an electronic, according to an embodiment of the present disclosure.

FIG. 34 is a flowchart of a method for when the electronic device performs a payment operation in the worn state, according to an embodiment of the present disclosure. FIG. 35 is a flowchart of a method for when the electronic device performs the payment operation in the worn state, according to an embodiment of the present disclosure. FIGS. 36A and 36B are diagrams illustrating an example in which the electronic device displays a payment operation in the worn state, according to an embodiment of the present disclosure.

The electronic device may perform various operations according to a multi-touch interaction in the worn state. As illustrated in FIGS. 20 and 21, the electronic device may perform each of the set functions according to multiple touches and a pressure intensity of touch inputs. When any two points are touched in the worn state and pressure having a predetermined intensity is applied, the electronic device may execute a payment mode. For example, when the user makes multiple touches in top and bottom parts and squeezes the electronic device in a state where the user wears the electronic device and when pressure of the two touches has a preset intensity, the electronic device may perform a payment mode without other input.

Referring to FIG. 34, an operation mode of step 3411 may be a sleep mode. When multiple touch inputs are detected in the sleep mode, the electronic device may analyze pressure intensities of the touch inputs in step 3413. When the pressure intensities of the multiple touch inputs are greater than or equal to a predetermined pressure intensity, the electronic device may recognize it in step 3415 and display a payment mode screen on the display 160 in step 3417. Thereafter, a payment processing mode may be executed by a user's input. When the payment mode ends, the electronic device may return to the worn state operation mode of step 3411. However, when the worn state is released while the payment processing mode is processed, the electronic device may detect the release in step 3421 and return to step 3423 to switch to the non-worn state operation mode.

Figure 36:
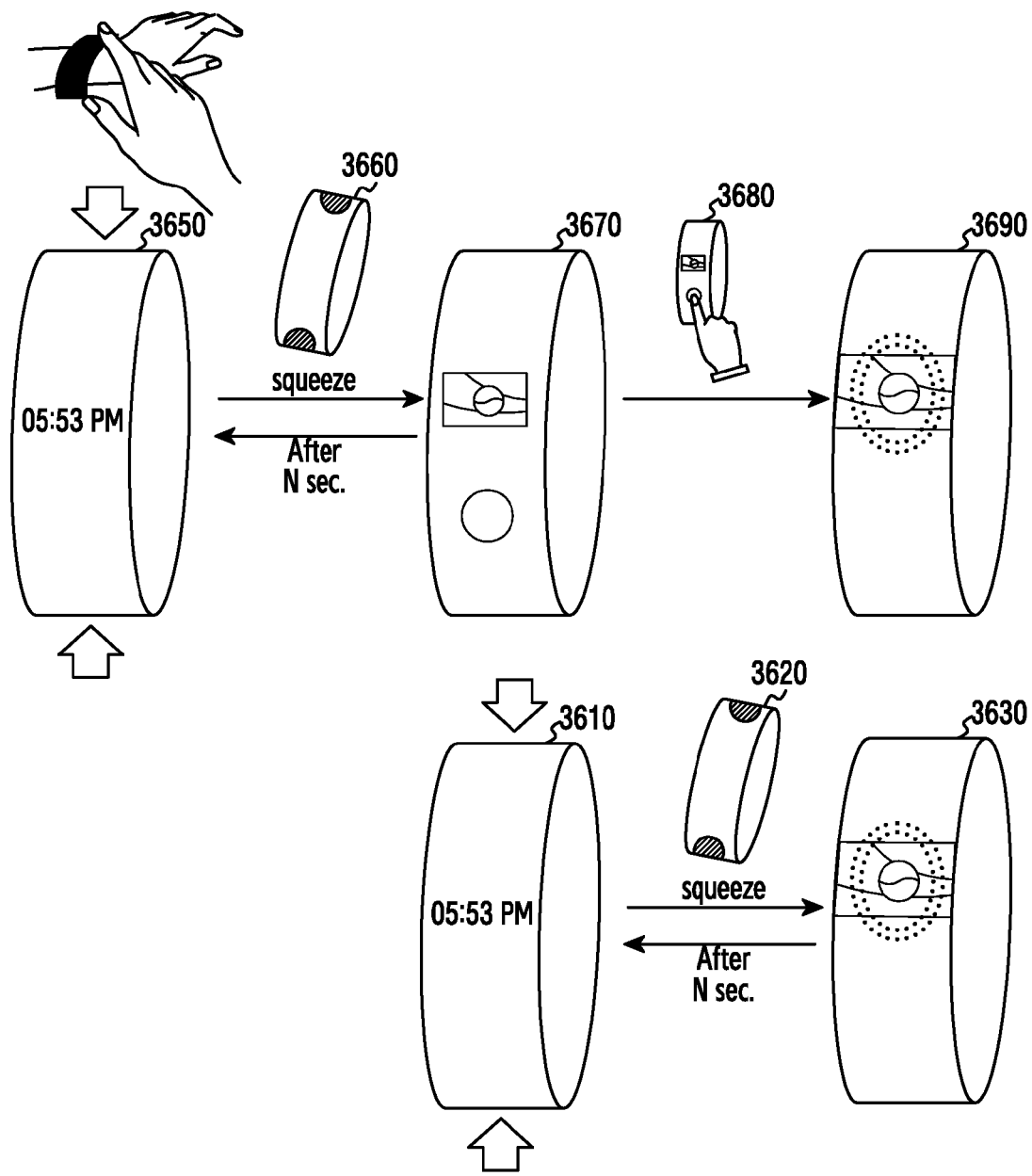
FIG. 36 is a diagram illustrating an example of displaying a payment method in a worn state of an electronic device, according to an embodiment of the present disclosure.

Referring to FIG. 36, in the worn state, the electronic device may have the form as indicated by reference numeral 3610. The reference numeral 3610 may represent a sleep mode of the worn state. When the user touches a top part and a bottom part on the screen of the display 160 in the worn state as indicated by reference numeral 3620 and applies pressure having a predetermined pressure intensity, the electronic device may recognize the multiple touches and the pressure in steps 3413 and 3415 and switch to the payment mode. When the electronic device switches to the payment mode, the electronic device may display a payment mode screen on the display 160 in step 3417 as indicated by reference numeral 3630. Further, the electronic device may display a payment operation processed according to a user's input on the display 160 in the payment mode.

The state where the user wears the electronic device may be a state where a lock state is released. That is, when wearing the electronic device, the user may perform an operation for releasing the lock state. The release of the lock state may be achieved by inputting a fingerprint or a password. However, when performing the payment operation, the user may require a separate security authentication. Accordingly, when switching to the payment mode, the electronic device may require a security authentication process.

Referring to FIG. 35, an operation mode of step 3511 may be a sleep mode. When the multiple touch inputs are detected in the sleep mode in the worn state, the electronic device may analyze pressure intensities of the touch inputs in step 3513. At this time, when the pressure intensities of the multiple touch inputs are greater than or equal to a predetermined intensity, the electronic device may recognize it in step 3515 and display a security input window in the display area of the display 160 in step 3517. The security input window may be an input window for fingerprint recognition. The fingerprint recognition may be configured in a manner as described in FIGS. 10A to 12C, and the fingerprint recognition input window may be displayed at a preset location on the screen of the display 160. When the user places a finger on the security input window, the user may recognize the touched fingerprint and compare and analyze the recognized fingerprint and a registered fingerprint to determine whether the two fingerprints match each other. When the two fingerprints match each other, the electronic device may recognize it in step 3519 and display a screen for performing the payment operation on the display 160 in step 3519. Thereafter, the electronic device may execute a payment processing mode by a user's input and/or communication with a POS terminal device. Further, when the payment processing mode ends, the electronic device may return to the operation mode of step 3511.

When the touch input does not correspond to multiple touch inputs in step 3513, when the pressure of the multiple touch inputs has the preset intensity or less in step 3515, or when the two fingerprints do not match each other in step 3519, the electronic device may perform each corresponding operation in step 3523.

When the worn state is released while the payment processing mode is processed, the electronic device may detect the release in step 3531 and return to step 3533 to switch to the operation mode of the non-worn state.

Referring to FIG. 36, in the worn state, the electronic device may have the form as indicated by reference numeral 3650. The reference numeral 3650 may represent a sleep mode of the worn state. When the user touches the top part and the bottom part on the screen of the display 160 in the worn state and applies pressure having a predetermined intensity as indicated by reference numeral 3620, the electronic device may recognize the multiple touches and the pressure in steps 3513 and 3515 and display a payment mode screen in step 3517 as indicated by reference numeral 3670 of FIG. 36. The payment screen 3670 may display a security input window. The security input window is an area of a fingerprint recognition sensor, and the fingerprint recognition sensor may have the configuration as illustrated in FIG. 12B. When the user touches the security input window with the finger as indicated by reference numeral 3680, the electronic device may perform the fingerprint recognition and compare and analyze the recognized fingerprint and a registered fingerprint in step 3519. When the two fingerprints match each other, the electronic device may display the payment mode screen on the display 160 in step 3521 as indicated by reference numeral 3690. Further, the electronic device may display a payment operation processed according to a user's input on the display 160 in the payment mode.

Figure 37:
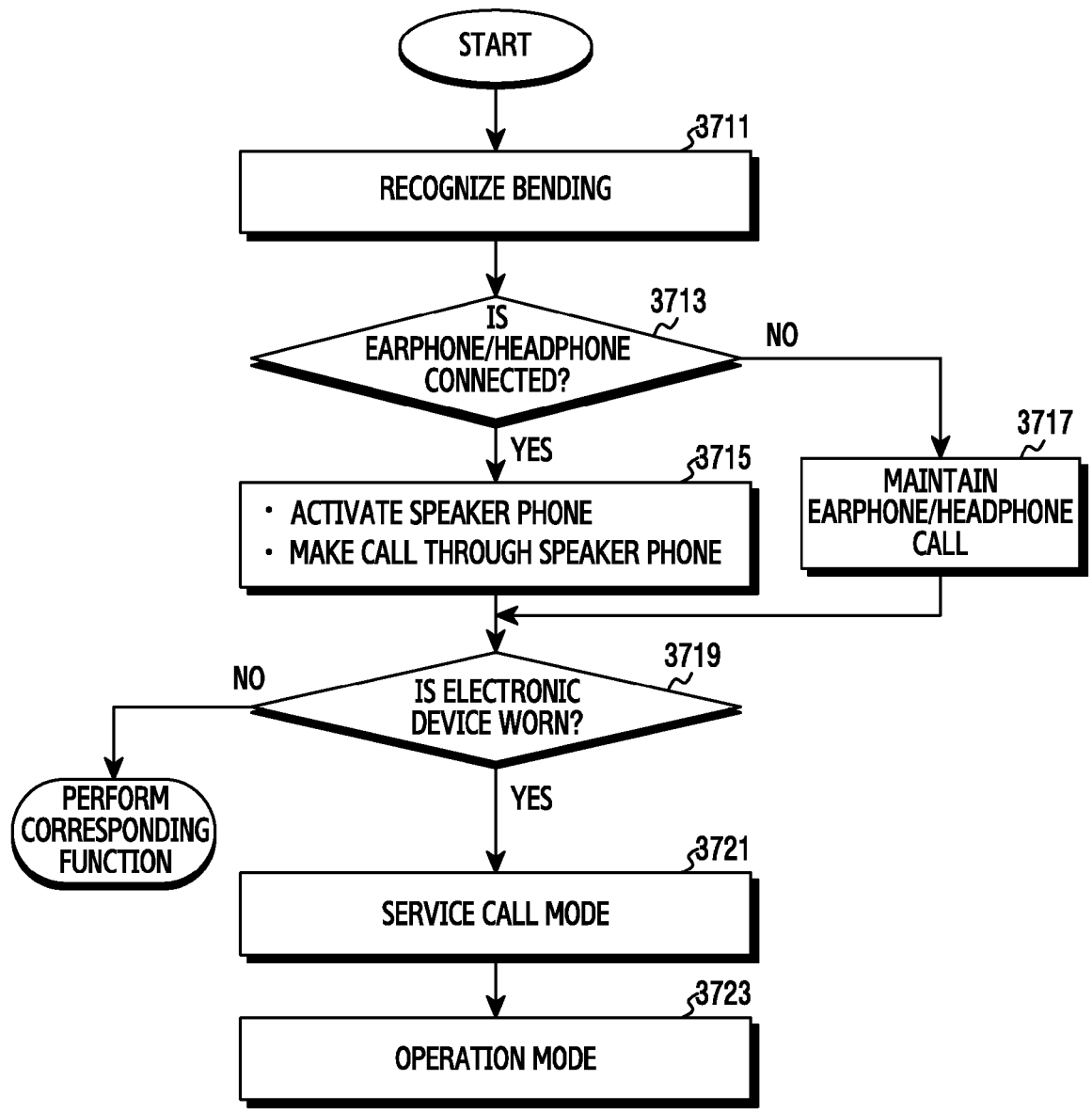
FIG. 37 is a flowchart of a servicing a call mode method when an electronic device switches to a worn state, according to an embodiment of the present disclosure.
Figure 38:
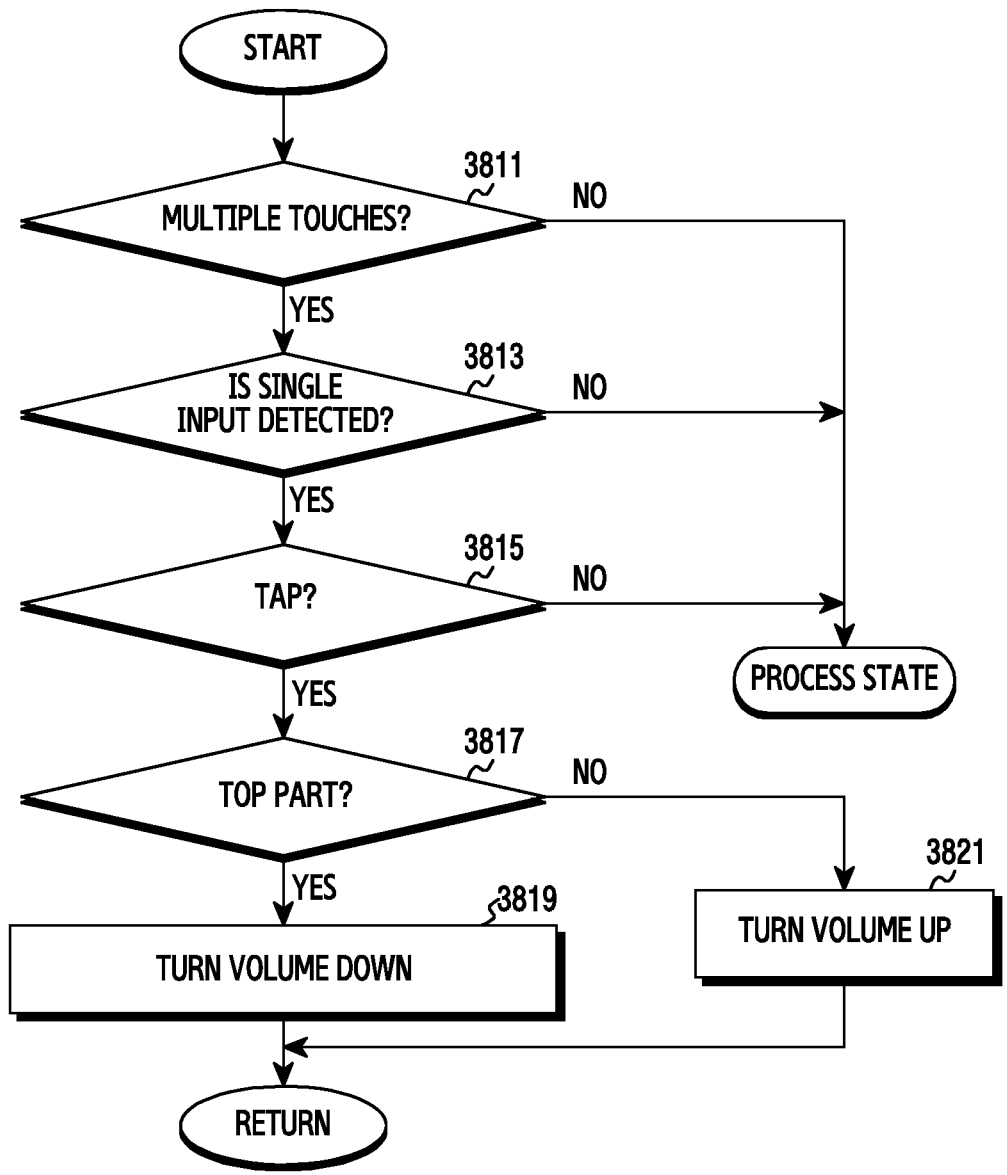
FIG. 38 is a flowchart of a method for controlling a call volume in a call mode of an electronic device in a worn state, according to an embodiment of the present disclosure.
Figure 39:
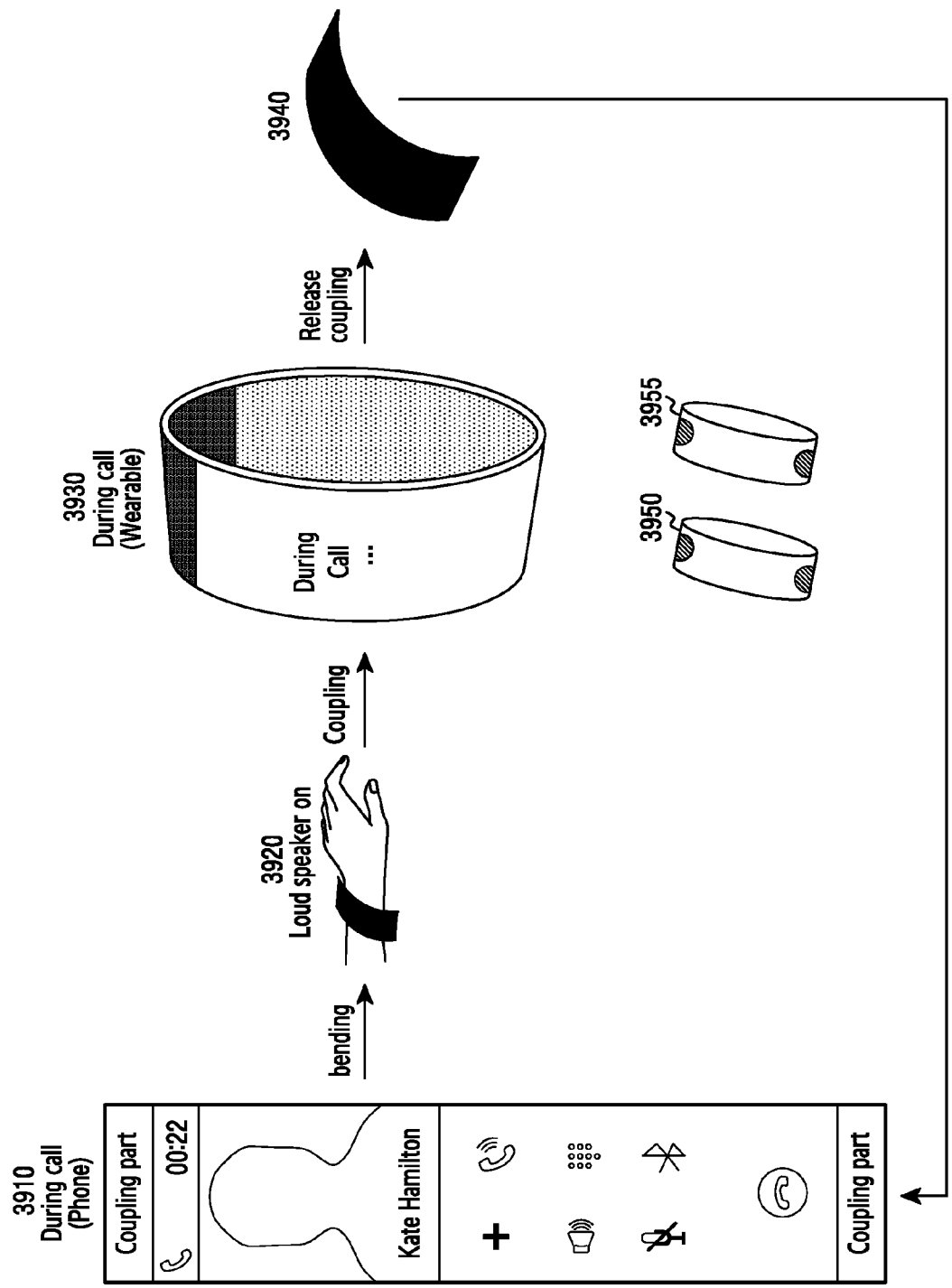
FIG. 39 is a diagram illustrating a display example of performing a call service when an electronic device switches a state, according to an embodiment of the present disclosure.
Figure 40:
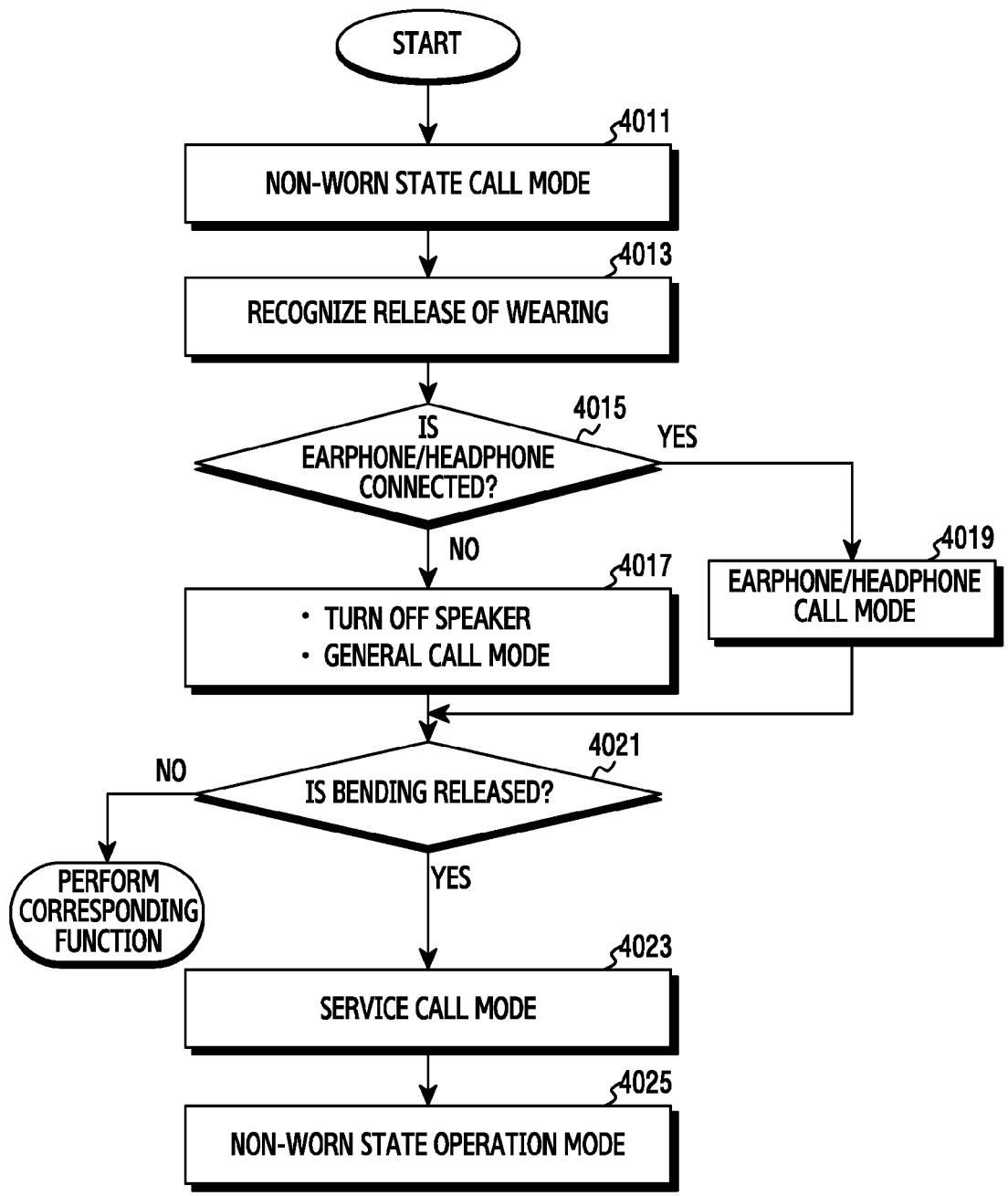
FIG. 40 is a flowchart of a method for servicing a call mode when an electronic device switches to a non-worn state, according to an embodiment of the present disclosure.

FIG. 37 is a flowchart of a servicing a call mode method when the electronic device switches to the worn state, according to an embodiment of the present disclosure. FIG. 38 is a flowchart of a method for controlling a call volume in a call mode of an electronic device in a worn state, according to an embodiment of the present disclosure. FIG. 39 is a diagram illustrating a display example of performing a call service when the electronic device switches a state, according to an embodiment of the present disclosure. FIG. 40 is a flowchart of a servicing a call mode method for when the electronic device switches to the non-worn state, according to an embodiment of the present disclosure.

Referring to FIG. 37, the electronic device in the non-worn state may service a call through various methods. When the user bends the electronic device in a state where a call mode is executed, the electronic device may recognize the bending of the electronic device in step 3711 and analyze a call state in step 3713. The call state may be a normal call (for example, a state where the user holds the electronic device to his/her ear to make the call), a speaker phone call, or an earphone/mobile phone call. In the earphone/mobile phone call state, the electronic device may maintain an earphone/mobile phone call service in step 3717. However, in the normal call, the electronic device may recognize it in step 3713, and activate a speaker phone and then service a speaker phone call mode in step 3715. Thereafter, when the user wears the electronic device, the electronic device may recognize the wearing of the electronic device through a coupling sensor in step 3719 and maintain a call mode in step 3721. At this time, when the electronic device activates the speaker phone to execute the call mode, the electronic device may continuously execute the speaker phone call mode in step 3721.

When the speaker phone call mode is performed in step 3721, the user may control a speaker phone call volume. When the volume is controlled in the worn state, the electronic device may control the volume through the method illustrated and described in FIGS. 20 and 21.

Referring to FIG. 38, when the multiple touches are generated as indicted by reference numeral 2110 of FIG. 21 in a state where the speaker phone call mode is executed, the electronic device may recognize the generation of the multiple touches in step 3811 and analyze pressure intensities in step 3813. When a pressure (single touch pressure or 1 point press) intensity of one touch input is greater than or equal to a preset intensity as indicated by the reference numeral 2130 of FIG. 21, the electronic device may recognize it in step 3813 and analyze an interaction of another touch input in step 3815. When the interaction of the other touch input is a tap, the electronic device may analyze a location (or location where the touch input is maintained) where the tap touch interaction is generated in step 3817. When the tap input is recognized in the state where the bottom touch is maintained (press state), the electronic device may recognize the tap input in step 3817 and turn the volume down in correspondence with the number of generations of taps in step 3819. When the tap input is recognized on the bottom part in the state where the top touch is maintained (press state), the electronic device may recognize the tap input in step 3817 and turn the volume up in correspondence with the number of generations of taps in step 3821. An operation of controlling the volume may be inversely performed according to a location where the touch pressure is maintained and a location where the tap input is detected.

Referring to FIG. 39, a call mode may be executed in a state where the electronic device is not worn as indicated by reference numeral 3910. When the electronic device in the non-worn state that executes a call mode is bent as indicated by reference numeral 3920, the electronic device may recognize the bending in step 3711 and analyze a call state in step 3713. In a normal call state, the electronic device may activate a speaker phone in step 3715 and, when the electronic device switches to the worn state as indicated by reference numeral 3930, recognize the worn state in step 3719 and execute a speaker phone call mode in the state where the electronic device is worn in step 3719.

Referring again to FIG. 39, when the electronic device in the worn state services the speaker phone call mode, the electronic device may control the volume according to multiple touch inputs of the user and pressure intensities as illustrated in FIG. 38. For example, when the electronic device recognizes multiple touch inputs at a top part and/or a bottom part of the electronic device in the worn state and recognizes a tap touch interaction at the bottom part in a state where the top touch is maintained as indicated by reference numeral 3950 of FIG. 39, the electronic device may turn the call volume up. When the electronic device recognizes multiple touch inputs at a top part and a bottom part of the electronic device in the worn state and recognizes the top tap touch interaction in a state where the bottom touch is maintained as indicated by reference numeral 3955, the electronic device may turn the call volume down.

When the wearing of the electronic device is not recognized in step 3719 of FIG. 37, the electronic device may continuously maintain the set call mode in the state where the electronic device is bent. For example, when the electronic device maintains the bent state, the electronic device may maintain the speaker phone call mode or the earphone/headphone call mode. When the bending is released in a state where the electronic device is not worn (that is, the electronic device is unfolded in the non-worn state), the electronic device may switch to a call state before the bending. For example, when the electronic device switches from the normal call state to the speaker phone call mode, the electronic device may switch back to the normal call state if the bending is released.

Referring to FIG. 40, the user may release the wearing of the electronic device in a state where the user is making a call through the electronic device in the worn state. In step 4011, the electronic device may be in the worn state and in a service call mode. When the user releases the wearing of the electronic device, the electronic device may recognize the release of the wearing of the electronic device through a coupling sensor in step 4013. When the release of the wearing of the electronic device is recognized, the electronic device may analyze a call state in step 4015 and, when the electronic device is in the earphone/headphone call state, maintain the earphone/headphone call state in step 4019. However, when the speaker phone call mode is recognized in step 4015, the electronic device may turn off the speaker phone and switch to the normal call mode in step 4017. Thereafter, when the bending of the electronic device is released, the electronic device may recognize the release in step 4021 and continuously perform the call mode service in a corresponding state in step 4023. When the call mode ends, the electronic device may execute the operation mode of the non-worn state in step 4025.

Referring again to FIG. 39, the electronic device may execute the call mode in the worn state as indicated by the reference numeral 3930 and, when the call mode is the speaker phone call mode, maintain the speaker phone call mode in step 4011. When the wearing of the electronic device is released as indicated by reference numeral 3940, the electronic device may recognize the release in step 4013 and turn off the speaker phone in step 4017. Thereafter, when the electronic device recognizes the release of the bending as indicated by reference numeral 3910 in step 4021, the electronic device may continuously perform the call service of the normal call state in the non-worn state as indicated by reference numeral 3910 in step 4023.

Figure 41:
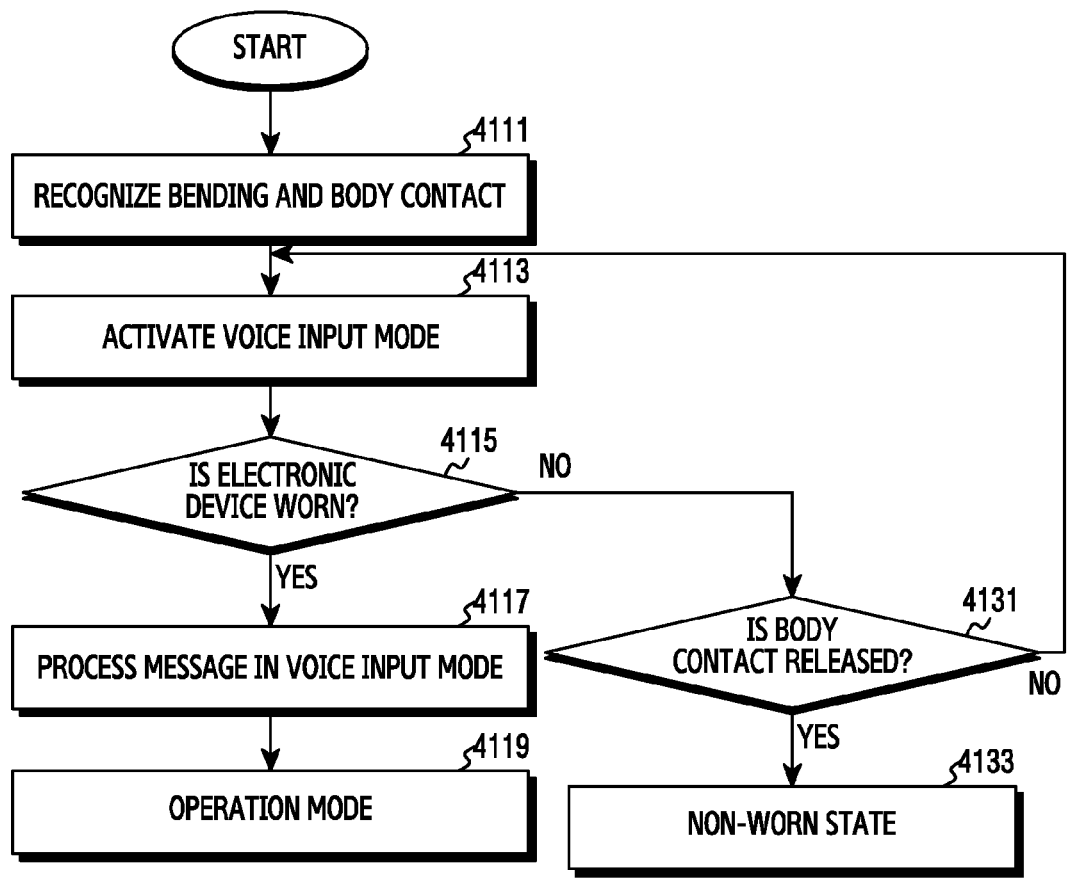
FIG. 41 is a flowchart of a method for servicing a text service mode when an electronic device switches to a worn state, according to an embodiment of the present disclosure.
Figure 42:
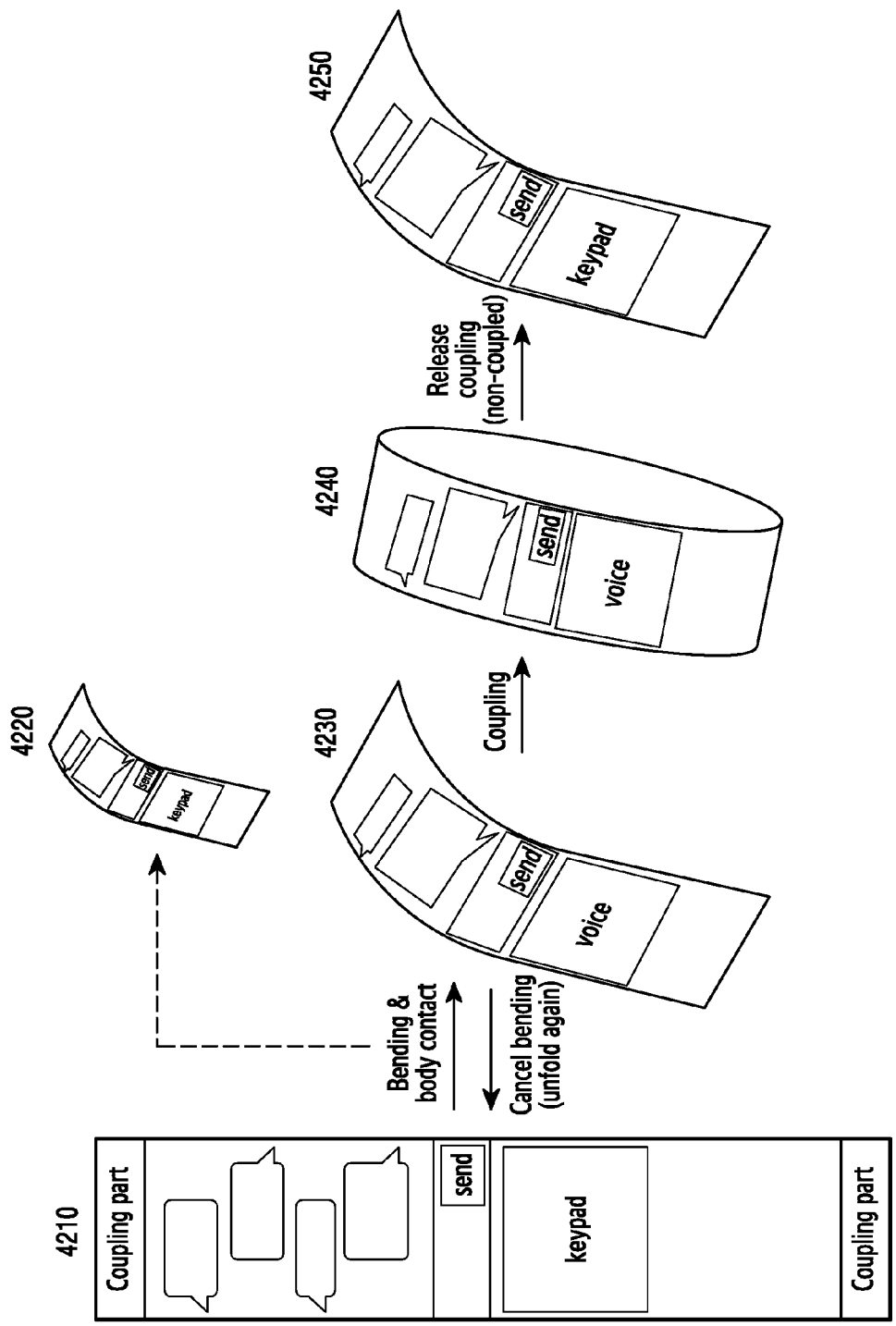
FIG. 42 is a diagram illustrating a display example of executing a text service mode when an electronic device switches a state, according to an embodiment of the present disclosure.

FIG. 41 is a flowchart of servicing a text service mode method for when the electronic device switches to the worn state, according to an embodiment of the present disclosure. FIG. 42 is a diagram illustrating a display example of executing a text service mode when the electronic device switches a state, according to an embodiment of the present disclosure.

Referring to FIG. 41, the electronic device in the non-worn state may execute the text service mode through various methods. The text service mode may refer to an operation when a document is written using a keypad or when communication needs to be performed. For example, the text service mode may include an SMS service, an MMS service, an email service, an SNS service, a search service using a keypad, and a call service using a keypad. When the user bends the electronic device in a state where the text service mode is executed, the electronic device may recognize the bending of the electronic device in step 4111. The bending of the electronic device may be an operation before the electronic device is worn. Accordingly, when the bending is recognized, the electronic device may further perform an operation of recognizing whether the electronic device contacts the user's body. When the bending and the body contact are recognized, the electronic device may switch to a speech to text (STT) mode in step 4113. That is, the electronic device may switch to the mode in which the document can be written by converting a voice into text instead of writing the document through a keypad. Thereafter, when the user wears the electronic device, the electronic device may recognize the wearing of the electronic device through a coupling sensor in step 4115 and write a document in the SIT mode in which the input voice is converted into the text in step 4117. When the text service mode ends, the electronic device may execute an operation mode set in the worn state in step 4119.

However, when the release of the wearing of the electronic device (for example, release of the wearing of the electronic device and release of the body contact) is generated while the text service mode of the SIT mode is executed, the electronic device may recognize the release and switch to the text service mode of the non-worn state in step 4115. The text service mode of the non-worn state may be a mode in which text can be input using a keypad and/or communication can be performed.

Referring to FIG. 42, in the non-worn state as indicated by reference numeral 4210, the electronic device may display a keypad on the display 160 and process characters selected through the keypad according to a corresponding application. Reference numeral 4210 may be an example of an SMS application or an SNS application. When the user bends the text device while the text service is performed in the non-worn state as indicated by reference numeral 4210, the electronic device may recognize the bending of the electronic device in step 4111. When the bending of the electronic device is recognized, the electronic device may activate a medical sensor, analyze an output of the activated medical sensor, and identify whether the electronic device contacts the user's body. When the bending of the electronic device is recognized but the user's body contact is not recognized as indicated by reference numeral 4220, the electronic device may continuously maintain the text service mode through the keypad input while displaying the keypad. When both the bending of the electronic device and the user's body contact are recognized, the electronic device may recognize the bending and the contact in step 4111 and display activation of the STT mode on the display 160 as indicated by reference numeral 4230 in step 4115. Thereafter, when the user wears the electronic device as indicated by reference numeral 4240, the electronic device may recognize the wearing of the electronic device and execute the text service mode in the STT mode in step 4115. When the text service mode is executed in the STT mode, the electronic device may display characters processed by the STT mode on the display 160 as indicated by reference numeral 4240. When the user releases the wearing of the electronic device while the text service is performed in the STT mode, the electronic device may recognize the release of the user's body contact in step 4131 and display the keypad on the display 160 as indicated by reference numeral 4250 in step 4133. Accordingly, when the release of the wearing of the electronic device while the text service mode is executed in the worn state, the electronic device may end the STT mode and display the keypad to continuously perform the text service as indicated by reference numeral 4250.

Figure 43:
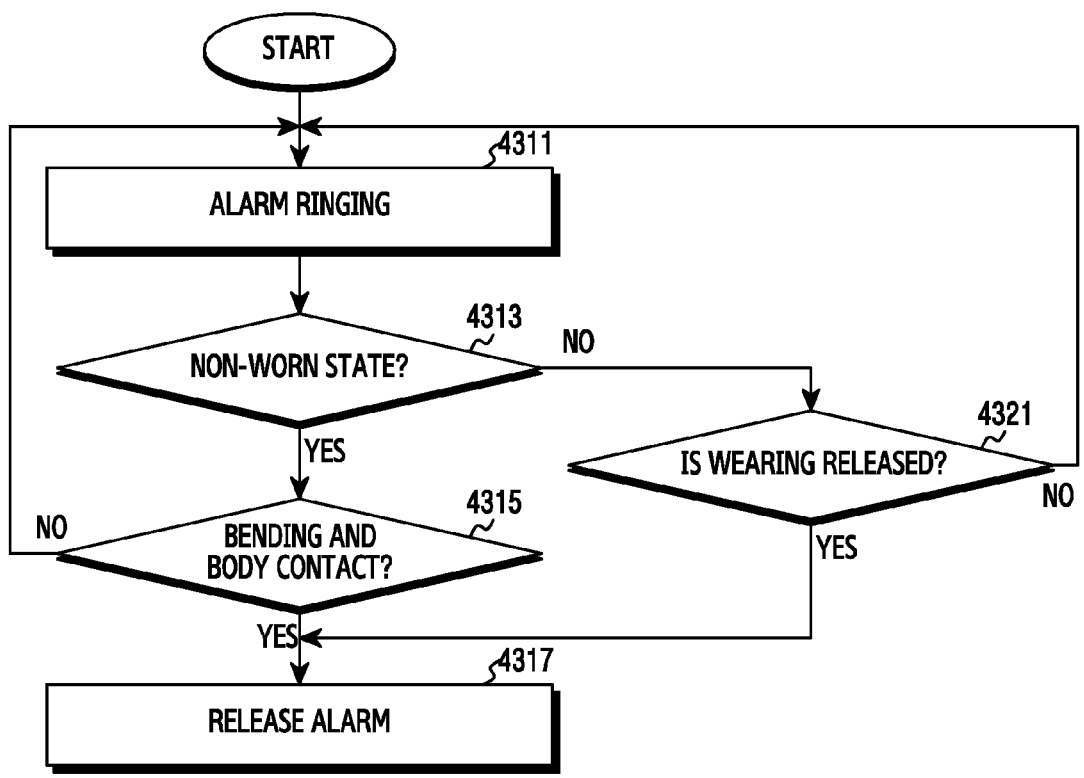
FIG. 43 is a flowchart of an alarm processing method of an electronic device, according to an embodiment of the present disclosure.

FIG. 43 is a flowchart of an alarm processing method of the electronic device, according to an embodiment of the present disclosure.

Referring to FIG. 43, in step 4311 the electronic device may be in an alarm alert (for example, alarm ringing) state. In the alarm ringing state, the electronic device may analyze the wearing state of the electronic device. The electronic device is in the non-worn state, the electronic device may recognize the non-worn state in step 4313 and identify whether the electronic device is worn in step 4315. At this time, the user may release the alarm ringing by wearing the electronic device. Accordingly, when the bending of the electronic device is recognized, the electronic device may activate the medical sensor and, when the user's body contact is recognized, may recognize the contact in step 4315 and release the alarm ringing in step 4317. When the alarm ringing is generated in the worn state of the electronic device, the user may release the alarm ringing by releasing the wearing of the electronic device. When the electronic device is in the worn state, the electronic device may recognize the worn state in step 4313 and inspect whether the wearing of the electronic device is released in step 4321. When the user releases the wearing of the electronic device, the electronic device may recognize the release through the coupling sensor in step 4321 and release the alarm ringing in step 4317. Although not illustrated in FIG. 43, when the user selects an alarm release button in the worn state or the non-worn state of the electronic device, the alarm ringing may be released.

A method of operating a flexible electronic device according to various embodiments of the present disclosure may include: a step of executing an operation mode in a non-worn state of the electronic device; a step of recognizing bending of the electronic device; a step of, when the bending of the electronic device is recognized, determining whether the electronic device is worn; and a step of, when wearing of the electronic device is recognized, switching a function and/or a UI of the non-worn state to a function and/or a UI of a worn state and performing an operation.

The step of recognizing of the bending of electronic device may include: a step of, when multiple touch interactions are detected, a step of activating a bending sensor; and a step of, when the activated bending sensor recognizes bending, recognizing the bending of the electronic device. The step of recognizing of the bending of electronic device may include: a step of, when the multiple touches are detected, analyzing pressures of the multiple touches; and a step of, when the pressures of the multiple touches are greater than or equal to a predetermined intensity, recognizing the bending of the electronic device. The step of recognizing of the bending of electronic device may include: a step of, when multiple touch inputs are detected, activating a medical sensor; and a step of, when the medical sensor detects a body contact, recognizing the bending of the electronic device. The step of recognizing of the bending of electronic device may include: a step of, when the multiple touch inputs are detected, analyzing pressures of the multiple touches; a step of, when the pressures of the multiple touches are greater than or equal to a predetermined intensity, activating the medical sensor; and a step of when the medical sensor detects the body contact, recognizing the bending of the electronic device.

The step of switching the function and/or the UI may include: a step of setting an area of a display as a main display area and a sub display area; and a step of displaying the switched function and/or UI in the set main display area.

The main display area may be a user visible area of the worn electronic device and may be displayed more brightly than the sub display area.

The method of operating the electronic device according to various embodiments may include: a step of executing an operation mode of the worn electronic device; and a step of, when releasing of wearing of the electronic device is recognized, ending an operation of the worn state.

The step of switching the function and/or the UI may further include a step of, when the bending of the electronic device is recognized, analyzing an operation of the electronic device in the non-worn state, and a function and/or a UI of the analyzed operation may be switched to a function and/or a UI of the worn electronic device and then displayed.

The operation of the non-worn state may be a lock state and the switching of the function and/or the UI may include a step of displaying a lock release input window when the bending is recognized. The lock release input window may be a fingerprint input window and the step of switching the function and/or the UI may include a step of displaying the fingerprint input window in the display area of the display.

The operation of the non-worn state may be biometric measurement and the step of switching the function and/or the UI may include a step of activating a medical sensor. The medical sensor may be a Heart Rate Monitoring (HRM) sensor. When squeezing of the HRM sensor is recognized in a state where the electronic device is worn, the method may include a step of executing a biometric measurement mode.

The operation of the non-worn state may be a payment operation, and the step of switching the function and/or the UI may include a step of displaying a security input window on the display. When the payment operation is performed, the method may further include a step of, when pressures by multiple touches are recognized in the state where the electronic device is worn, displaying a security input window; and a step of, when a security input is recognized, performing a security authentication and executing a payment mode.

The operation of the non-worn state may be a call and the step of switching the function and/or the UI may include a step of turning on a speaker phone and switching to a speaker phone call mode. When multiple touches and a tap touch interaction are recognized in a call mode in the state where the electronic device is worn, the method may further include a step of controlling a call volume according to a tap location.

The operation of the non-worn state may be a text input operation and the step of switching the function and/or the UI may include a step of activating a medical sensor when the bending is recognized and a step of, when the medical sensor detects a body contact, setting a function of converting a voice into text.

The operation of the non-worn state may be an alarm ringing and the operation of the worn state may be releasing of an alarm when wearing of the electronic device is recognized.

An electronic device and an operation method thereof according to various embodiments of the present disclosure can determine a situation where the form of a flexible electronic device, which can be transformed to a phone or a wearable device, is changed and switch to a proper function/UI. Further, the electronic device and the operation method thereof can determine whether the user wears the flexible electronic device when the user wears the flexible electronic device and bending of the flexible electronic device is recognized in non-worn and worn states and differently control the electronic device according to each state.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a flexible touch screen comprising a display;
a pressure sensor configured to detect pressure intensity of the display;
a medical sensor configured to detect a biometric signal of a user; and
a processor operably connected to the display and the sensor and configured to:
identify, while a first operation is executed in a non-worn state of the electronic device, a bending of the electronic device, based on the pressure intensity detected from the pressure sensor;
activate, in response to identifying the bending, a user interface of an application corresponding to a worn state of the electronic device;
identify the worn state of the electronic device, based on the biometric signal detected from the medical sensor; and
perform a second operation of the application.

2. The electronic device of claim 1, wherein the processor is further configured to:
in response to identifying the bending, divide a display area of the display into a main display area and a sub display area.

3. The electronic device of claim 2, further comprising a camera,
wherein the processor is further configured to:
identify whether the worn state is an inside direction of a wrist of a user or an outside direction of the wrist based on a photo acquired by the camera;
in response to identifying that the worn state is the outside direction, set the main display area in a first direction from a coupling part of the electronic device; and
in response to identifying that the worn state is the inside direction, set the main display area in a second direction from a coupling part of the electronic device.

4. The electronic device of claim 2, wherein the processor is further configured to:
receive, in the non-won state, a touch input in a lock state of the electronic device; and
activate, in response to receiving the touch input, the pressure sensor to detect the pressure intensity of the touch input.

5. The electronic device of claim 4, wherein the processor is further configured to:
receive, in the non-won state, the touch input in an area of the flexible touch screen that is activated from among the flexible touch screen in the lock state of the electronic device.

6. The electronic device of claim 4, wherein the processor is further configured to:
turn on the display, in response to identifying the bending; and
display a lock release input window after turning on the display.

7. The electronic device of claim 4, wherein the processor is further configured to;

activate, in response to identifying the bending, the medical sensor to detect the biometric signal.

8. The electronic device of claim 1, wherein the application is a payment application, and
wherein the processor is further configured to:
turn on the display, in response to identifying the bending;
display, after turning on the display, a security input window to receive security information; and
in response to the received security information being matched to registered security information, perform a payment operation of the payment application as the second operation of the application.

9. The electronic device of claim 1, wherein the first operation in the non-worn state is a normal call, and
wherein the second operation in the worn state is a speaker phone call.

10. The electronic device of claim 1, wherein the first operation in the non-worn state is providing a service in which a message is written using a keypad; and
wherein the second operation in the worn state is providing a service in which the message is written using a speech to text mode.

11. A method of operating a flexible electronic device, the method comprising:
identify, while a first operation is executed in a non-worn state of the electronic device, a bending of the electronic device, based on a pressure intensity of a display of the electronic device detected from a pressure sensor of the electronic device;
activate, in response to identifying the bending, a user interface of an application corresponding to a worn state of the electronic device on the display;
identify the worn state of the electronic device, based on a biometric signal detected from a medical sensor of the electronic device; and
perform a second operation of the application.

12. The method of claim 11, further comprising:
in response to identifying the bending, dividing a display area of the display into a main display area and a sub display area.

13. The method of claim 12, further comprising:
identifying whether the worn state is an inside direction of a wrist of a user or an outside direction of the wrist based on a photo acquired by a camera of the electronic device;

setting, in response to identifying that the worn state is the outside direction, the main display area in a first direction from a coupling part of the electronic device; and
setting, in response to identifying that the worn state is the inside direction, the main display area in a second direction from a coupling part of the electronic device.

14. The method of claim 12, further comprising:
receiving, in the non-won state, a touch input in a lock state of the electronic device; and
activating, in response to receiving the touch input, the pressure sensor to detect the pressure intensity of the touch input.

15. The method of claim 14, further comprising:
receiving, in the non-won state, the touch input in an area of a flexible touch screen that is activated from among the flexible touch screen in the lock state of the electronic device.

16. The method of claim 14, further comprising:
turning on the display, in response to identifying the bending; and
displaying a lock release input window after turning on the display.

17. The method of claim 14, further comprising:
activating, in response to identifying the bending, the medical sensor to detect the biometric signal.

18. The method of claim 11, wherein the application is a payment application, and
wherein the method further comprises:
turning on the display, in response to identifying the bending; and
displaying a security input window to receive security information after turning on the display; and
performing, in response to the received security information being matched to registered security information, a payment operation of the payment application as the second operation of the application.

19. The method of claim 11, wherein the first operation in the non-worn state is a normal call, and
wherein the second operation in the worn state is a speaker phone call.

20. The method of claim 11, wherein the first operation in the non-worn state is providing a service in which a message is written using a keypad, and
wherein the second operation in the worn state is providing a service in which the message is written using a speech to text mode.

* * * * *